United States Patent [19]

Armstrong et al.

[11] Patent Number: 5,627,973

[45] Date of Patent: May 6, 1997

[54] METHOD AND APPARATUS FOR FACILITATING EVALUATION OF BUSINESS OPPORTUNITIES FOR SUPPLYING GOODS AND/OR SERVICES TO POTENTIAL CUSTOMERS

[75] Inventors: Hugh E. Armstrong, Wilmot, Wis.; Brad B. Bailey, Denton, Tex.; Gregory T. Lynch, Vernon Hills, Ill.; Judith A. McMahon, Libertyville, Ill.; Karen L. Schweinzger, Waukegan, Ill.; Suzanne M. Vaughan, Vernon Hills, Ill.; Gregory C. Schweinzger, Waukegan, Ill.

[73] Assignee: Moore Business Forms, Inc., Grand Island, N.Y.

[21] Appl. No.: 209,471

[22] Filed: Mar. 14, 1994

[51] Int. Cl.⁶ .................................................... G06F 17/60
[52] U.S. Cl. ............................................................ 395/210
[58] Field of Search ................................. 364/401, 402, 364/419.01, 419.2, 401 R; 434/323, 353, 354

[56] References Cited

U.S. PATENT DOCUMENTS

| | | |
|---|---|---|
| 4,937,439 | 6/1990 | Wanninger et al. . |
| 5,041,972 | 8/1991 | Frost . |
| 5,063,506 | 11/1991 | Brockwell et al. . |
| 5,084,819 | 1/1992 | Dewey et al. . |
| 5,101,352 | 3/1992 | Rembert . |
| 5,148,365 | 9/1992 | Dembo . |
| 5,191,525 | 3/1993 | LeBrun et al. . |
| 5,198,642 | 3/1993 | Deniger . |
| 5,208,765 | 5/1993 | Turnbull . |
| 5,216,593 | 6/1993 | Dietrich et al. . |
| 5,241,464 | 8/1993 | Greulich et al. . |
| 5,406,477 | 4/1995 | Harhen .............................. 364/401 R |
| 5,496,175 | 3/1996 | Oyama et al. ........................... 434/323 |

*Primary Examiner*—Robert A. Weinhardt
*Attorney, Agent, or Firm*—Nixon & Vanderhye P.C.

[57] ABSTRACT

A method and apparatus for evaluating business opportunities for supplying goods and services (such as business forms and services) to potential customers takes a quantative approach that allows a user to evaluate a potential customer's needs, and the user's ability to supply those needs, to see what the area of opportunity for the user to supply that need is. Calculations can also be made comparing the user's ability to fulfill the needs to some absolute standard, to also determine an area of emerging technology. A series of questions relating to the customer's level of sophistication for predefined business techniques in a number of different categories are inputted into a computer, as well as the responses, and weights and values are assigned to the question responses to indicate a level of sophistication for each possible response of each business technique for each separate category. The user's capability of supplying the potential customer's needs are also evaluated and this data is inputted into a second computer which calculates, taking into account the weights and values, for each separate category a potential customer's score, the user's score, and the area of opportunity (which is the difference between the customer's score and the user's score). Then using a computer controlled printer, the calculations are printed out in graphical form on a sheet of paper, along with other human readable indicia, from which an evaluation of the opportunity, as well as a tool to close a business deal, are supplied.

22 Claims, 86 Drawing Sheets

FIG. 5C

Vital Statistics

Interviewer
- Name: ____
- Sales Code: [####]  Location Code: [####]  Date of Interview: [##/##/##]
- Area/Reg/Dist: [# ### ##]

Company
- Cust. Nbr: [#-#####-#####]
- Name on Reports: ____
- Addr1: ____
- Addr2: ____
- City: ____
- State: [??]  Zip: [##### ####]

☐ Prospective Customer Account Type
- ○ Commercial    ○ Health Serv.
- ○ Financial/Serv.  ○ Major
- ○ Government    ○ National

Employees: [0]   SIC: [####]

| Contact Name | Title | Misc. |
|---|---|---|
| | | |

[Ok] [Print] [Validate] [Notes] [Cancel] [Help]

FIG. 5D

FORMS CONTROL

FORMS CONTROL FUNCTION | PROCEDURES

- [YES] A. Do procedures exist for Forms Control Activities?
- [YES] B. Are they published?
- [NO] C. Are they available to end users?
- [YES] D. Is there a formal review process?

Check All that apply

Next | Prev | Menu | Question | Notes | Clear | Ok | Cancel | Help

Value Analysis

File  Diskette  Help

Scored Answer Set

THE NEW IMPROVED Answers!, 6/18/93        Answer    Score

1. FORMS CONTROL
01. FORMS CONTROL FUNCTION
  01.
    A. Do procedures exist for Forms Control activities?           2.80
    B. Are they published?                                          2.00
    C. Are they available to end users?                             2.00
    D. Is there a formal review process?
  02.
    A. Is there assigned responsibility for the Forms Control Function?    Y
    B. Does it include participating in design construction recommendations?  N
    C. Does it include attending department meetings for development of new  N   2.00
    D. Does it include reviewing forms for consolidation/elimination?        N
    E. Does it include approving forms vendor invoices for payment?          N
  03.
    A. Is there a training program for Forms Control personnel?     Y
    B. Is it an internal program?                                   N   2.00
    C. Is it recognized and administered through your corporate training program?  N

[Print Final Answers]          [Ok]   [Cancel]   [Help]

Question:                      Answer:

FIG. 7C

Maintain Question Set: Standard Question Set

| 1 FORMS CONTROL | → | Add | Edit |

| 01 FORMS CONTROL FUNCTION | → | Add | Edit |

| 01 | → | Add | Edit |

| A. Do procedures exist for Forms Control activities? | → | Add | Edit |

Create Field Question File | Edit Dependents

Ok | Cancel | Help

Edit Dependent Sub-Elements

... This Sub-Element will be Suppressed...

| Dependent |
|---|
| 10101 |
| 10102 |
| 10103 |
| 10201 |
| 10202  10201 |
| 10203  10201 |
| 10301 |
| 10302  10301 |

Component: FORMS CONTROL
Element: FORMS FILE
Sub-Element: Which of the following are included in the forms file?

... if this Sub-Element is NOT answered YES.

| Control |
|---|
| <NONE> |
| 10101 |
| 10102 |
| 10103 |
| 10201 |
| 10202 |

Update

Component: FORMS CONTROL
Element: FORMS FILE
Sub-Element: Which of the following are included in the forms file?

Ok  Cancel  Help

Maintain Weights

Component:
[1 Forms Control ▼]

Element:
[01 20% Forms File ▼] 20 | Total 85% | Update

SubElement:
[01 40% Electronic forms file exists ▼] 40 | Total 100% | Update

[Ok] [Cancel] [Help]

METHOD AND APPARATUS FOR FACILITATING EVALUATION OF BUSINESS OPPORTUNITIES FOR SUPPLYING GOODS AND/OR SERVICES TO POTENTIAL CUSTOMERS

BACKGROUND AND SUMMARY OF THE INVENTION

In the supply of goods and services by a vendor to a customer, there are significant difficulties often associated with evaluating how good a business opportunity dealing with a particular customer is. There are also significant difficulties associated with convincing the customer of the ability of the vendor to substantially help the customer fulfill its needs. This is particularly so in areas where the vendors provide custom goods and/or services. One example that is particularly illustrative, although not limiting, is in the area of paper and electronic business forms and related services. For large customers, such as large retail stores with numerous locations, major oil companies, large banks and insurance companies, etc., there is a significant amount of sales resistance to the supply of business forms and related services because the customer believes that the process of evaluating what assistance can be provided by the vendor to the customer is highly subjective and not fact based. This is because in conventional procedures a sales representative meets with a customer, takes a tour of the customer's facilities, and asks questions pertaining to how the business is presently conducted. The information is subjectively evaluated, and a proposal is made based upon this subjective evaluation. Often the process can take six months to a year or more for large potential customers, with no mechanism for predicting a success rate, ensuring successful implementation, or determining objectively how worthwhile the business is that would be secured if a contract for goods and/or services with the potential customer was implemented.

According to the present invention, a method and apparatus are provided which make the evaluation process much more objective. This has two major advantages. The first advantage is that it allows the vendor (user of the method and apparatus) to much more accurately determine the value of the business that can be obtained from a potential customer, while minimizing the possibility that money could be lost after a contract is signed with the customer due to ineffective evaluation. Secondly, it presents a much better impression on the customer, since the presentation can be made in a much shorter period of time, and objective and fact-based information can be presented to the customer, and in easily human readable form (e.g. graphs).

According to one aspect of the present invention a method of evaluating business opportunities for supplying goods and/or services to potential customers is provided which comprises the following steps: (a) In a first computer, inputting a series of questions relating to the level of sophistication of a potential customer's predefined business techniques in a plurality of different categories. (b) Collecting responses to the series of questions from step (a) and inputting the responses into the first computer. (c) Assigning weights and values to the question responses so as to indicate a level of sophistication for each possible response of each business technique for each separate category. (d) Inputting the data from steps (b) and (c) into a second computer. (e) Using the second computer, calculating, taking into account the weights and values, for each separate category a potential customer's score. And, (f) using a computer controlled printer, printing out on sheet material the calculations from step (d) in human readable form, and with sufficient detail so that an evaluation can be made of the potential customer's needs and the ability to fulfill those needs.

The method of the invention is particularly suitable for use in supplying goods and/or services that are paper and electronic business forms and related services. In that case, steps (a) through (c) are practiced with at least three of forms design, forms control, forms procurement, forms warehousing and distribution, forms inventory management, and accounts payable, categories. Typically steps (a) and (c) are practiced by grouping each category of questions by elements, sub-elements and points, and wherein some of the questions are limited to one choice while others include "choose all that apply"; assigning values at the point level when a response is limited to one choice, and assigning values to combinations of points when a response is "choose all that apply"; and assigning weights at the sub-element and element levels.

According to another aspect of a method of evaluating business opportunities for supplying goods and/or services to potential customers according to the invention, there are provided the following method steps: (a) In a first computer, inputting a series of questions relating to the level of sophistication of a potential customer's predefined business techniques in a plurality of different categories. (b) Collecting responses to the series of questions from step (a) and inputting the responses into the first computer. (c) Assigning numerical weights and values to the question responses so as to indicate a level of sophistication for each possible response of each business technique for search separate category. (d) Determining a user's score which reflects the user's capability of supplying goods and/or services to the potential customer related to the potential customer's predefined business techniques. (e) Inputting the data from steps (b), (c) and (d) into a second computer. (f) Using the second computer, calculating or, taking into account the weights and values, providing for each separate category a potential customer's score, the user's score, and the area of opportunity which is the difference between the potential customer's score and the user's score. And, (g) using a computer controlled printer, printing out in graphical form on sheet material the calculations of step (f).

Typically step (f) is also practiced to calculate the area of emerging technology, which is the difference between the user's score and an optimum score, and step (g) is further practiced to print out the area of emerging technology for each category. Where the goods and/or services supplied are paper and electronic business forms and related services, the categories set forth above are typically utilized, and values are assigned at the point level when a response is limited to one choice, values are assigned to combinations of points when a response is "choose all that apply", and weights are assigned at the sub-element and element levels.

As one example of details for assigning weights, for the forms control category the step of assigning weights at the element level is practiced by assigning a weight of about 30–40% for a forms control function element, about 15–25% for a forms file element, about 5–15% for a forms numbering element, about 15–25% for a forms catalog element, about 1–10% for a requisitions element, and about 5–15% for an obsolete item identification, resolution, and prevention element. For the same category, the step of assigning weights at the sub-element level may be practiced by: Assigning for the forms control function sub-elements a weight of about 55–65% for a sub-element related to existing procedures for forms control activities, about 15–25% to a sub-element relating to assigned responsibilities for forms control functions, and about 15–25% for a sub-element related to a training program for forms control personnel. Assigning for the forms file element about 5–15% for a sub-element relating to if forms file exists, about 25–35% for a sub-element relating to which of specific elements are included in the forms file, and about 55–65% for a sub-element relating to updating of the forms file. Assigning for the forms numbering element about 55–65% for a sub-element relating to the existence of a forms numbering system, and about 35–45% for a sub-element relating to the responsibility for forms numbering. Assigning for the forms catalog element about 5–15% for a sub-element relating to the existence of a forms catalog, about 25–35% for a sub-element relating to the characteristics of forms listed in the forms catalog, about 15–25% for a sub-element relating to how the forms catalog is distributed, and about 35–45% for a sub-element relating to how often the forms catalog is updated. Assigning for the requisitions element about 40–60% for a sub-element relating to the number of line items per requisition, and about 40–60% for a sub-element relating to the maximum number of lines on the most commonly used requisition form or forms. And assigning for the obsolete item identification, resolution and prevention element a significant weight for a sub-element relating to tools for identifying and remedying obsolete forms.

Similar techniques, as set forth above, are provided for the other categories too. For example for the forms design category the step of assigning weights at the element level is practiced by assigning a weight of about 5–15% for a forms composition element, about 35–45% for a forms analysis element, about 20–30% for a business systems analysis element, and about 20–30% of a manufacturing capabilities and standard specifications element. For the procurement category the step of assigning weights at the element level is practiced by assigning a weight of about 50–70% for a procurement process element, about 30–40% for a reorder process element, and about 1–20% for an environmental policy element. For the warehousing/distribution category the step of assigning weights at the element level is practiced by assigning a weight of about 30–40% for a warehouse facility characteristics element, about 30–40% for a requisition process element, about 10–20% for a distribution methods element, and about 10–20% for an inventory turns element. For the inventory management system category the step of assigning weights at the element level is practiced by assigning a weight of about 5–15% for a characteristics element, about 5–15% for an access element, about 1–25% for a system software security element, about 20–40% for a features element, about 5–15% for a customer service element, and about 20–40% for a reports element. For the accounts payable category the step of assigning weights at the element level is practiced by assigning a weight of about 45–65% for an accounts payable procedures element, and about 35–55% for an accounting procedures element.

Step (g) may be practiced by printing a three-dimensional bar graph having differently shaded or colored areas for a potential customer's score and the user's score for each category and for each element within a category, each bar extending in a y-axis between zero and a maximum value, each bar identified by human readable indicia along an x-axis, and a numerical value corresponding to the graphical representation provided within at least some of the differently shaded or colored areas for at least some of the bars. Step (g) may also be practiced to print out analysis information in non-graphical human readable form along with the graphical material.

The invention also relates to an apparatus for evaluating business opportunities for supplying goods and/or services to potential customers. The apparatus preferably comprises: A portable first computer means (e.g. a lap top) including a keyboard, mouse, pen, and/or roller ball, and a disc drive for inputting a series of questions relating to the level of sophistication of a potential customer's predefined business techniques in a plurality of different categories, and for inputting responses to the questions. A second computer means (e.g. a PC) including a keyboard and disc drive for inputting in machine readable form data from the first computer means, including the responses to the questions, assigned numerical weights and values, and data regarding the user's capability of supplying goods and/or services to the potential customer related to the potential customer's predefined business techniques, the second computer means including means for calculating, taking into account the weights and values, for each separate category a potential customers, score, the user's score, and the area of opportunity which is the difference between the potential customer's score and the user's score. And, a computer controlled printer (e.g. a laser printer) controlled by the second computer means for printing out in human readable form on sheet material the calculations performed by the second computer means.

Similar techniques can be utilized for implementing and reassessing the supply of goods and/or services after a contract for their supply is entered into by the vendor (user of the system).

It is the primary object of the present invention to provide a quantitative method and apparatus for evaluating business opportunities for supplying goods and/or services to potential customers. This and other objects of the invention will become clear from an inspection of the detailed description of the invention and from the appended claims.

BRIEF DESCRIPTION OF THE DRAWINGS

FIGS. 7A–7I are schematics of some exemplary computer screens utilizable to facilitate practice of various routines and sub-routines as illustrated by some of the flow sheets of FIGS. 6A–6AA;

DETAILED DESCRIPTION OF THE DRAWINGS

Figure 1:
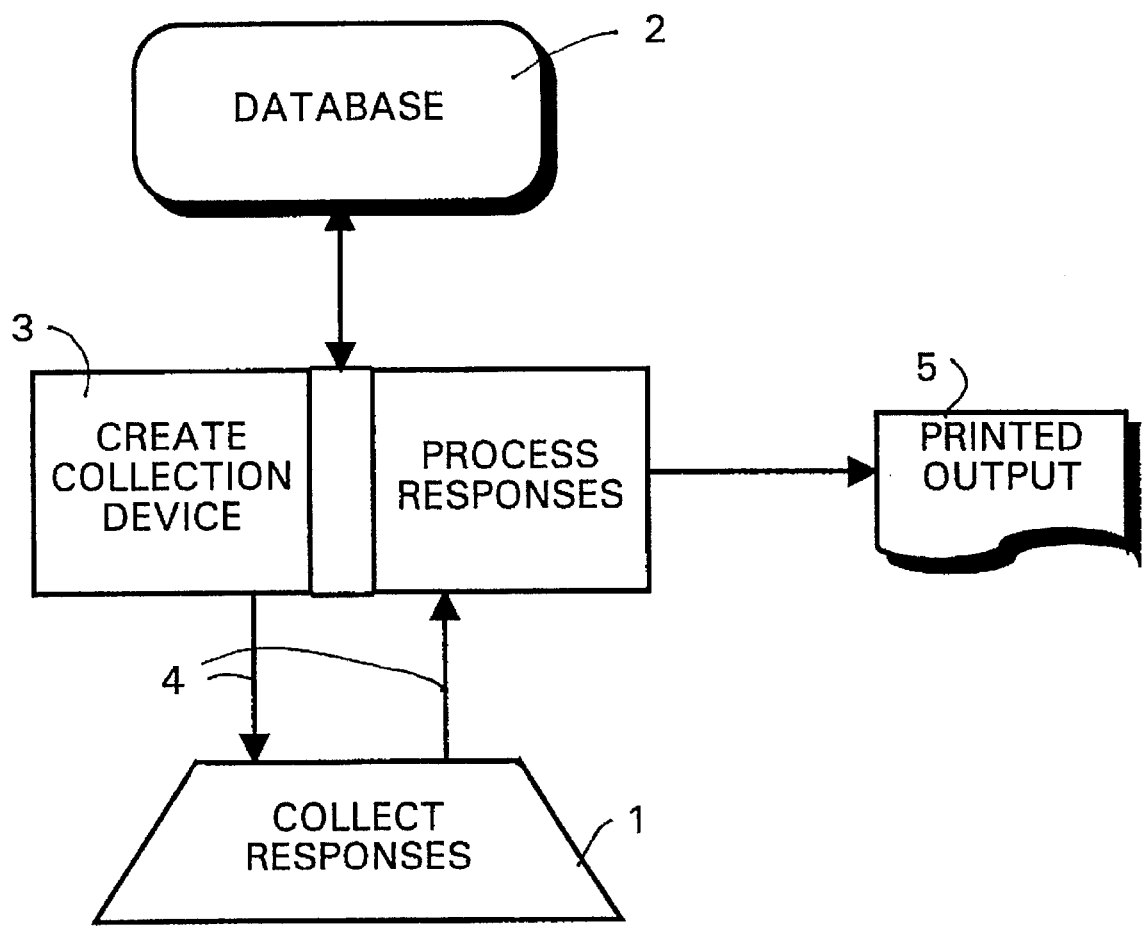
FIG. 1 is a schematic showing the basic inter-relationship between components and events according to the present invention.

FIG. 1 schematically represents the interaction between computing means that are utilized as part of the apparatus according to the invention, and for practicing the methods according to the present invention. A first computer 1 is utilized to collect responses to questions previously formulated in a data base 2 and inputted into a second computer 3, the computers 1, 3 communicating as indicated schematically by lines 4 by modem, and/or by capture onto a disc which is mailed or otherwise delivered. The formulated questions in the "create collection device" part of the second computer 3 may be processed and revised as necessary, while the responses collected in the first computer 1 are processed in the "process responses" part of the second computer 3. The printed output, as indicated at 5 in FIG. 1, is provided after the responses are processed.

Figure 2:
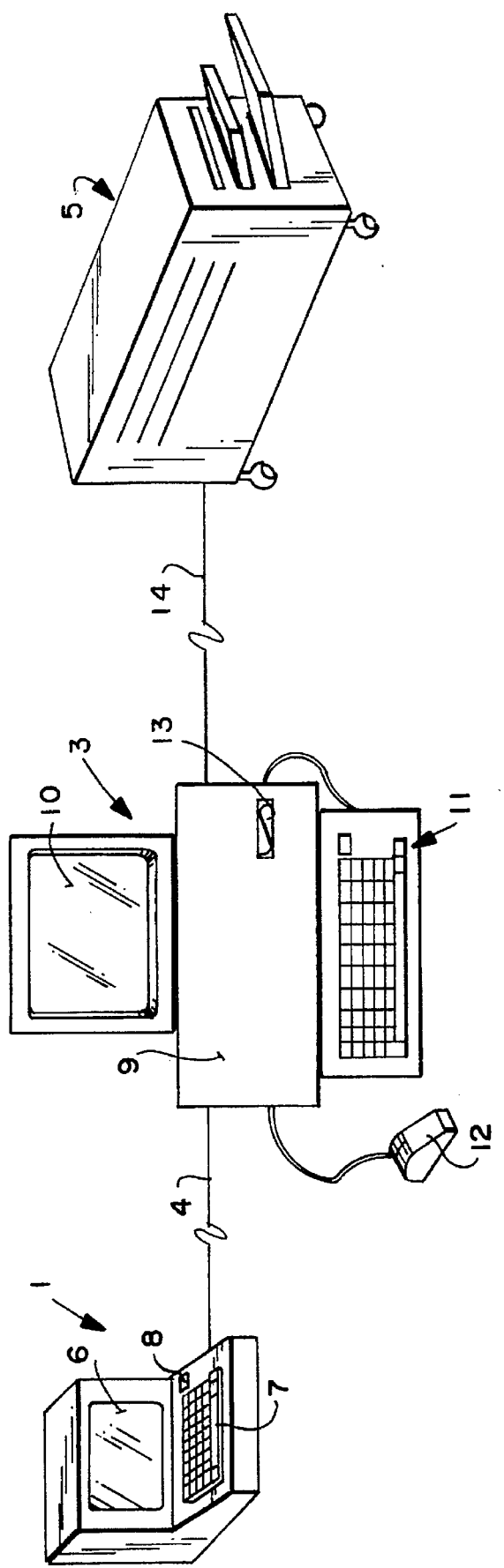
FIG. 2 is a schematic showing of exemplary pieces of equipment that are utilized according to the present invention, and in the implementation of the method according to the invention.

FIG. 2 is another schematic showing the same basic components of FIG. 1 only in a more diagrammatic form. In FIG. 2, the first computer 1 is shown as a lap top computer having a screen 6 and a keyboard 7, typically with a mouse 8, for inputting data which can be viewed on the screen 6. The second computer 3 is shown as a personal computer, having a main housing 9 with hard disc drive, etc., a monitor 10, a keyboard 11, and a mouse 12, the housing 9 including a disc drive opening 13 into which discs may be inserted. The computer 3 controls, through conventional cabling 14, a printer 5 which preferably comprises a laser printer.

Figure 3:
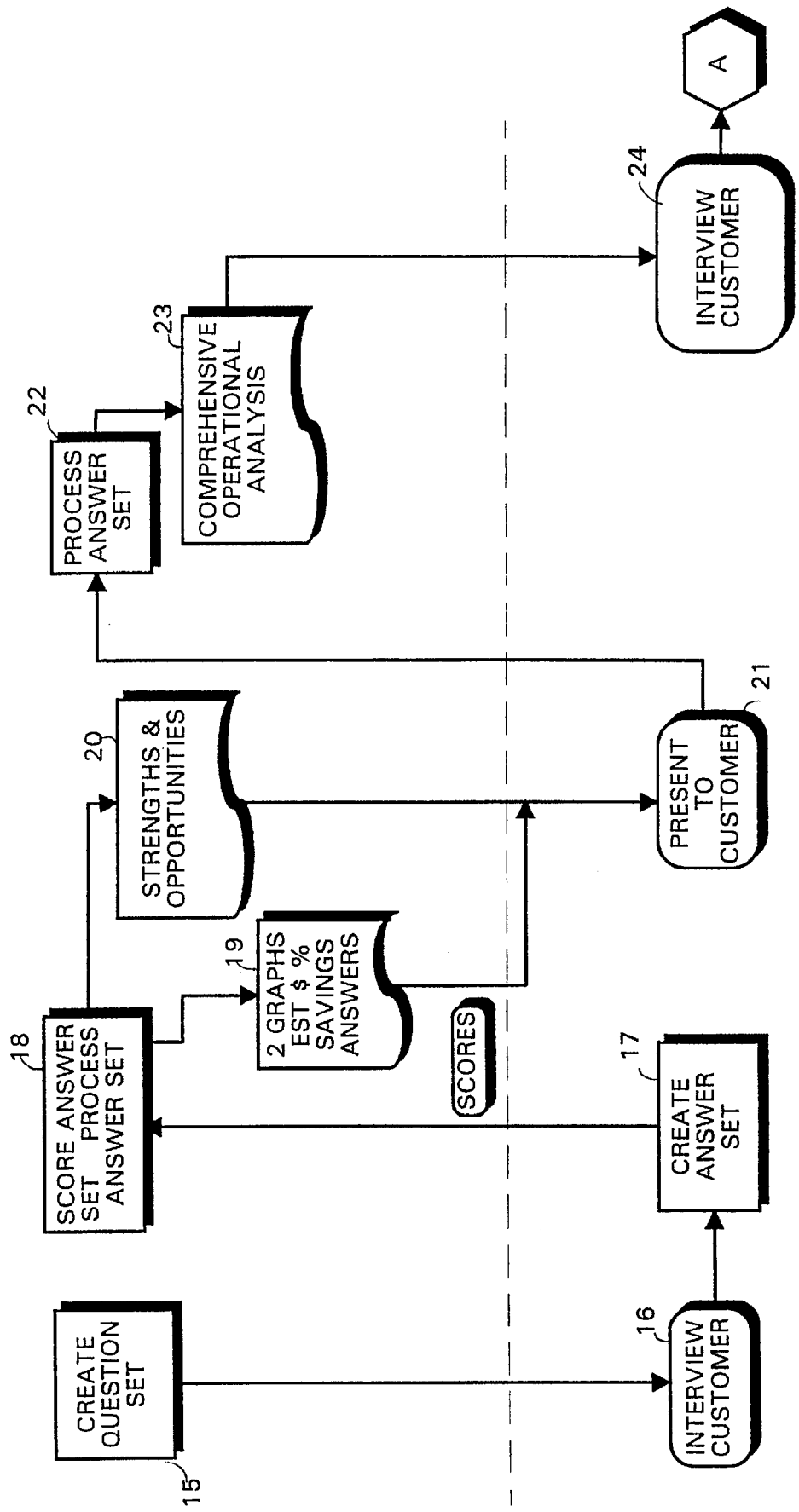
FIG. 3 is a high level flow sheet showing the inter-relationship between various processes and steps in the exemplary practice of a method according to the present invention.
Figure 3:
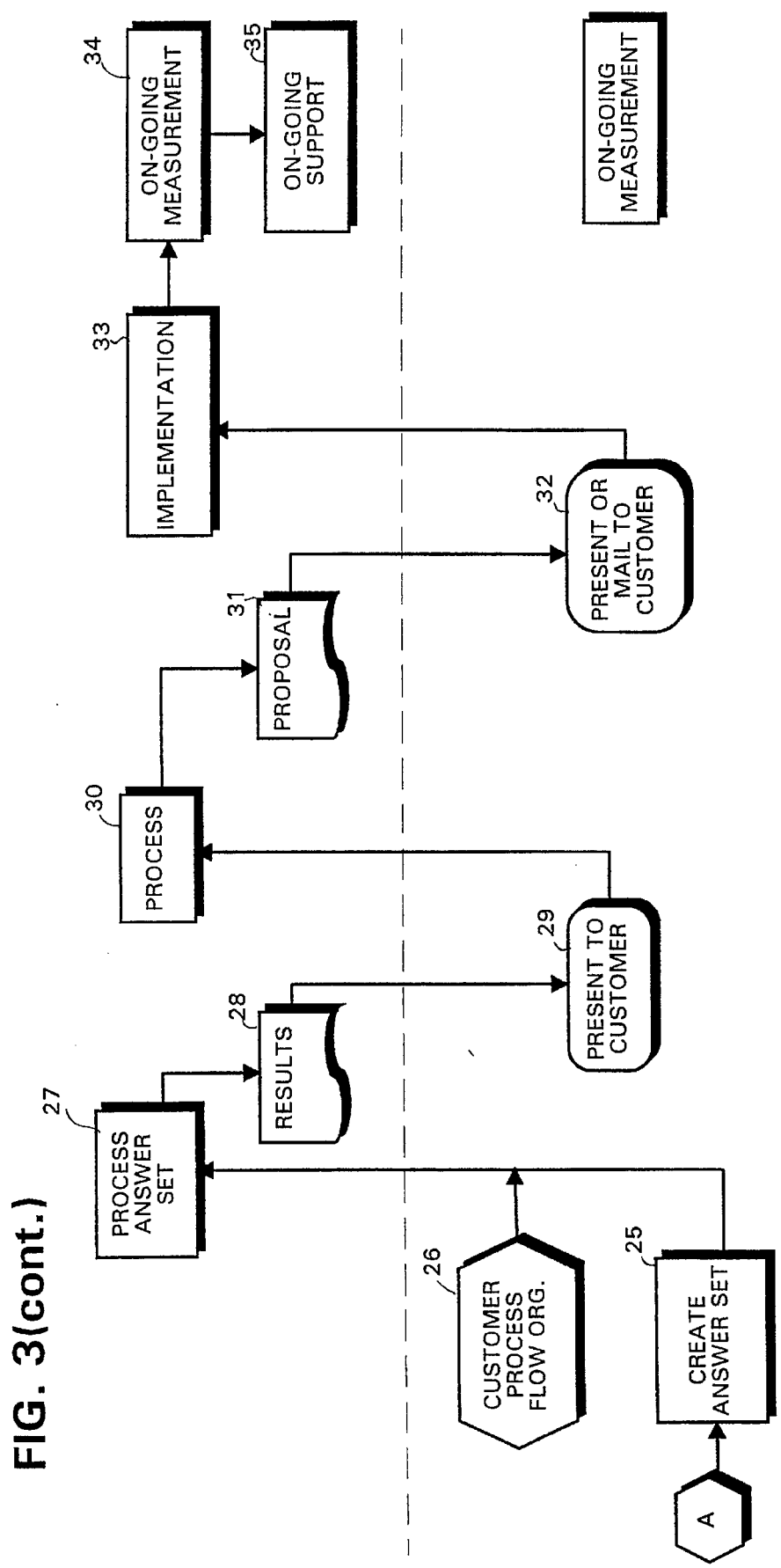

FIG. 3 schematically illustrates the dam processing system designed to improve the management of goods and service fulfillment capabilities and to implement and coordinate a goods and service account evaluation. In the following detailed description the invention will be described specifically with respect to paper and electronic business forms goods and services, but it is to be understood that the invention is also applicable to the supply of other services and/or goods. The data processing system illustrated in FIG. 3 allows a quantitative evaluation of potential goods and/or services supply contracts to determine how worthwhile the contracts might be, and to assist in obtaining and pricing the contracts. In the following description of the system of FIG. 3 it is noted that the rectangular boxes in FIG. 3 indicate processing steps, the hexagon indicates additional software packages which may be used for input to resolve specific problems, the flattened circles are customer interaction boxes, while the rectangular boxes with curved bottoms indicate hard copy printout of data.

On the left of FIG. 3 is the initial customer assessment "module" in which an appropriate question set is created as indicated by 15. A potential customer is then interviewed as indicated at 16, the customer's responses to the questions being inputted into the lap top computer 1, and an answer set is created as indicated at 17. The answer set is transmitted to the second computer 3, and as indicated by box 18 in FIG. 3 the answer set is scored and processed. Printouts are provided, typically in two different forms. The printout 19 is a graphical printout and representation which provides information necessary for evaluation in very readily human readable form on a piece of sheet material, typically paper or transparencies. Other analysis—typically in word (narrative) form—is printed out as indicated at 20.

The printouts from 19, 20 are presented to the potential customer as indicated at 21 and assuming the customer "buys in" at that stage, comprehensive operational analysis then is performed in another module located in the center in FIG. 3. The answer set is further processed as indicated at 22, and detailed discovery questions are printed out as indicated at 23. The customer is interviewed again as indicated at 24, a further answer set created as indicated at 25, and utilizing the data typically from other software packages, customer process information is inputted as indicated at 26, and the more detailed answer set then processed as indicated at 27.

The results printed out at 28 include overheads, financials, answers, current/future operations, tables/graphs, implementation work sheets, measurement of various values, etc. All of this data is then again presented to the customer as indicated at 29, further processed at 30, and a detailed proposal 31 printed out. The detailed proposal 31 is presented or transmitted to the customer as indicated at 32. Assuming acceptance by the customer of the presented contract, the contract for the supply of goods and/or services may then be implemented.

Indicated on the right hand side of FIG. 3 is the implementation module. Ongoing evaluation takes place during performance of the contract, after initial implementation at 33, the ongoing measurement indicated at 34 being used to determine what operational changes are required in the customer's business, and suitable ongoing support is provided as indicated at 35. Utilizing all of the data from implementation, which includes re-evaluation of essentially the same questions originally propounded in the initial customer assessment, the supplier's (user's) ability to implement cost-saving solutions is evaluated.

Figure 4A:
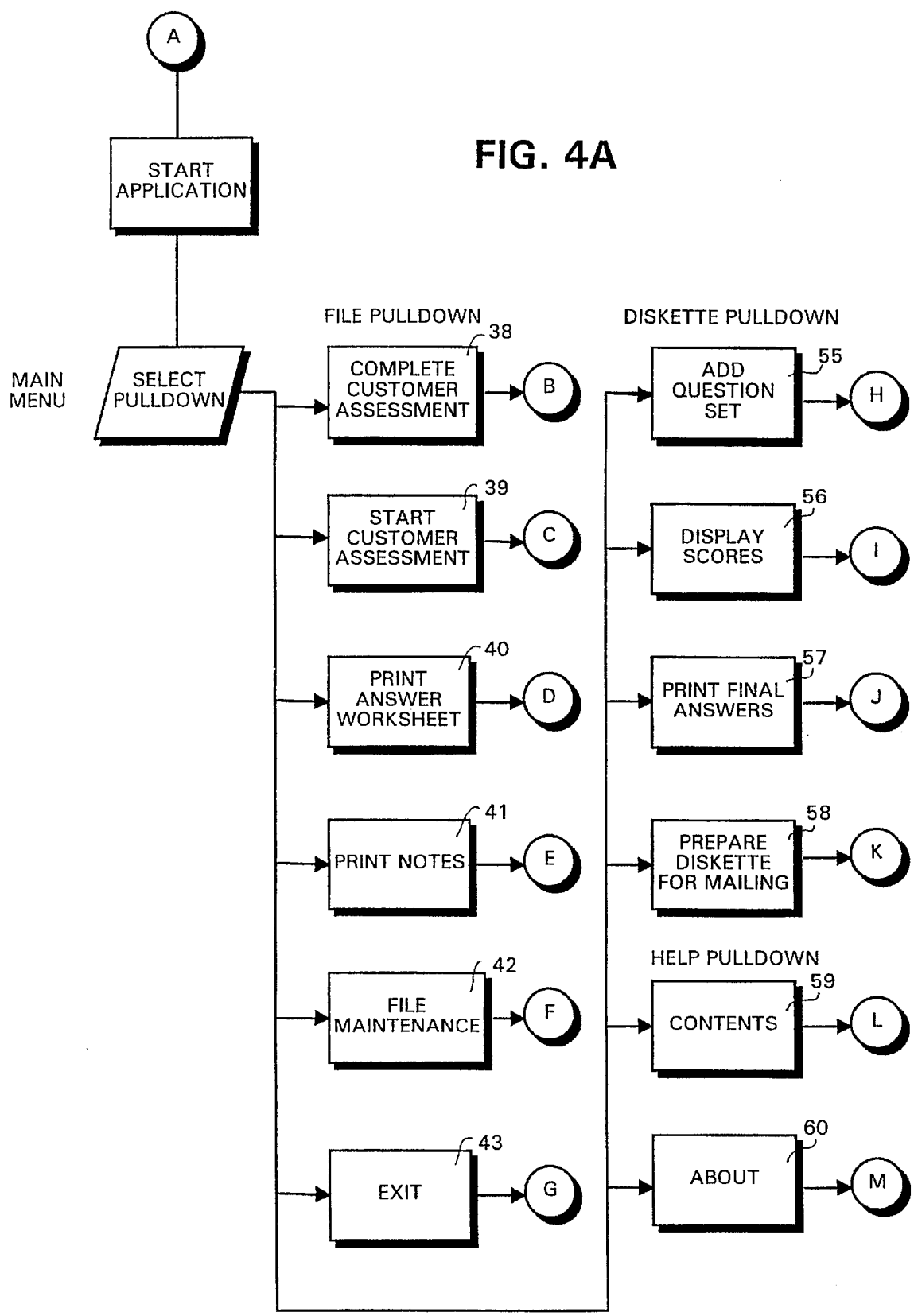
FIGS. 4A–4R are high level flow sheets showing various exemplary routines and sub-routines for use with the field unit of the invention, for practicing field unit routines.
Figure 4B:
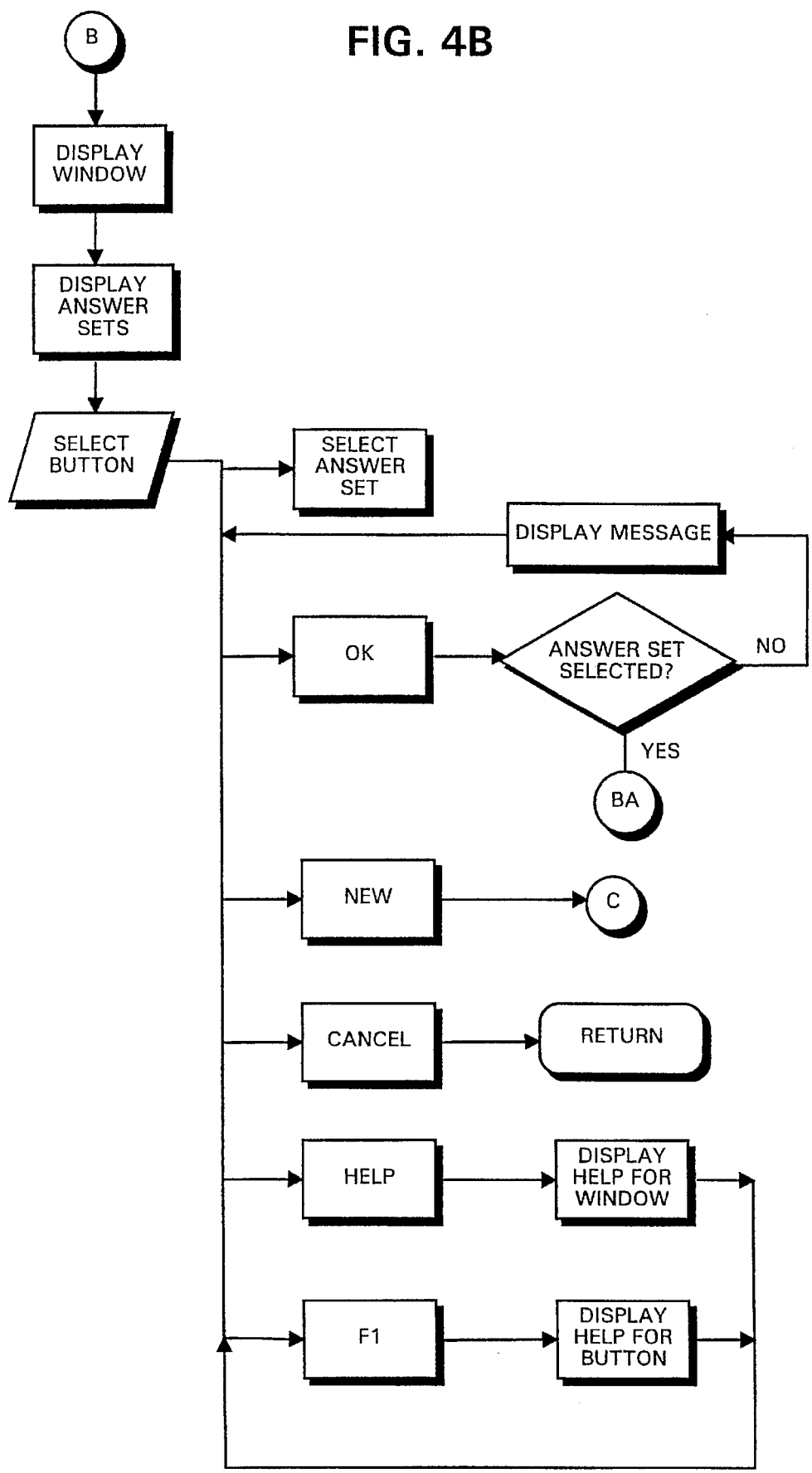
Figure 4C:
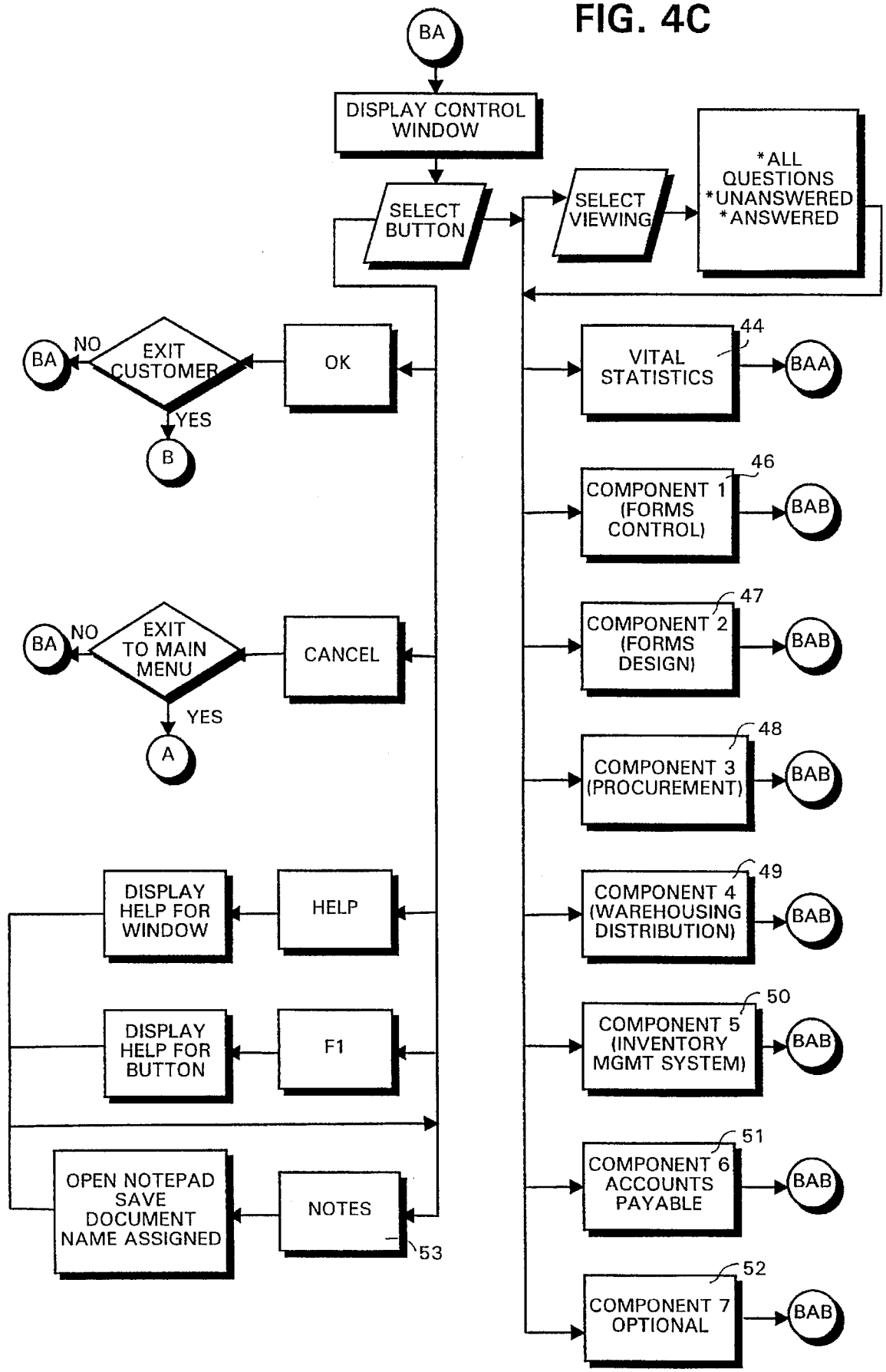
Figures 1, 4D:
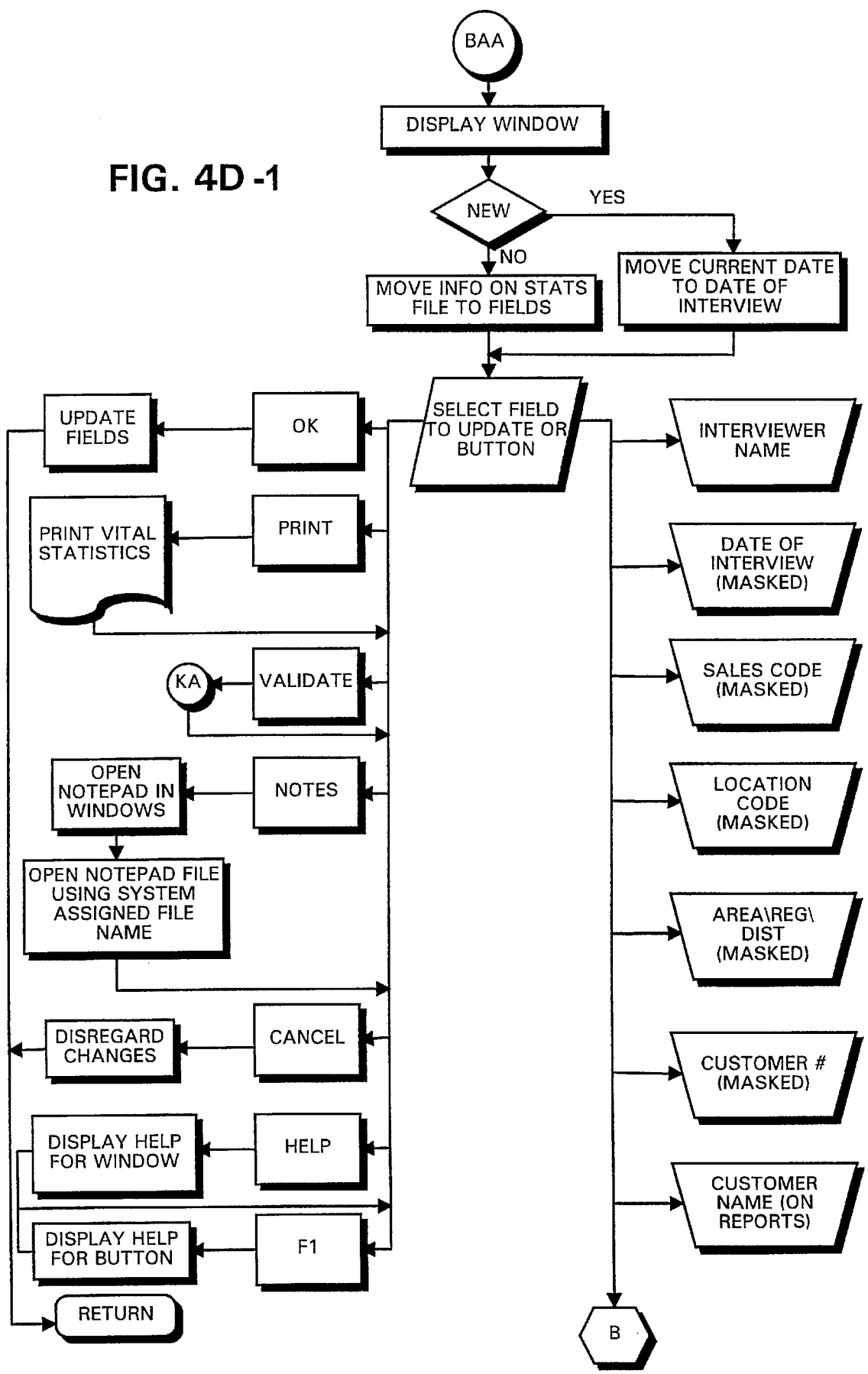
Figures 2, 4D:
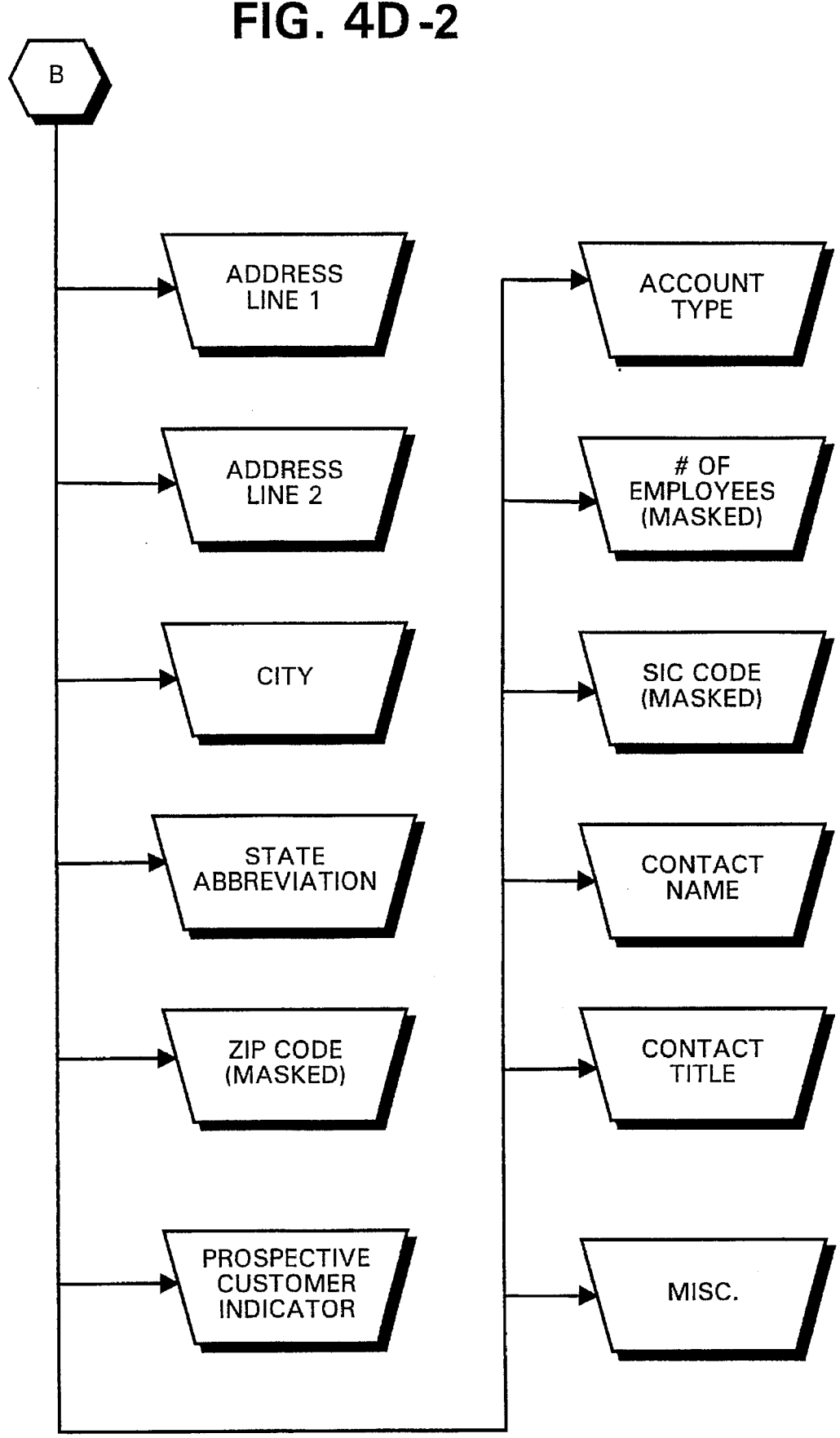
Figures 1, 4E:
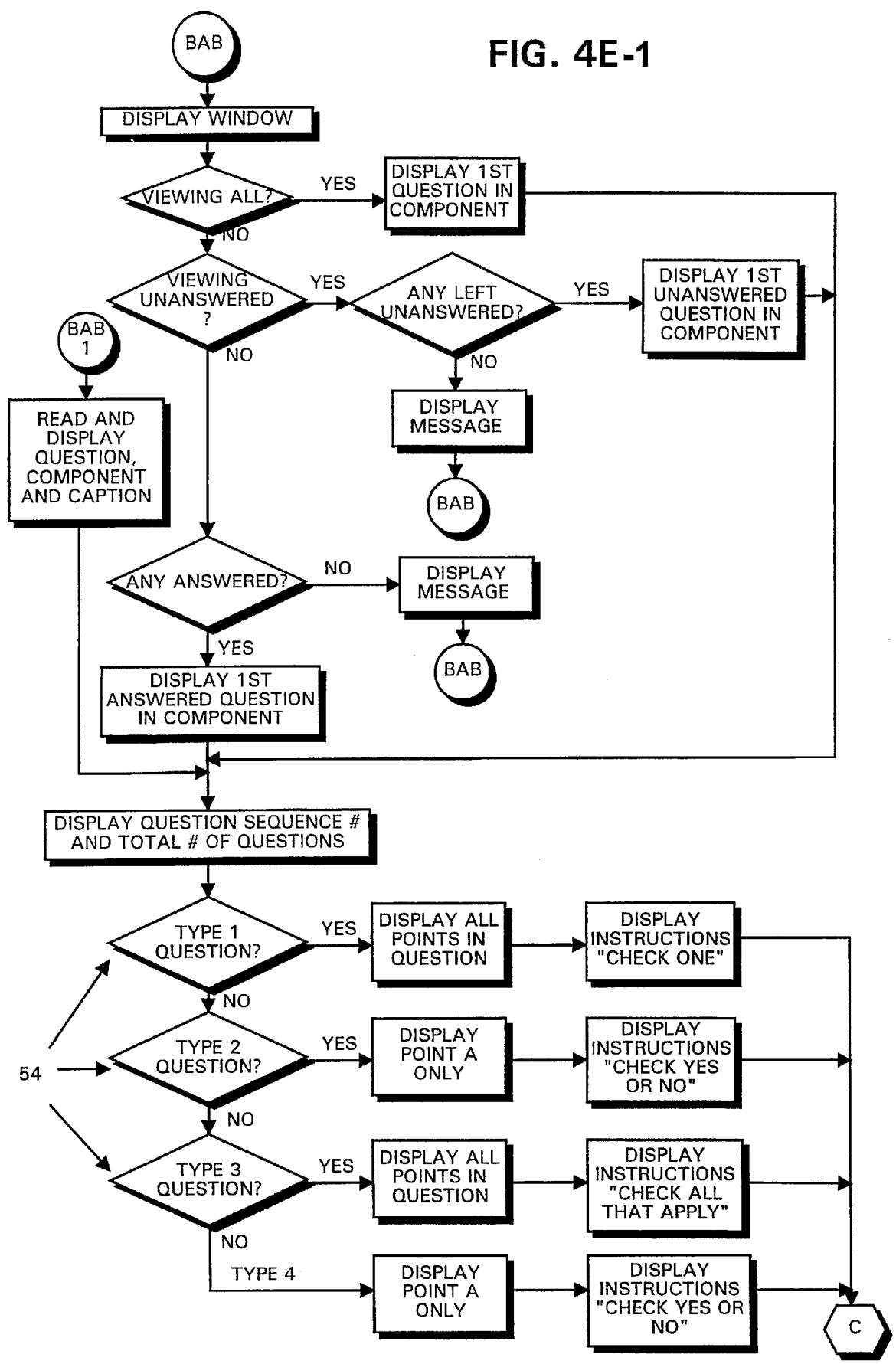
Figures 2, 4E:
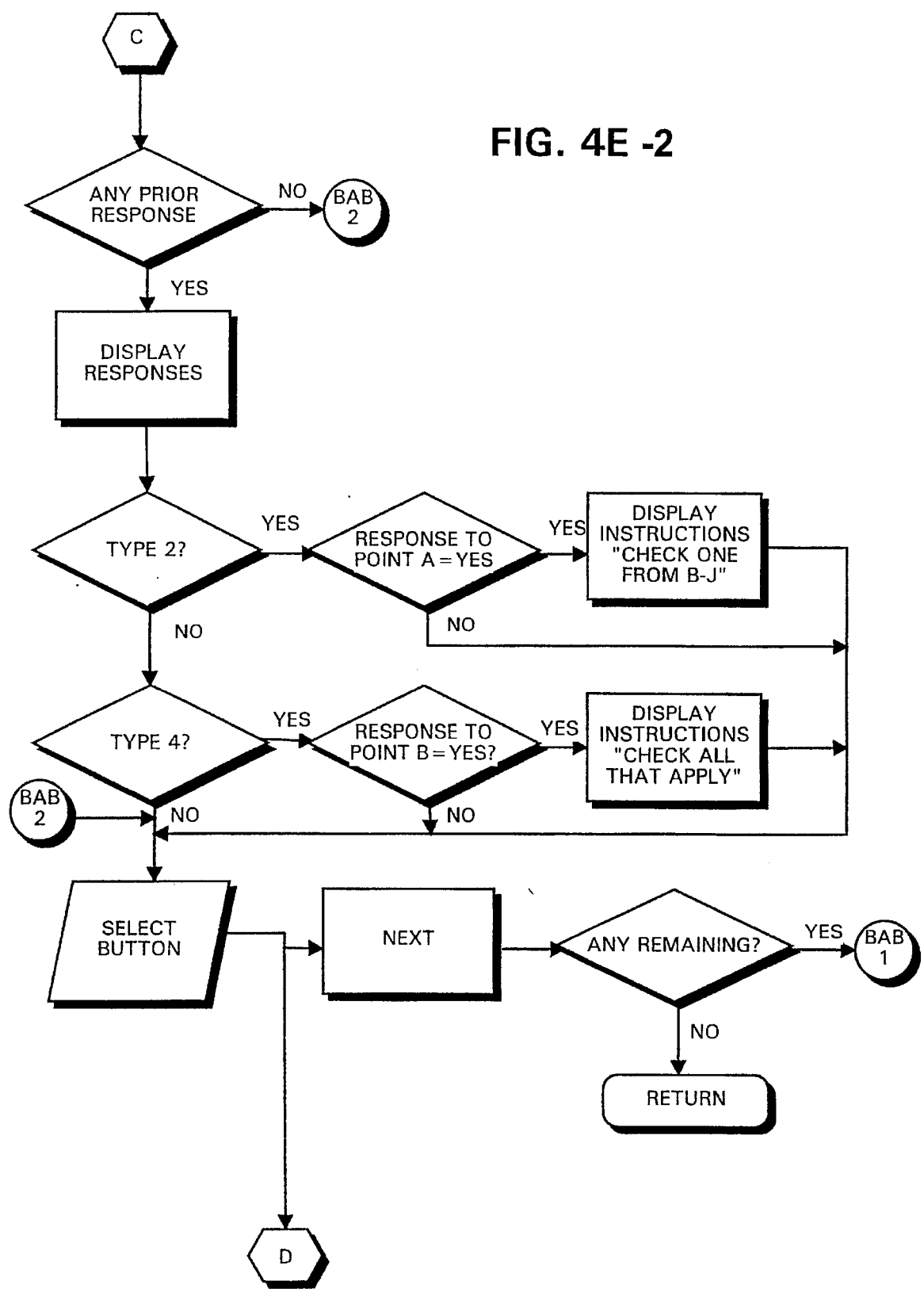
Figures 3, 4E:
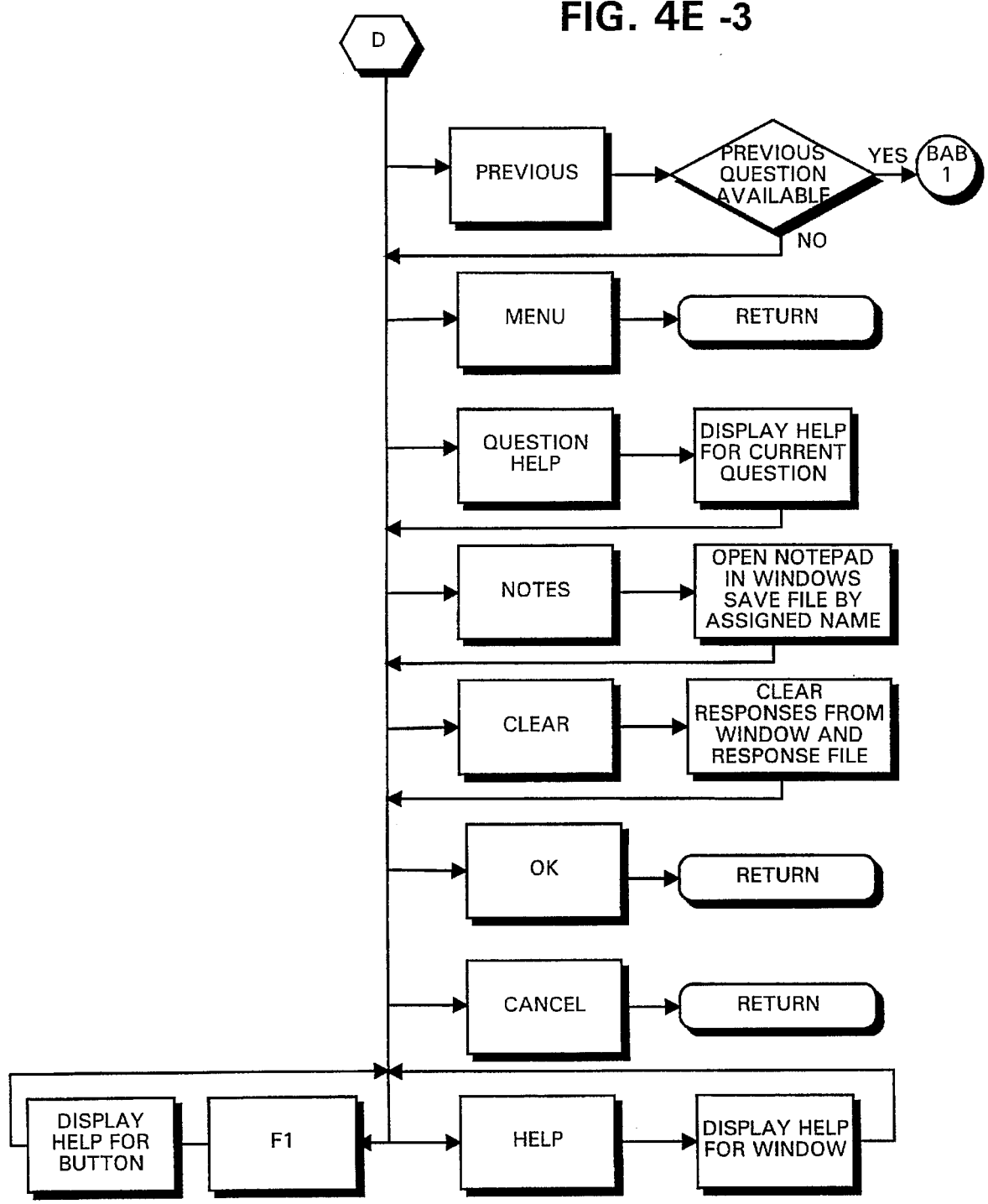
Figure 4F:
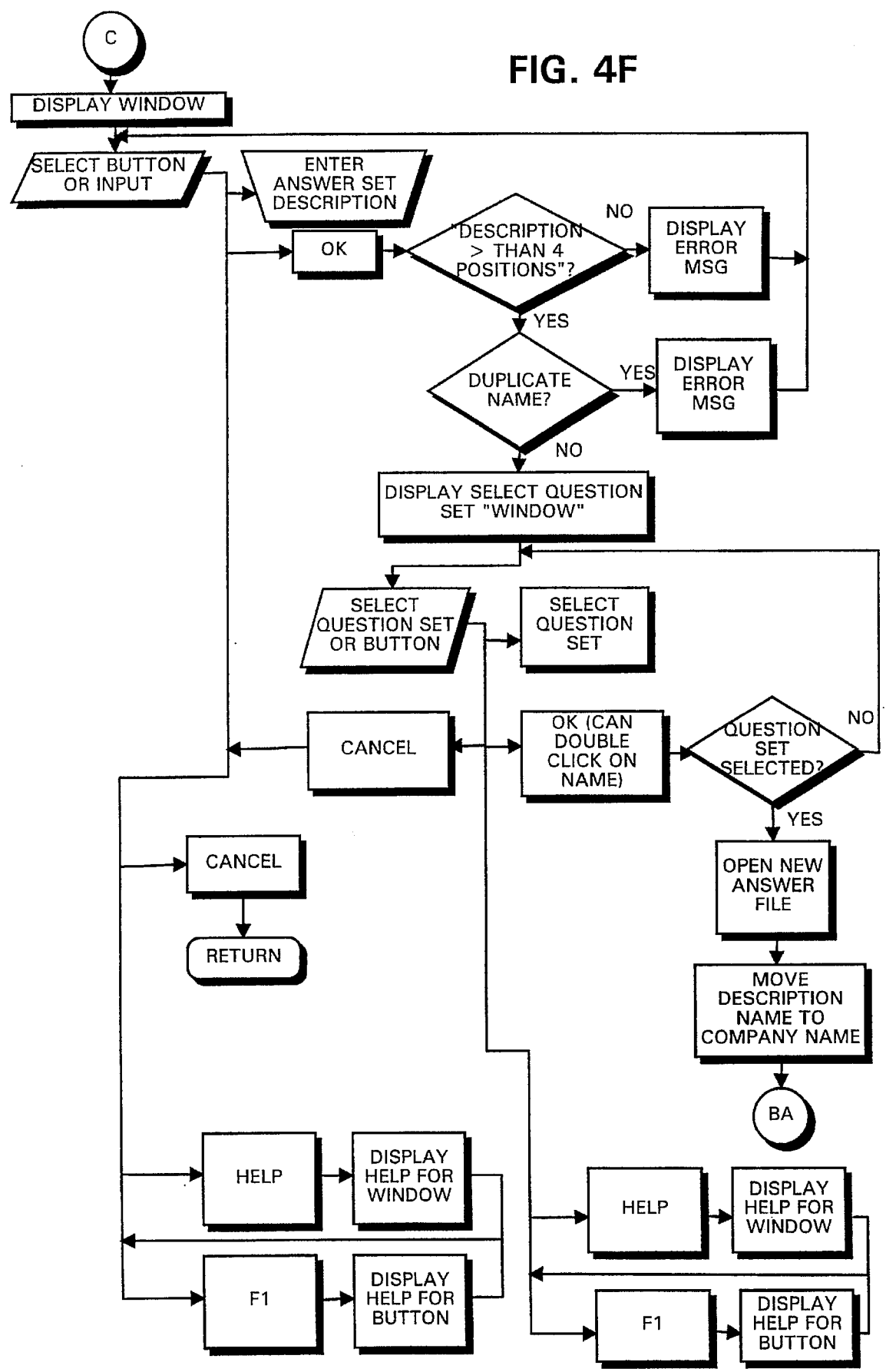
Figure 4:
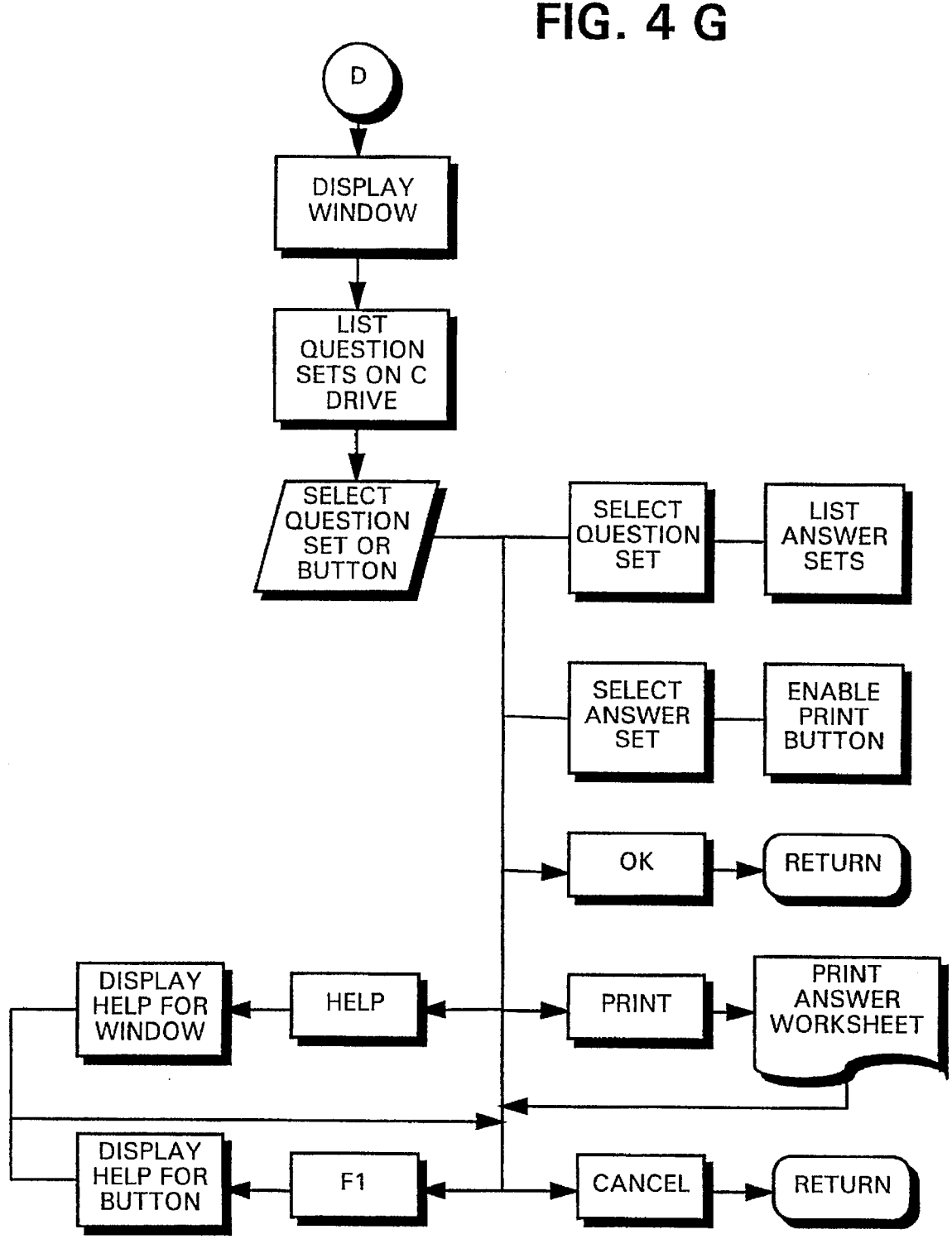
Figure 4H:
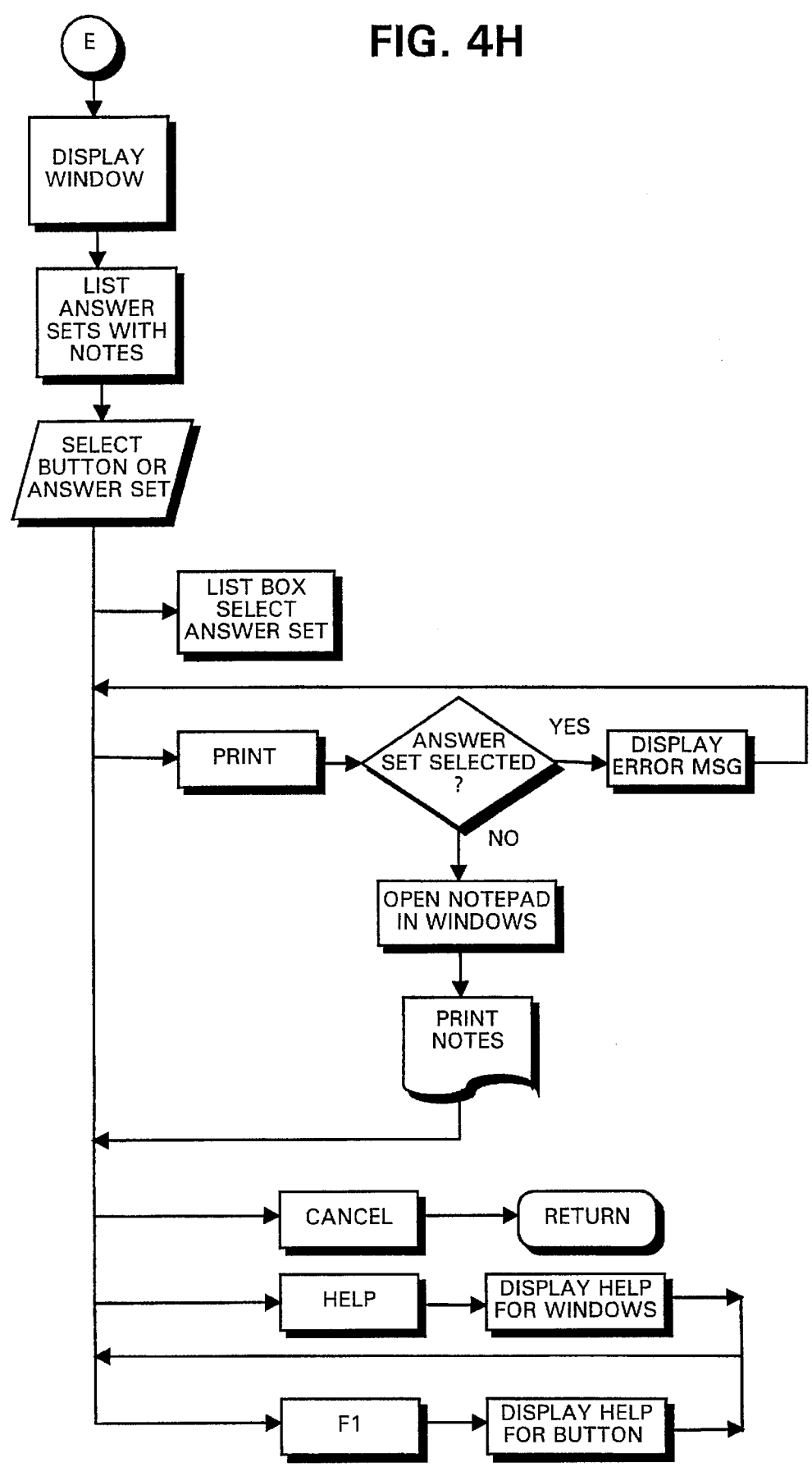
Figures 1, 41:
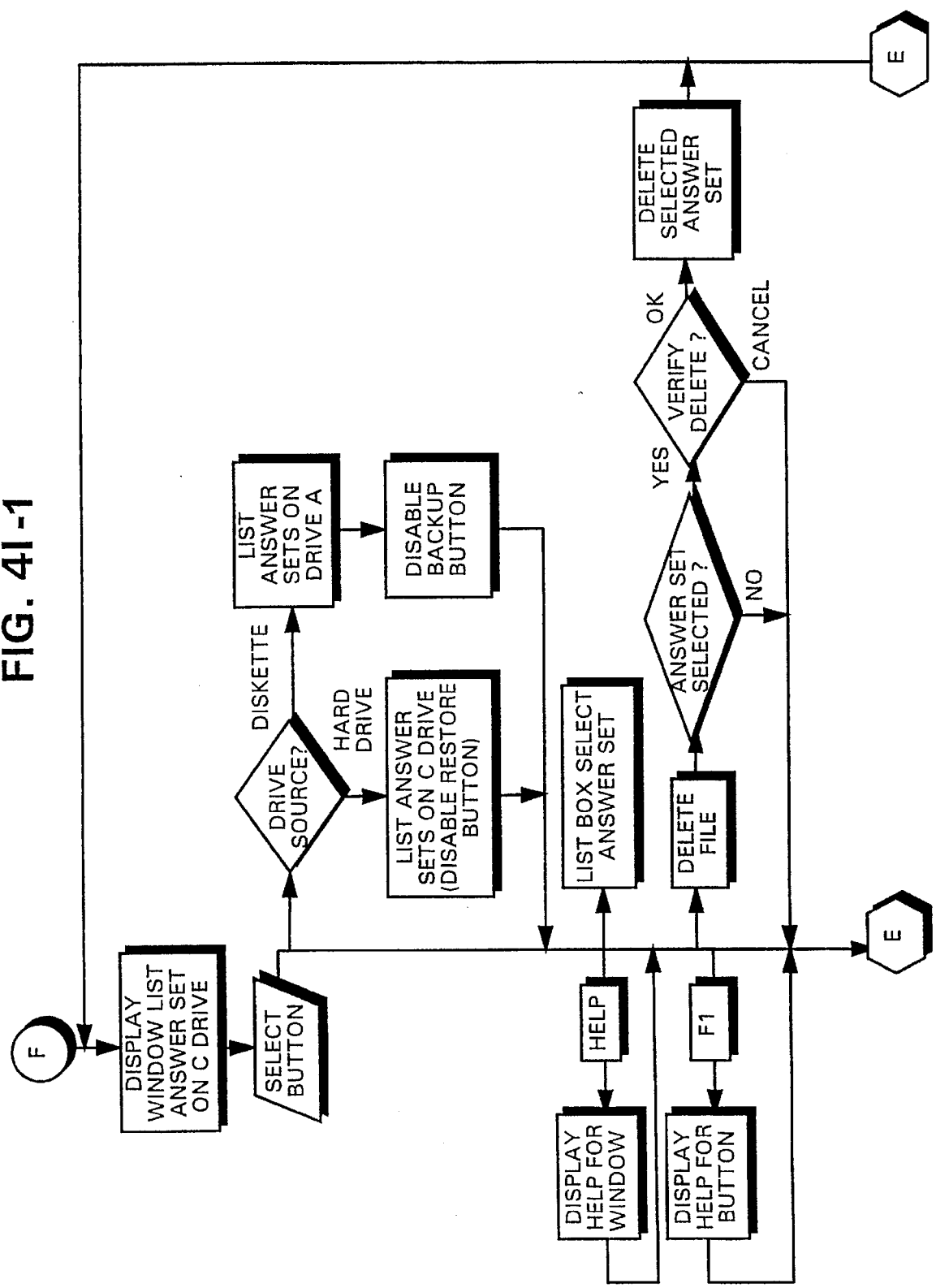
Figures 2, 4I:
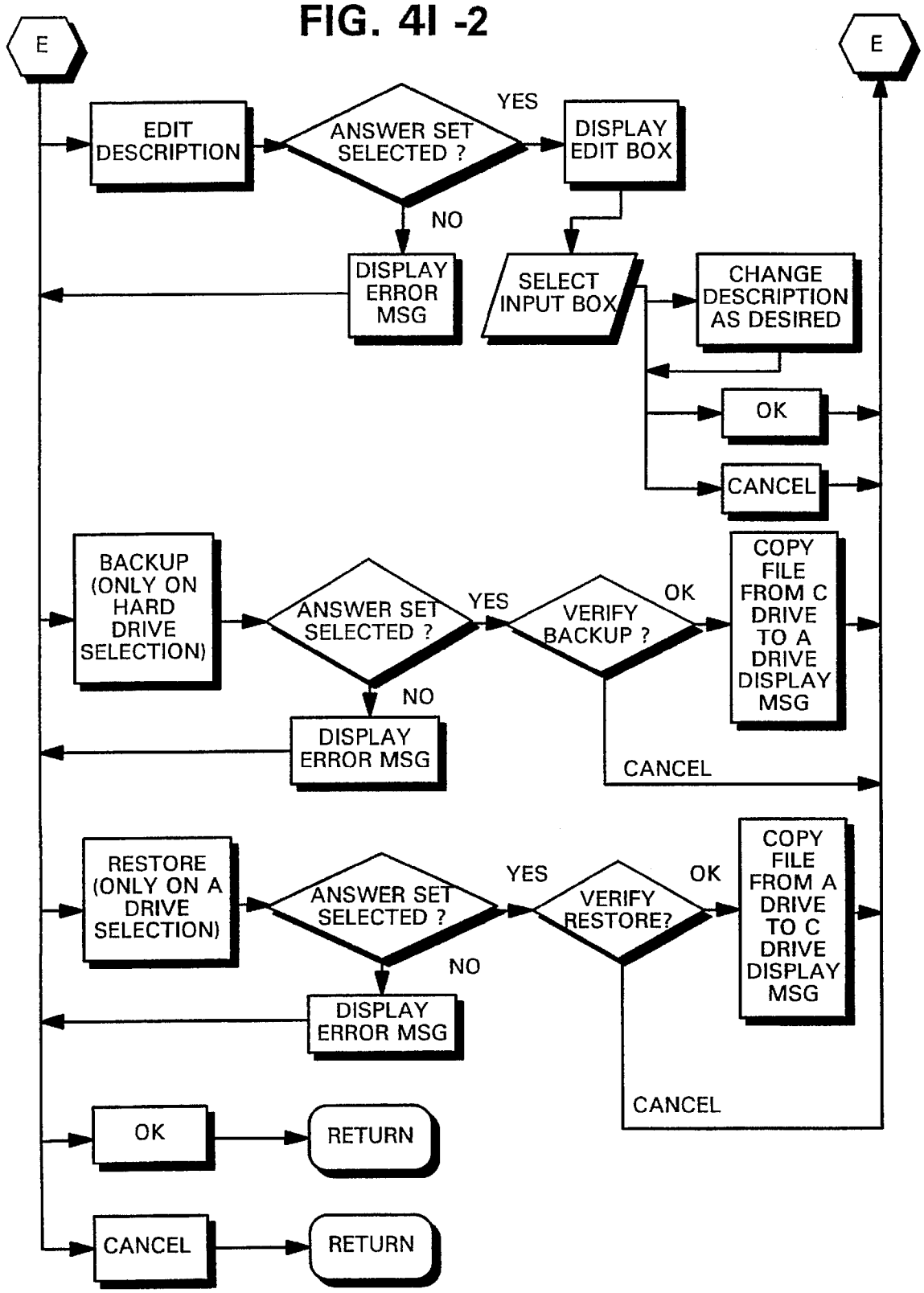
Figure 4J:
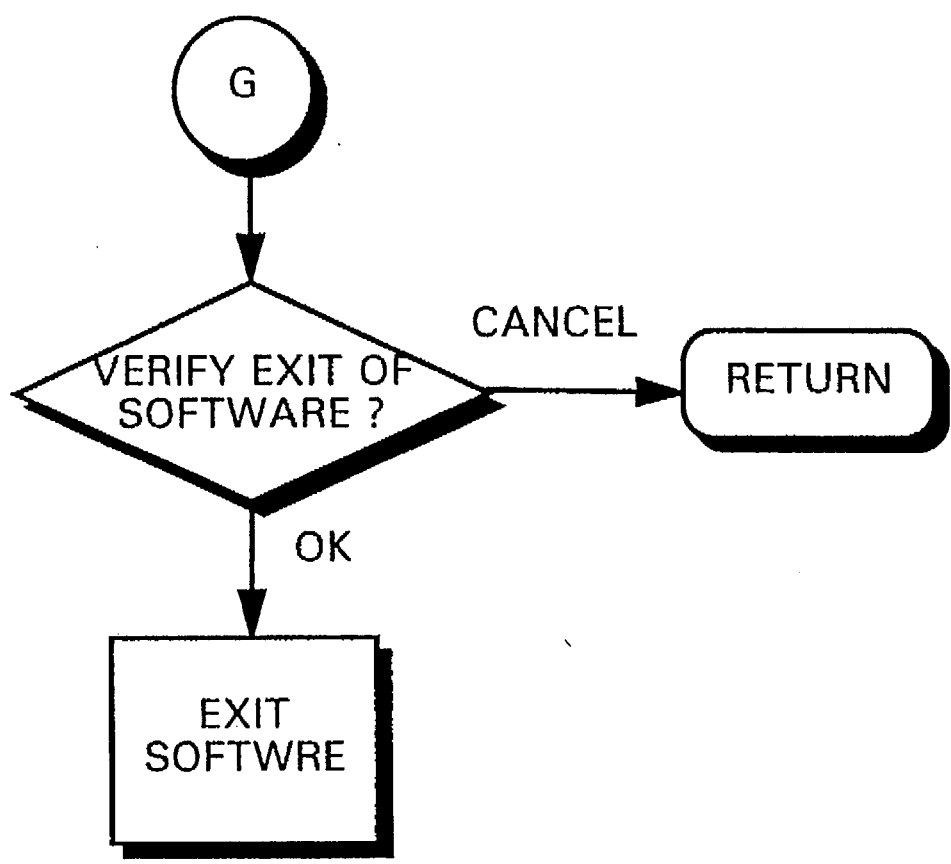
Figure 4K:
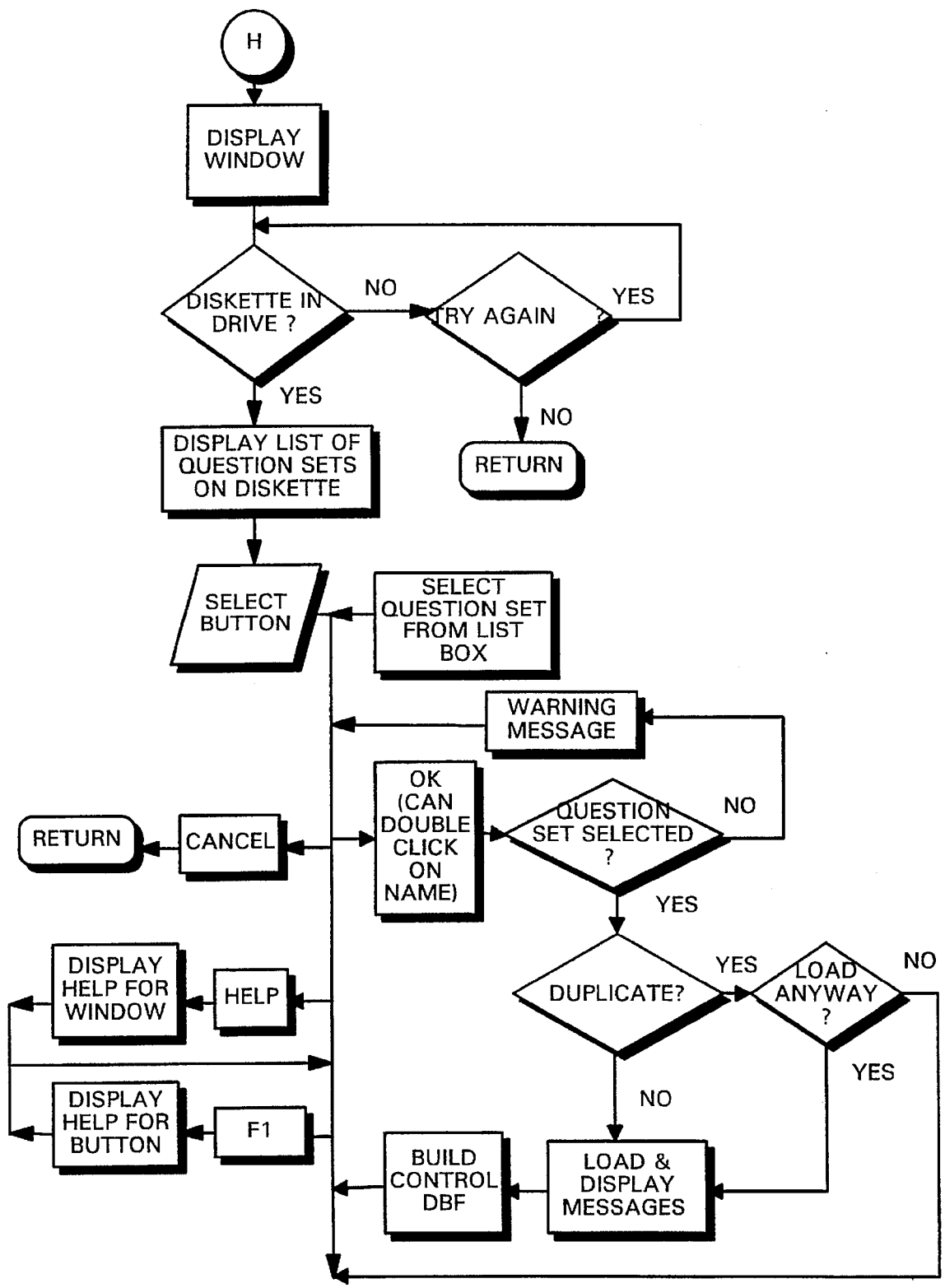
Figure 4L:
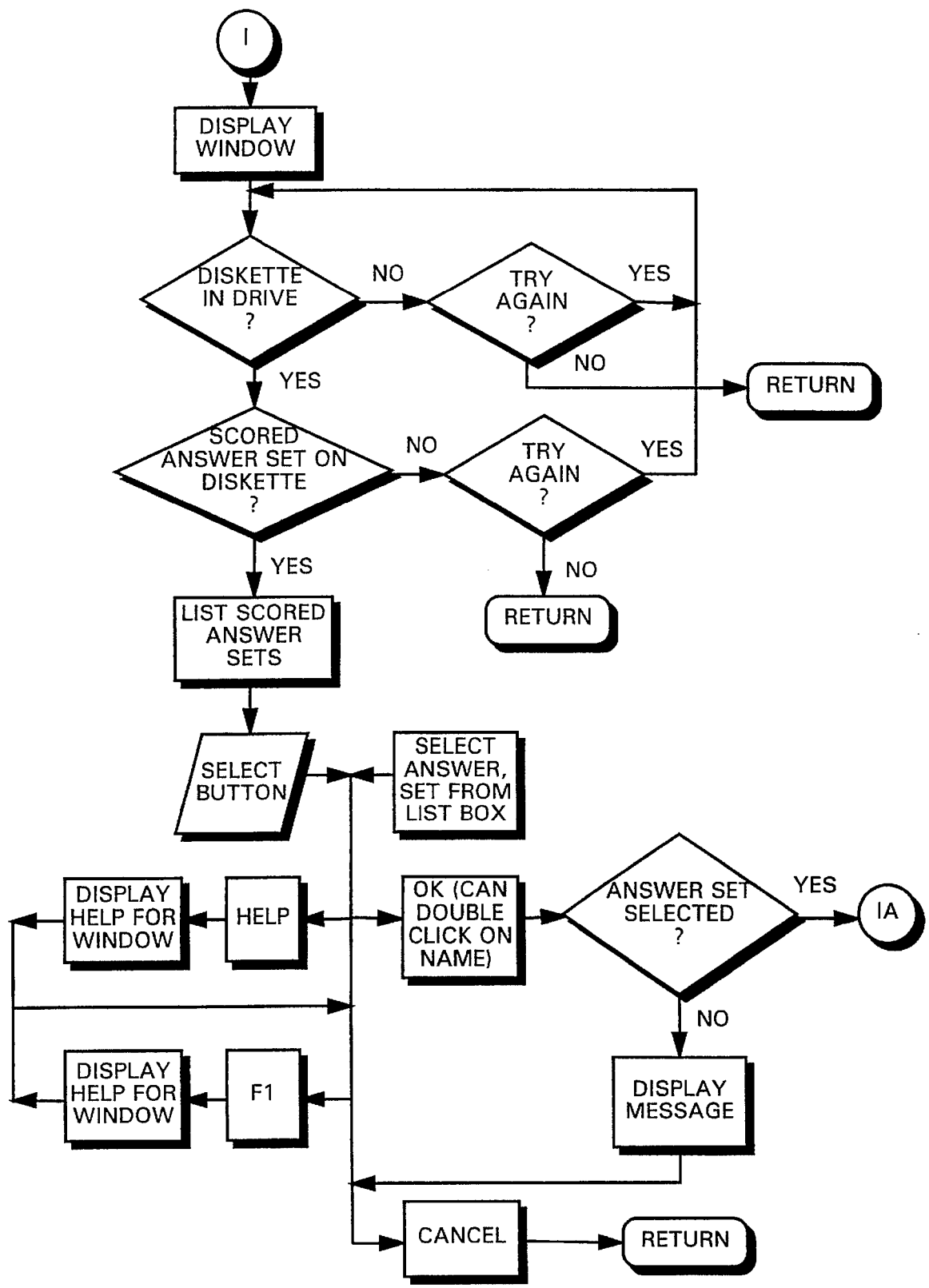
Figure 4M:
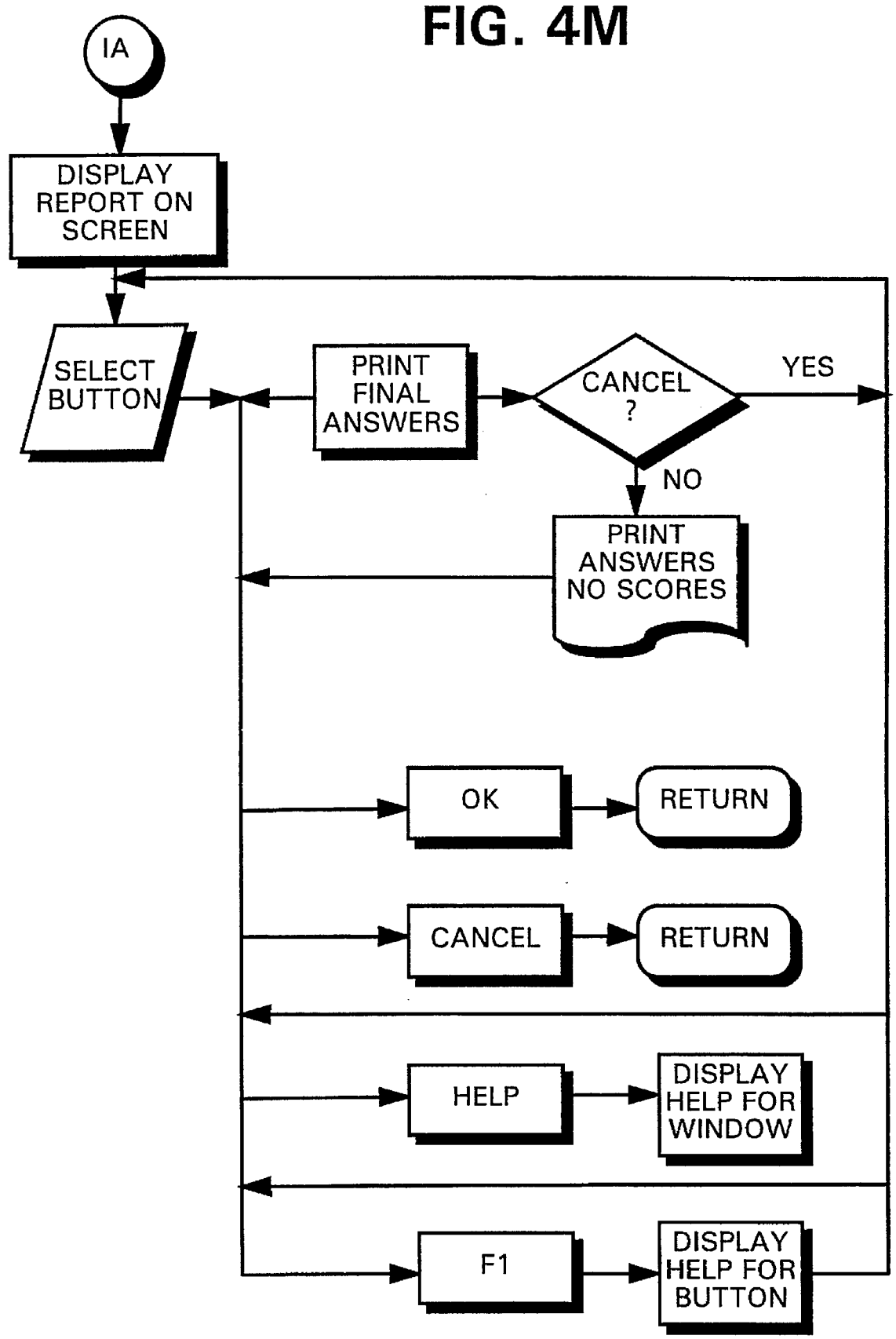
Figure 4N:
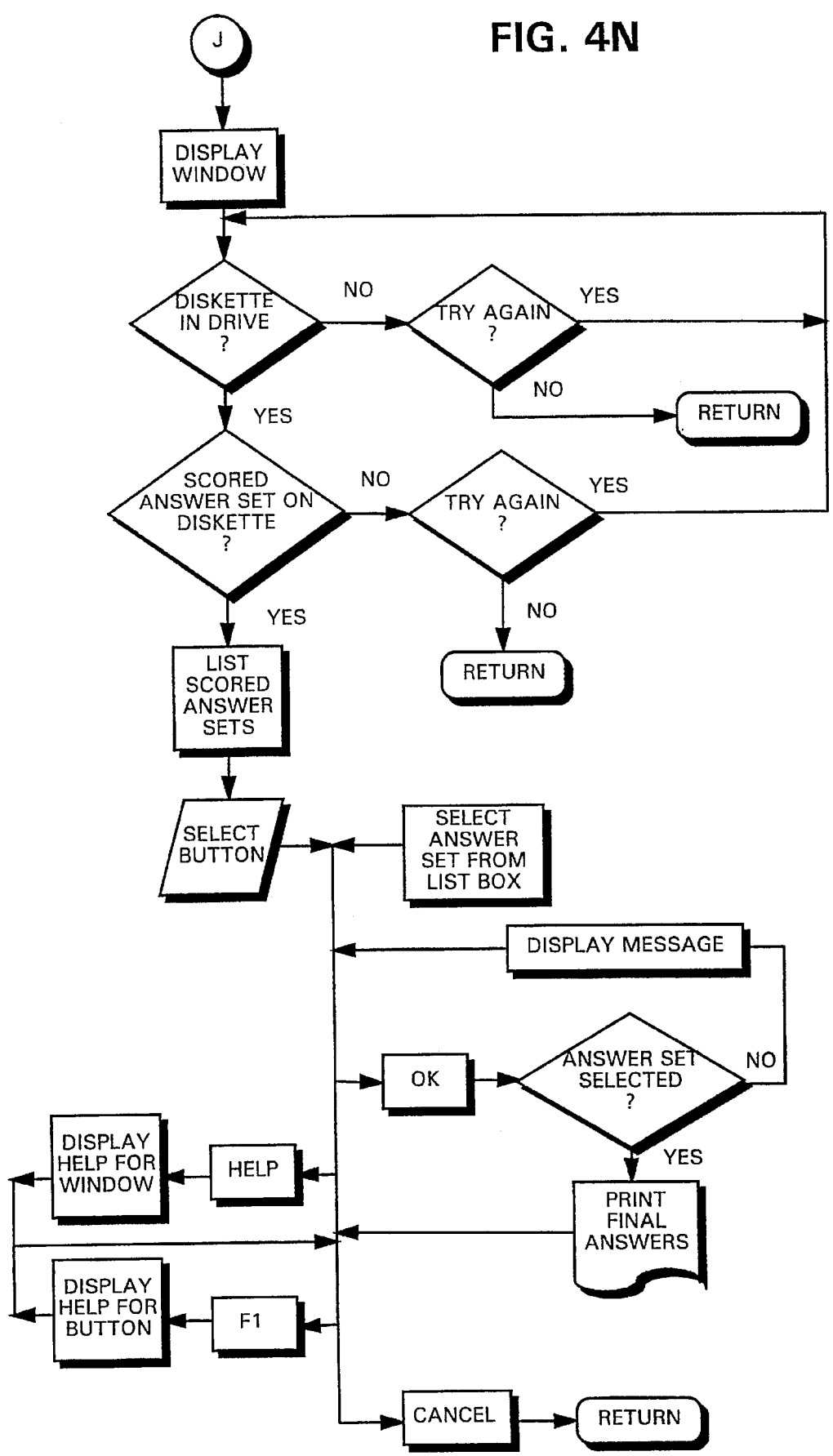
Figure 40:
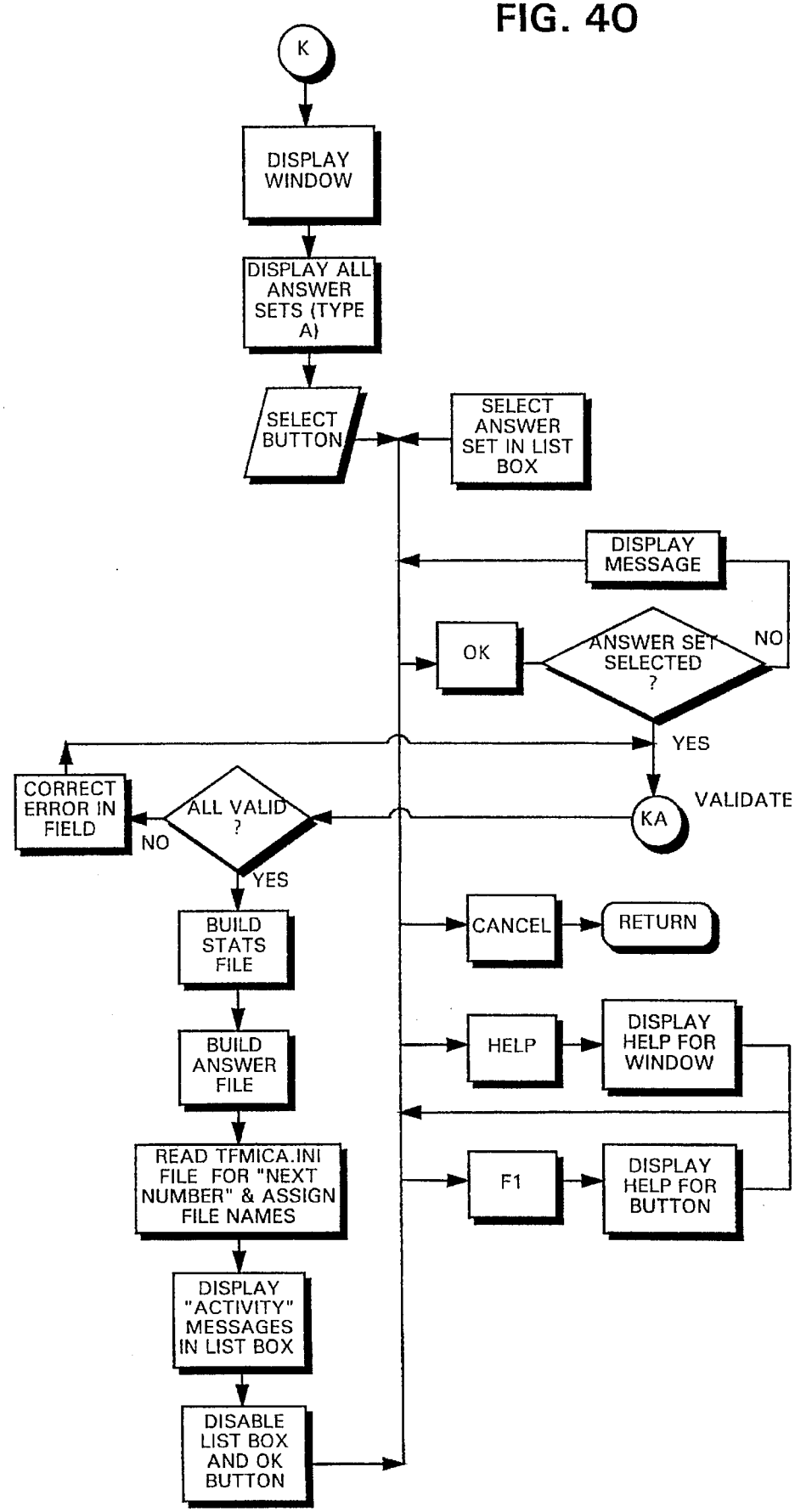
Figures 1, 4P:
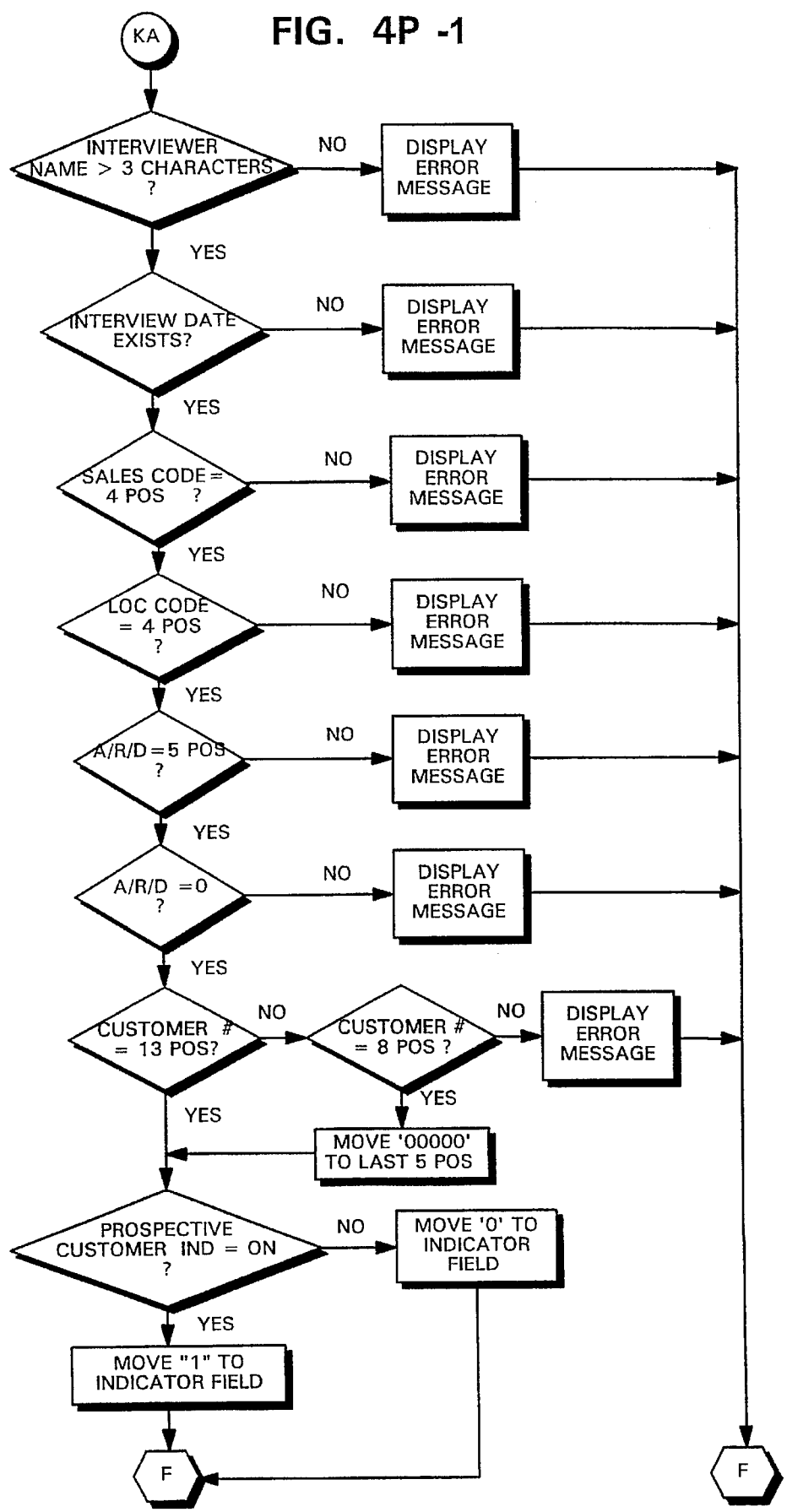
Figures 2, 4P:
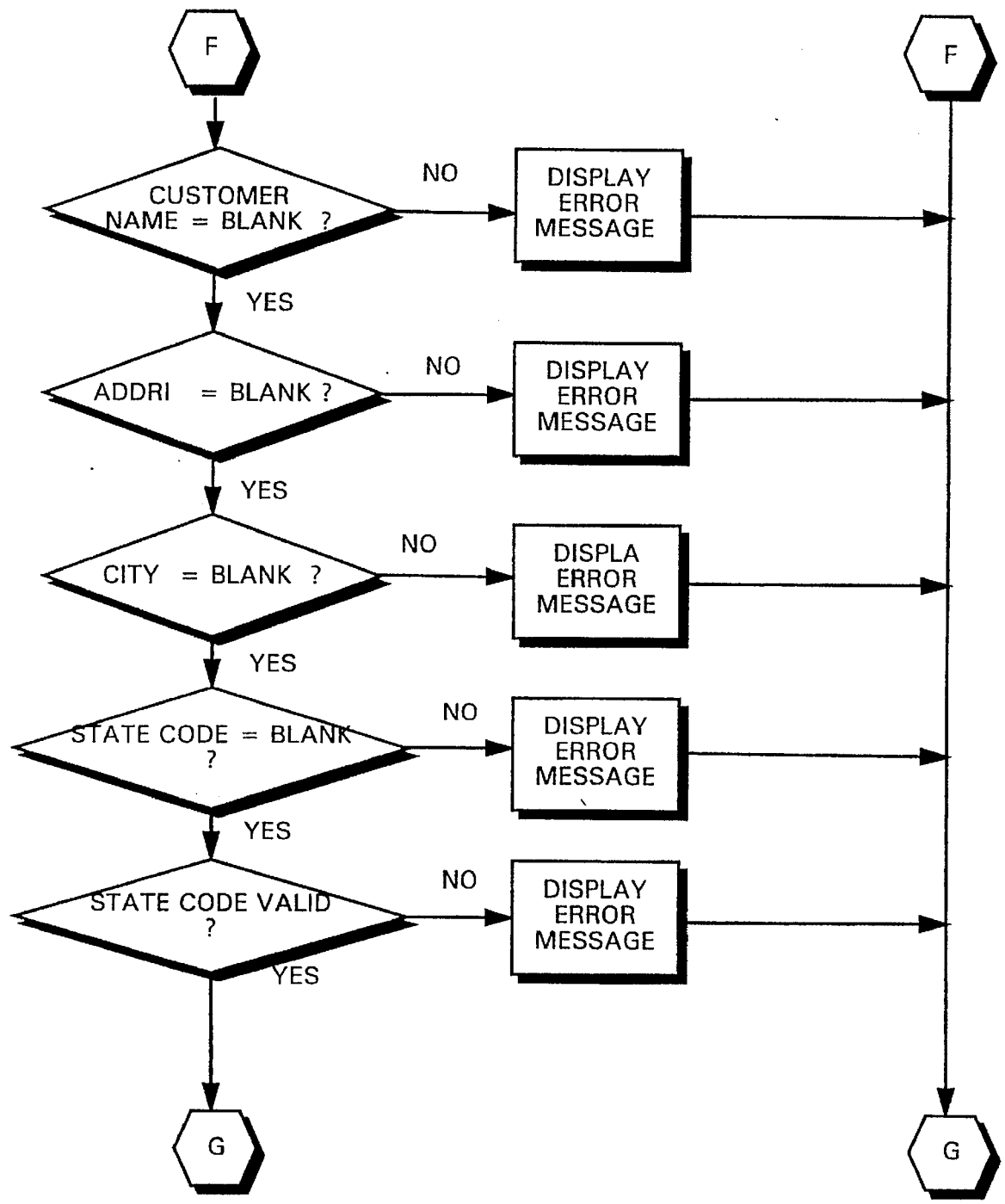
Figures 3, 4P:
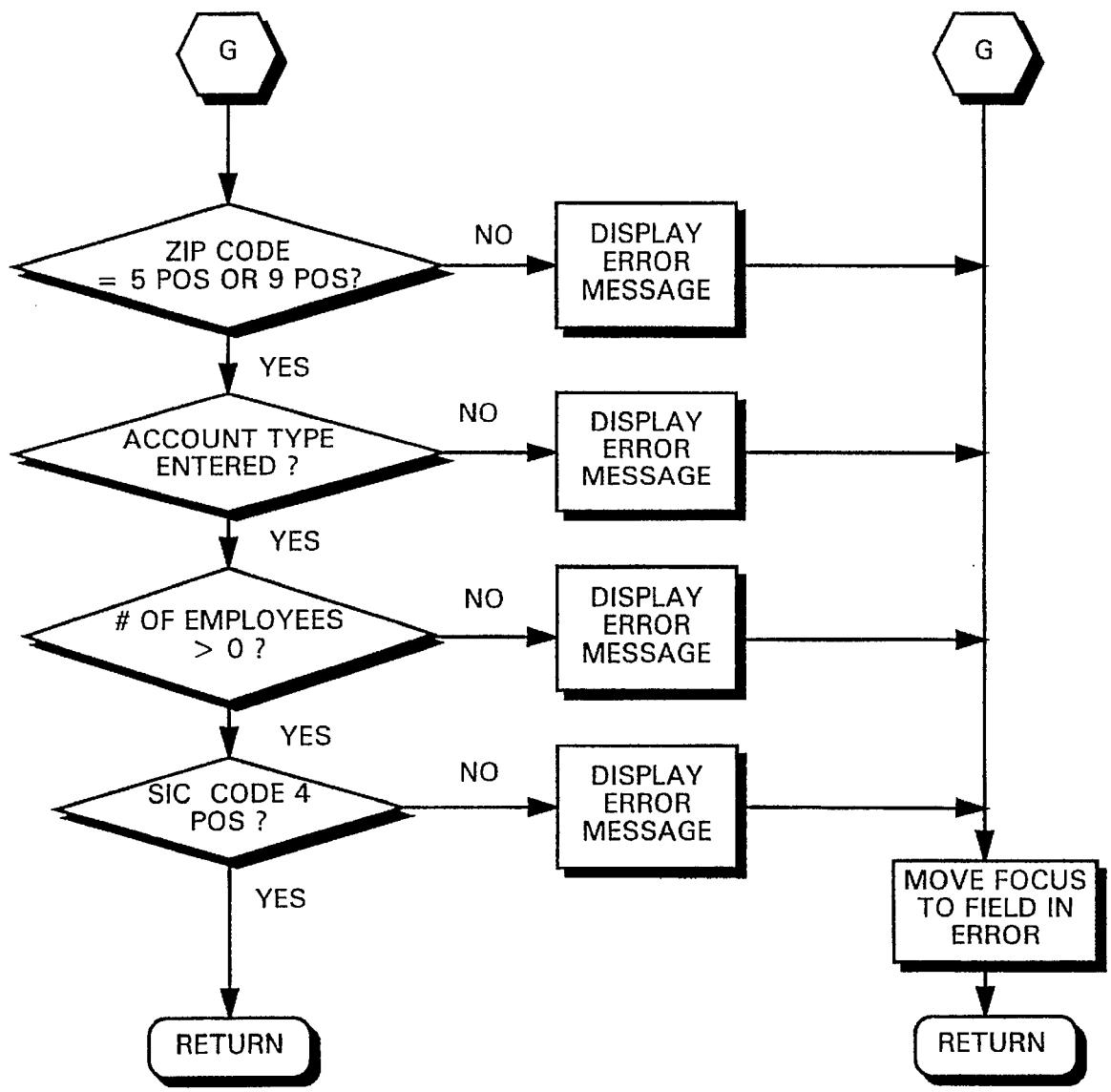
Figure 4Q:
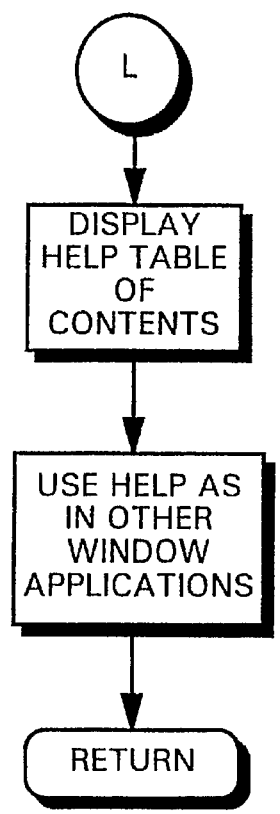
Figure 4R:
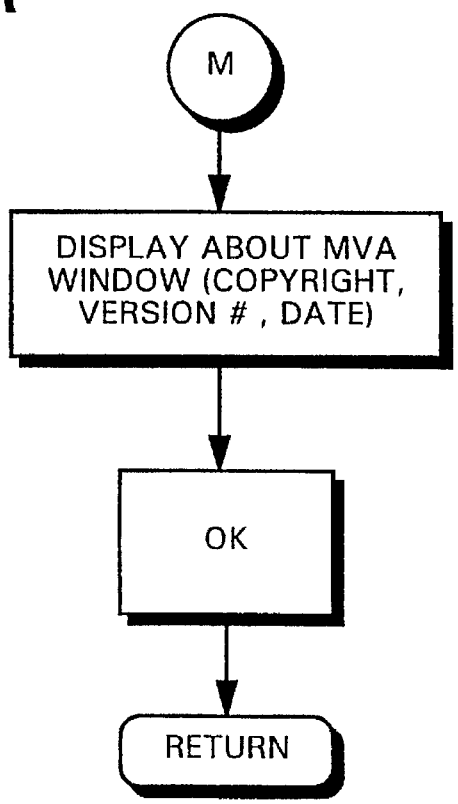

FIGS. 4A–4R are high level flow charts indicating how field units—such as the lap top computer 1—can be utilized to start the evaluation process, while FIGS. 5A through 5E show some of the "screens" that may appear on the computer screen/monitor 6 during practice of the invention.

Operation of the first computer 1 in accordance with the method of the invention may be instituted by "clicking" on the main icon, and then subsequently clicking on in the group window, as is conventional in initiating computer 1 operation. In the description that follows it is assumed that the "Windows" background software is utilized, and the screens of FIGS. 5A–5E are in "Windows" format, however other systems could also be utilized.

Figure 5A:
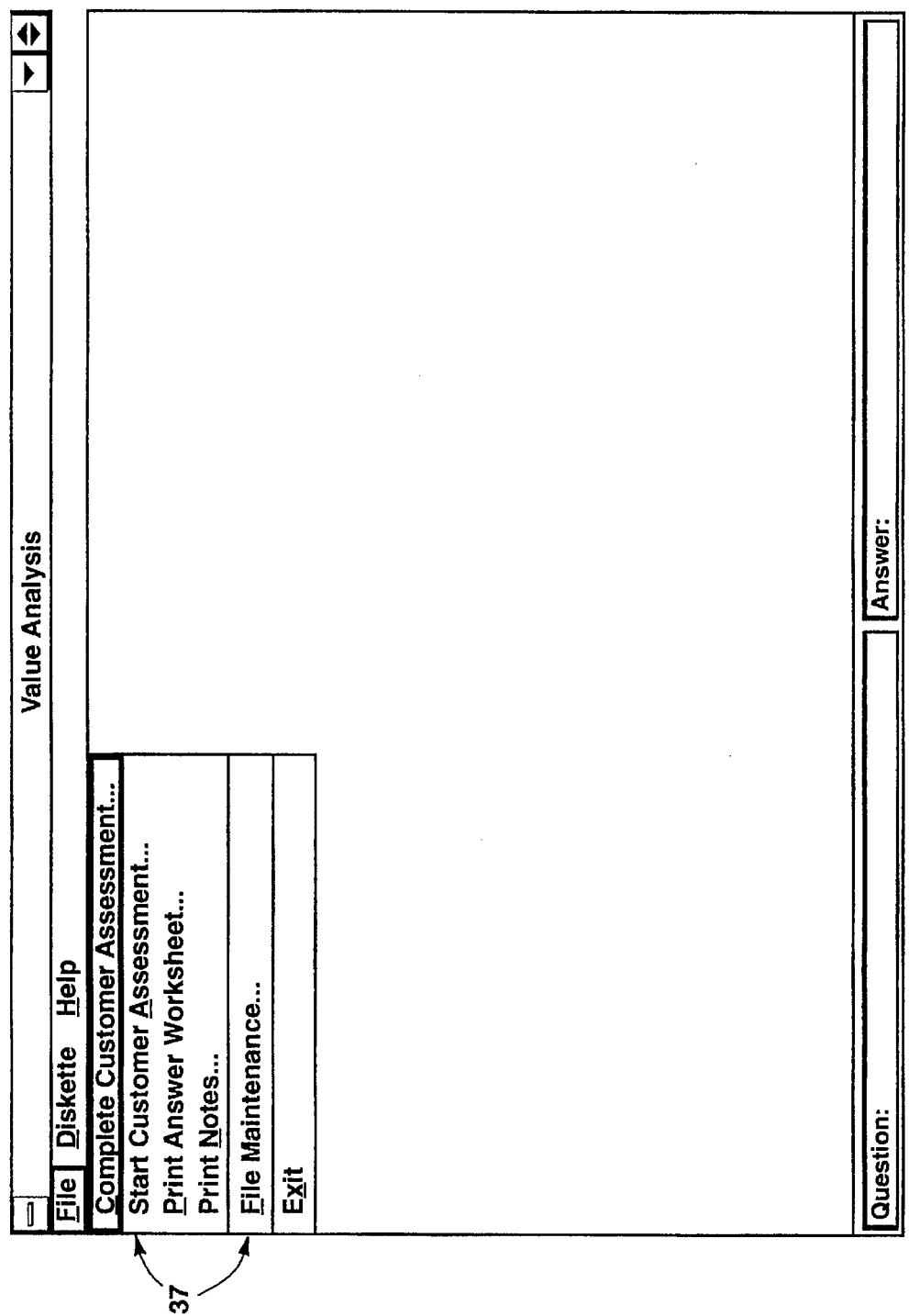
FIGS. 5A–5E are schematics of exemplary computer screens utilizable to facilitate practice of various routines and sub-routines as illustrated by some of the flow sheets of FIGS. 4A–4R.

A first screen is illustrated in FIG. 5A having three basic groups "file", "diskette", and "help", with the menu items for the "file" group indicated in FIG. 5A. Those menu items, indicated generally by reference numeral 37 in FIG. 5A are indicated by boxes 38–43 in FIG. 4A, with the detail described in other flow sheets as indicated by the letters with surrounding circles (e.g. FIG. 4B showing the "B" flow sheet which indicates the detailed procedures associated with box 38, etc.). The relationships associated with the main menu of FIGS. 4A and 5A have been generally earlier described. The question files were created and modified in the second computer 3 and are read-only in the field unit computer 1. The answer files are created in the field unit computer 1 and subsequently transmitted and then scored in the second computer 3.

The logic and relationships for the first menu item, "complete customer assessment" box 38 (the top, highlighted for the purposes of illustration there, item 37 in FIG. 5A) is illustrated in FIG. 4B in the logic of this item.

If an answer set is selected, as indicated by circle "BA" in FIG. 4B, then the procedure illustrated in FIG. 4C, the "initial customer assessment" is implemented. The total number of answered sub-elements divided by the total number of sub-elements gives the percentage processed. System skipped sub-elements are not included in the calculation. All sub-elements will be displayed when processing the question set. One automatically exits a component when using the "next" button part of the keyboard 7 of the computer 1. The display can include all questions, all answered questions, or all unanswered questions, at the user's option.

Figure 5B:
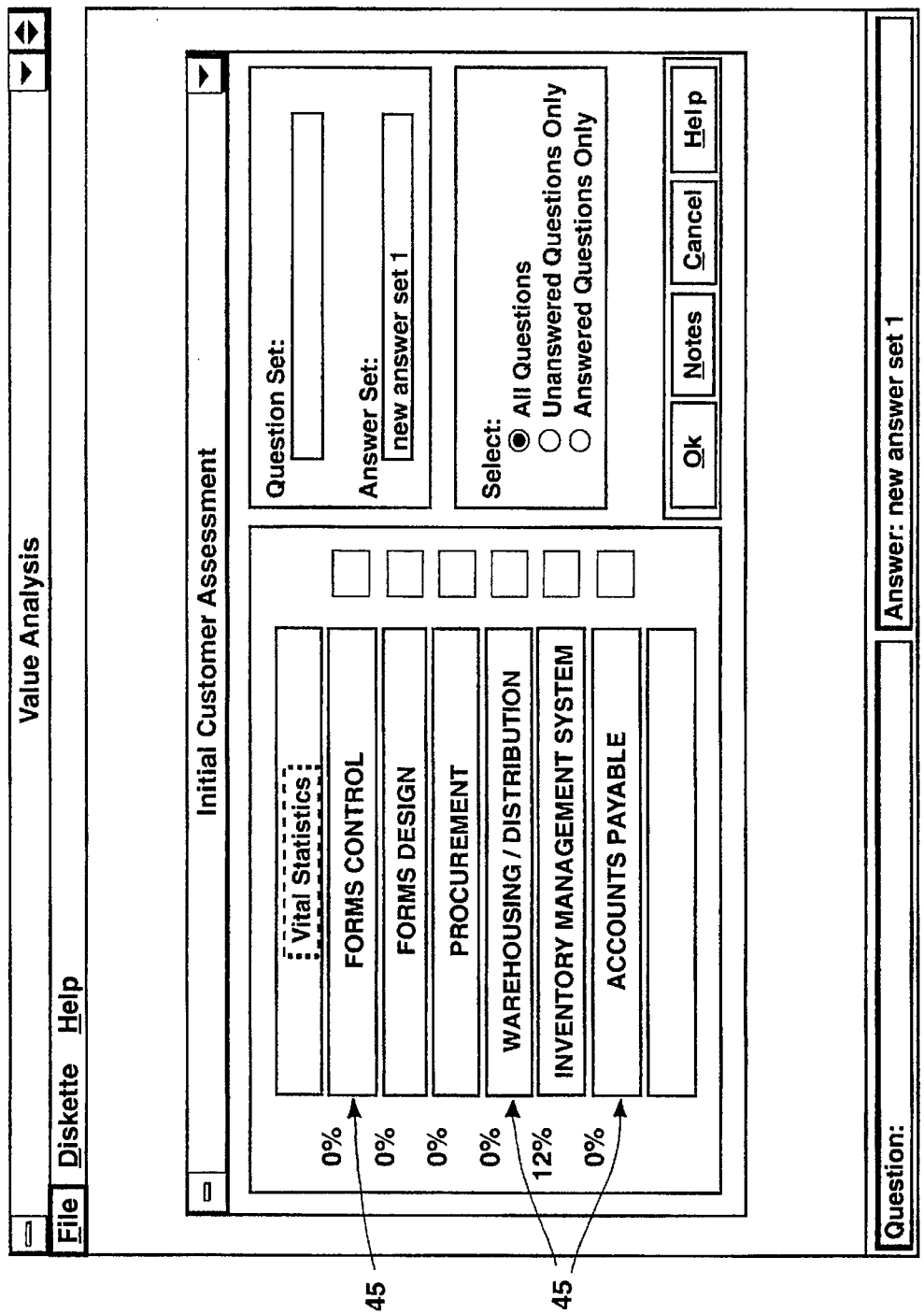

FIG. 5B shows exemplary screen that appears on the monitor 6 associated with the initial customer assessment which includes, in this particular situation, the various main categories. As earlier indicated since the invention is being described with respect to the supply of business forms and related services, most of the categories or "components" illustrated are specifically associated with business forms. The vital statistics box 44, associated with the first selection item of the items 45 illustrated on the screen of FIG. 5B, is for demographic information about the customer being interviewed. However the boxes 46–51 are for the main categories that will be evaluated for the supply of business forms and related services, including forms control category 46, forms design 47, procurement 48, warehousing and distribution 49, inventory management 50, and accounts payable 51. Obviously other categories can also be provided, as indicated by box 52 in FIG. 4C, depending upon the particular goods or services to be supplied, the particular customer, or other variables.

Also, as indicated by box 53 in FIG. 4C, "notes" can be taken in an automated way so that they can later be printed out. Notes can be entered in free form and printed in the same form as they are entered, and can be edited and/or deleted by the person utilizing the computer 1 at any time. The notes will not be included in the data that is transmitted by diskette or modem to the "home" computer 3 under most circumstances, but can be provided as additional data to help in making the assessment. After notes are entered the "notepad" will be automatically saved and the user can exit back to the prior windows.

The vital statistics box 44 implementation as illustrated in FIGS. 4D-1 and 4D-2, and the way that the vital statistics screen may appear is illustrated in FIG. 5C. The individual elements thereof are self-explanatory.

FIGS. 4E-1 through 4E-3 illustrates the elements from box 46, the forms control component. The "menu" or "cancel" buttons on the keyboard 7 are used to exit a component. As indicated by decision element 54, different types of questions may be utilized, four different types of questions being indicated in FIG. 4A being preferred. There are two major types of questions, those asking one to "check all responses that apply", and those requiring "pick one response" only. Within each type there are questions in which the first point must be answered in the affirmative before the remainder of the points are made available, and those where all points are available regardless of the response given to the first point, thus indicating all four types.

More particularly, type 1–type 4 questions may be defined as follows:

Type 1: Display checkboxes for as many questions as are present. As a CheckBox is Clicked, UnCheck the other CheckBoxes for this Sub-Element.

Type 2: Display Question 'A'. If 'A' is checked, 'yes', Display the rest of the questions for this Sub-Element. Only 1 of the remaining questions may be selected.

Type 3: Display Checkboxes for as many questions as are present. Allow any or all of the CheckBoxes to be Checked.

Type 4: Display Question 'A'. If 'A' is checked, 'yes', Display the rest of the questions for this Sub-Element. Any or all of the remaining questions maybe selected.

With further reference to FIG. 5E, all of the responses which are recorded are saved. Automatic saving is preferably implemented by using a timer built into the computer 1 which institutes a "save" command every several seconds. This allows protection of the information from power failures, or the like, without requiring user intervention.

In the practice of the method according to the invention, each of the categories—such as the forms control category illustrated in FIGS. 4E-1 through 4E-3 and by the box 46 in FIG. 4C—are grouped by elements, sub-elements, and points in order to provide objective analysis. Values are assigned at the point level when a response is limited to one choice, and values are assigned for a combination of points when a response is "choose all that apply". Weights are assigned at the sub-element and element levels. Ultimately this information is used to calculate weighted averages for each category and an average for all categories.

A typical screen that is utilized to provide the input of data during the implementation of the flow sheet of FIGS. 4E-1 through 4E-2 is illustrated in FIG. 5D. The question illustrated in FIG. 5D is of the type requiring a response at the "A" level before the questions "B–D" come up. Each question is answered by clicking on or off at the boxes to the left of each question letter—in the example indicated questions A, B, and D are answered "yes" while question C is answered "no".

As indicated in FIG. 4C, the flow chart for implementing each of the different categories 47–52 is illustrated in FIG. 4E, only the particular questions associated with each category being different.

FIG. 4F indicates implementation of the "new" menu selection item from FIG. 4B. This is also indicated by box 39 in FIG. 4A, and relates to the second menu item 37 in FIG. 5A. FIG. 4G illustrates the flow chart associated with the box 40 in FIG. 4A, and the third menu item 37 in FIG. 5A. FIG. 4H illustrates the flow chart associated with box 41 in FIG. 4A, and the fourth menu item 37 in FIG. 5A. FIGS. 4I-1 and 4I-2 indicates the flow chart associated with the box 42 in FIG. 4A, and the fifth menu item 37 in FIG. 5A. FIG. 4J indicates the flow chart associated with the box 43 in FIG. 4A and the last menu item 37 in FIG. 5A.

If the "diskette" group is selected, by highlighting and clicking on it when displayed as indicated in FIG. 5A, the boxes indicated at 55–58 in FIG. 4A will come up. The flow sheet associated with box 55 is shown in FIG. 4K, the flow sheet associated with box 56 is shown in FIGS. 4L and 4M, the flow chart associated with box 57 is illustrated in FIG. 4N, and the flow chart associated with box 58 is illustrated in FIGS. 4O and 4P-1 through 4R-3. Returning to FIGS. 4L and 4M, an exemplary screen that may be associated therewith is illustrated in FIG. 5E, indicating questions and sub-elements, within an element, and within a category (in this case the forms control category).

The final option available from the main screen of FIG. 5A associated with the "Help" group thereof is illustrated by boxes 59 and 60 in FIG. 4A. The flow sheet associated with the box 59 is illustrated in FIG. 4Q, while that associated with box 60 is illustrated in 4R.

While of course the specific questions, as well as the weights and values associated therewith, can vary with product, service, time, etc., a particularly advantageous question set with associated weights and values will now be described with respect to the preferred embodiment of the invention. To assist in evaluating the following detailed description, for two different categories—the forms control and the forms design categories (boxes 46 and 47 in FIG. 4C), a general overview will be given.

Within the forms control category there are the following elements with the indicated weight for the element, and sub-elements (indicated by a number only) with weights for the sub-elements:

| Forms Control | |
|---|---|
| Element Forms Control Function | 35% (30–40%) |
| Sub-elements 01–60% (55–65%); 02–20% (15–25%) 03–20% (15–25%) | |
| Element Form File | 20% (15–25%) |
| Sub-elements 01–16% (5–15%); 02–30% (25–35%); 03–60% (55–65%) | |
| Element Forms Numbering | 10% (5–15%) |
| Sub-elements 01–60% (55–65%); 02–40% (35–45%) | |
| Element Forms Catalog | 20% (15–25%) |
| Sub-elements 01–10% (5–15%); 02–30% (25–35%); 03–20% (15–25%); 04–40% (35–45%) | |
| Element Requisitions | 5% (1–10%) |
| Sub-elements 01–50% (40–60%); 02–50% (40–60%) | |
| Element Obsolete Item IA, Resolution & Prevention | 10% (5–15%) |
| Sub-elements 01–100% (significant) | |
| | 100% |

Similarly for the "forms design" category the following overview may be provided:

| Forms Design | |
|---|---|
| Element Composition | 10% (5–15%) |
| Sub-elements 01–5% (1–10%); 02–5% (1–10%); 03–30% (25–35%); 04–15% (10–20%); 05–20% (15–25%); 06–15% (10–20%); 07–10% (5–15%) | |
| Element Forms Analysis | 40% (35–45%) |
| Sub-elements 01–50% (40–60%); 02–50% (40–60%) | |
| Element Business System Analysis | 25% (20–30%) |
| Sub-elements 01–100% (significant) | |
| Element Man. Capabilities & Standard Specifications | 25% (20–30%) |
| Sub-elements 01–35% (25–45%); 02–65% (55–75%) | |
| | 100% |

A preferred detailed question set, comprising approximately 300 questions, with weights and values assigned for practical inquiry into each of the categories 46 through 51 illustrated in FIG. 4C, is as follows. In each case the weight can vary about ten percentage points either way (e.g. 4–5% points either way, such as from 30–40% for a weight designated "35").

| | | VALUE | WEIGHT (%) |
|---|---|---|---|
| 01. FORMS CONTROL | | | |
| 01. Forms Control Function | | | 30 |
| 01. | | | 60 |
| A. | Do procedures exist for Forms Control activities? | | |
| B. | Are they published? | | |
| C. | Are they available to end users? | | |
| D. | Is there a formal review process? | | |
| Value:0 | NNNN | 0.1 | |
| Value:1 | YNNN | 2.0 | |
| Value:3 | YYNN | 4.0 | |
| Value:5 | YNYN | 3.0 | |
| Value:7 | YYYN | 6.0 | |
| Value:9 | YNNY | 3.0 | |
| Value:11 | YYNY | 5.0 | |
| Value:13 | YNYY | 5.0 | |
| Value:15 | YYYY | 8.0 | |
| 02. | | | 20 |
| A. | Is there assigned responsibility for the Forms Control function? | | |
| B. | Does it include participating in design construction recommendations? | | |
| C. | Does it include attending departmental meetings for development of new forms? | | |
| D. | Does it include reviewing forms for consolidation/ elimination? | | |
| E. | Does it include approving forms vendor invoices for payment? | | |
| Value:0 | NNNNN | 01 | |
| Value:1 | YNNNN | 2.0 | |
| Value:3 | YYNNN | 3.0 | |
| Value:5 | YNYNN | 2.5 | |
| Value:7 | YYYNN | 4.0 | |
| Value:9 | YNNYN | 3.0 | |
| Value:11 | YYNYN | 4.5 | |
| Value:13 | YNYYN | 3.5 | |
| Value:15 | YYYYN | 7.0 | |
| Value:17 | YNNNY | 2.0 | |
| Value:19 | YYNNY | 4.0 | |
| Value:21 | YNYNY | 3.0 | |
| Value:23 | YYYNY | 5.0 | |
| Value:25 | YNNYY | 4.0 | |
| Value:27 | YYNYY | 7.0 | |
| Value:29 | YNYYY | 6.0 | |
| Value:31 | YYYYY | 8.0 | |
| 03. | | | 20 |
| A. | Is there a training program for Forms Control personnel? | | |
| B. | Is it an internal program? | | |
| C. | Is it recognized and administered through your corporate training program? | | |
| D. | Does it include vendor plant visits and workshops? | | |
| Value:0 | NNNN | 0.1 | |
| Value:1 | YNNN | 2.0 | |
| Value:3 | YYNN | 4.0 | |
| Value:5 | YNYN | 3.0 | |
| Value:7 | YYYN | 6.5 | |
| Value:9 | YNNY | 3.0 | |
| Value:11 | YYNY | 5.0 | |
| Value:13 | YNYY | 3.5 | |
| Value:15 | YYYY | 8.0 | |
| 02. Forms File | | | 20 |
| 01. | | | 10 |
| A. | Does a forms file exist? | | |
| B. | Is it paper based? | | |
| C. | Is it an electronic forms file? | | |
| Value:0 | NNN | 0.1 | |

|  |  |  | VALUE | WEIGHT (%) |
|---|---|---|---|---|
|  | Value:3 | YYN | 4.0 |  |
|  | Value:5 | YNY | 8.0 |  |
|  | Value:7 | YYY | 6.0 |  |
| 02. | Which of the following are included in the forms file? |  |  | 30 |
| A. | Current forms samples |  | 1.5 |  |
| B. | Specifications of the form |  | 1.5 |  |
| C. | Usage history |  | 1.0 |  |
| D. | Information regarding using department(s) |  | 0.5 |  |
| E. | Revision pending notes |  | 1.0 |  |
| F. | Authorized signatures |  | 1.0 |  |
| G. | Previous P.O.s |  | 0.5 |  |
| H. | Budget/cost center code |  | 0.5 |  |
| I. | Flow chart depicting use of form |  | 0.5 |  |
| 03. |  |  |  | 60 |
| A. | Is the forms file updated? |  |  |  |
| B. | Is it updated on a regularly scheduled basis? |  |  |  |
| C. | Are there control measures to challenge new items and reorder quantities? |  |  |  |
|  | Value:0 | NNN | 0.1 |  |
|  | Value:1 | YNN | 2.0 |  |
|  | Value:3 | YYN | 6.0 |  |
|  | Value:5 | YNY | 4.0 |  |
|  | Value:7 | YYY | 8.0 |  |
| 03. | Forms Numbering |  |  | 10 |
| 01. |  |  |  | 60 |
| A. | Does a form numbering system exist? |  |  |  |
| B. | Form numbers are assigned sequentially or randomly. |  |  |  |
| C. | Form numbers are assigned using a scheme that reflects a function or department. |  |  |  |
|  | Value:0 | NNN | 0.1 |  |
|  | Value:1 | YNN | 2.0 |  |
|  | Value:3 | YYN | 5.0 |  |
|  | Value:5 | YNY | 8.0 |  |
|  | Value:7 | YYY | 5.0 |  |
| 02. | Who is responsible for assigning form numbers? |  |  | 40 |
| A. | Each using department. |  |  |  |
| B. | Form numbers are assigned by the Inventory Management System. |  |  |  |
| C. | Purchasing or Forms Control. |  |  |  |
| D. | Vendor and Forms Control together. |  |  |  |
|  | Value:1 | YNNN | 4.0 |  |
|  | Value:2 | NYNN | 3.0 |  |
|  | Value:3 | YYNN | 2.0 |  |
|  | Value:4 | NNYN | 6.0 |  |
|  | Value:5 | YNYN | 2.0 |  |
|  | Value:6 | NYYN | 2.0 |  |
|  | Value:7 | YYYN | 1.0 |  |
|  | Value:8 | NNNY | 8.0 |  |
|  | Value:9 | YNNY | 2.0 |  |
|  | Value:10 | NYNY | 2.0 |  |
|  | Value:11 | YYNY | 1.0 |  |
|  | Value:12 | NNYY | 3.0 |  |
|  | Value:13 | YNYY | 1.0 |  |
|  | Value:14 | NYYY | 1.0 |  |
|  | Value:15 | YYYY | 1.0 |  |
| 04. | Forms Catalog |  |  | 20 |
| 01. |  |  |  | 10 |
| A. | Do you utilize a forms catalog? |  |  |  |
| B. | Is it manually produced and updated? |  |  |  |
| C. | Is it produced as a computer listing? |  |  |  |
| D. | Is it a book format? |  |  |  |
| E. | Is it updated and available for viewing via an electronic interface? |  |  |  |
|  | Value:0 | NNNNN | 0.1 |  |
|  | Value:3 | YYNNN | 3.0 |  |
|  | Value:5 | YNYNN | 5.5 |  |
|  | Value:11 | YYNYN | 4.0 |  |
|  | Value:13 | YNYYN | 6.0 |  |
|  | Value:17 | YNNNY | 8.0 |  |
|  | Value:21 | YNYNY | 6.0 |  |
|  | Value:25 | YNNYY | 7.0 |  |
|  | Value:29 | YNYYY | 6.5 |  |
| 02. | Which of the following are included in your forms catalog? |  |  | 30 |
| A. | Form name, description |  | 2.0 |  |
| B. | Form number |  | 2.0 |  |
| C. | Form size (width, length, number of parts) |  | 0.1 |  |
| D. | Packaging unit |  | 1.5 |  |
| E. | Number of forms per packaging unit |  | 1.0 |  |
| F. | Pictures of each form |  | 0.5 |  |
| 03. | How is the catalog distributed? |  |  | 20 |
| A. | Mailed to end-users based on customized/specific needs |  | 4.0 |  |
| B. | User requests overnight service Print On Demand and mail out |  | 6.0 |  |
| C. | Accessed electronically |  | 8.0 |  |
| D. | Catalog is distributed on a scheduled basis |  | 2.0 |  |
| E. | Catalog is not distributed |  | 0.1 |  |
| 04. | How often is the catalog updated? |  |  | 40 |
| A. | Annually |  | 4.0 |  |
| B. | Quarterly or semi-annually |  | 6.0 |  |
| C. | Monthly |  | 8.0 |  |
| D. | As changes occur |  | 7.0 |  |
| E. | Catalog is not updated |  | 0.1 |  |
| 0.5 | Requisitions |  |  | 5 |
| 0.1 | What is the average number of line items per requisition? |  |  | 50 |
| A. | Below 5 |  | 4.0 |  |
| B. | 5 or more |  | 8.0 |  |
| 0.2 | What is the maximum number of available lines on the most commonly used requisition form? |  |  | 50 |
| A. | 1–10 |  | 2.0 |  |
| B. | 10–25 |  | 5.0 |  |
| C. | Unlimited - as many as they want |  | 8.0 |  |
| D. | A requisition form is not used |  | 0.1 |  |
| 0.6 | Obsolete Item ID, Resolution, & Prevention |  |  | 10 |
| 0.1 |  |  |  | 100 |
| A. | Are there tools to identify and remedy obsolete forms? |  | 2.0 |  |
| B. | Are these tools automated? |  | 2.0 |  |
| C. | Does an obsolescence review program exist? |  | 3.0 |  |
| D. | Is the dollar value of obsolete inventory tracked continuously? |  | 1.0 |  |
| E. | Forms are not reviewed for obsolescence |  | 0.1 |  |
| 2. | FORMS DESIGN |  |  | 10 |
| 01. | Composition |  |  |  |
| 01. |  |  |  | 5 |
| A. | Do you have an in-house composition program currently in place? |  |  |  |
| B. | Formal composition procedures and graphic standards in place. |  |  |  |
| C. | End user with self taught composition package. |  |  |  |
| D. | Adequately trained personnel in a centralized function perform composition. |  |  |  |
| E. | Internal composition and typesetting department with fully trained personnel. |  |  |  |
|  | Value:0 | NNNNN | 0.1 |  |
|  | Value:1 | YNNNN | 1.0 |  |

|     |                                      |       | VALUE | WEIGHT (%) |
| --- | ------------------------------------ | ----- | ----- | ---------- |
|     | Value:3                              | YYNNN | 6.0   |            |
|     | Value:5                              | YNYNN | 2.0   |            |
|     | Value:7                              | YYYNN | 4.0   |            |
|     | Value:9                              | YNNYN | 4.0   |            |
|     | Value:11                             | YYNYN | 5.0   |            |
|     | Value:13                             | YNYYN | 4.0   |            |
|     | Value:15                             | YYYYN | 4.0   |            |
|     | Value:17                             | YNNNY | 6.5   |            |
|     | Value:19                             | YYNNY | 8.0   |            |
|     | Value:21                             | YNYNY | 6.0   |            |
|     | Value:23                             | YYYNY | 7.0   |            |
|     | Value:25                             | YNNYY | 5.0   |            |
|     | Value:27                             | YYNYY | 5.0   |            |
|     | Value:29                             | YNYYY | 4.0   |            |
|     | Value:31                             | YYYYY | 3.0   |            |
| 02. |                                      |       |       | 5          |
| A.  | Do you utilize outside resources to perform the composition function? | | | |
| B.  | End user initiates composition using outside resources. | | | |
| C.  | Composition is performed by the forms vendor. | | | |
|     | Value:0                              | NNN   | 0.1   |            |
|     | Value:1                              | YNN   | 0.1   |            |
|     | Value:3                              | YYN   | 2.0   |            |
|     | Value:5                              | YNY   | 8.0   |            |
|     | Value:7                              | YYY   | 6.0   |            |
| 03. | Which of the following is responsible for the approval of new forms, revisions, and proofs: | | | 30 |
| A.  | Each user department                 |       |       |            |
| B.  | Forms Design department and vendor   |       |       |            |
| C.  | Purchasing                           |       |       |            |
| D.  | Forms Design department              |       |       |            |
|     | Value:0                              | NNNN  | 0.1   |            |
|     | Value:1                              | YNNN  | 1.0   |            |
|     | Value:2                              | NYNN  | 8.0   |            |
|     | Value:3                              | YYNN  | 6.0   |            |
|     | Value:4                              | NNYN  | 5.0   |            |
|     | Value:5                              | YNYN  | 2.0   |            |
|     | Value:6                              | NYYN  | 5.0   |            |
|     | Value:7                              | YYYN  | 4.0   |            |
|     | Value:8                              | NNNY  | 7.0   |            |
|     | Value:9                              | YNNY  | 6.0   |            |
|     | Value:10                             | NYNY  | 6.0   |            |
|     | Value:11                             | YYNY  | 2.0   |            |
|     | Value:12                             | NNYY  | 5.0   |            |
|     | Value:13                             | YNYY  | 2.0   |            |
|     | Value:14                             | NYYY  | 4.0   |            |
|     | Value:15                             | YYYY  | 1.0   |            |
| 04. | How are proofs being obtained?       |       |       | 15         |
| A.  | In house                             |       |       |            |
| B.  | Through manufacturing vendor         |       |       |            |
| C.  | Third party                          |       |       |            |
|     | Value:0                              | NNN   | 0.1   |            |
|     | Value:1                              | YNN   | 3.0   |            |
|     | Value:2                              | NYN   | 8.0   |            |
|     | Value:3                              | YYN   | 4.0   |            |
|     | Value:4                              | NNY   | 6.0   |            |
|     | Value:5                              | YNY   | 4.0   |            |
|     | Value:6                              | NYY   | 5.0   |            |
|     | Value:7                              | YYY   | 3.5   |            |
| 05. | What is the average turn around time for proofs? | | | 20 |
| A.  | Six or more days                     |       | 2.0   |            |
| B.  | Two to five days                     |       | 4.0   |            |
| C.  | One day (24 hours)                   |       | 6.0   |            |
| D.  | Less than twenty-four hours          |       | 8.0   |            |
| 06. | Which best describes your company's awareness regarding corporate graphic standards? | | | 15 |
| A.  | Standards exist                      |       | 3.0   |            |
| B.  | Exist and published                  |       | 5.0   |            |
| C.  | Exist and published with adequate compliance | | 8.0 |        |
| D.  | No graphic standards exist           |       | 0.1   |            |
| 07. | Which best describes your company's awareness regarding postal regulations? | | | 10 |
| A.  | Periodically review postal regulation updates | | | |
| B.  | Comply with postal regulations       |       |       |            |
| C.  | Take advantage of postal discounts (presorted postal rates . . .) | | | |
| D.  | Postal regulations are not incorporated into mailing procedures | | | |
|     | Value:0                              | NNNN  | 0.1   |            |
|     | Value:1                              | YNNN  | 2.0   |            |
|     | Value:2                              | NYNN  | 3.0   |            |
|     | Value:3                              | YYNN  | 4.0   |            |
|     | Value:4                              | NNYN  | 3.0   |            |
|     | Value:5                              | YNYN  | 5.0   |            |
|     | Value:6                              | NYYN  | 4.0   |            |
|     | Value:7                              | YYYN  | 6.0   |            |
|     | Value:8                              | NNNY  | 4.0   |            |
|     | Value:9                              | YNNY  | 4.0   |            |
|     | Value:10                             | NYNY  | 4.0   |            |
|     | Value:11                             | YYNY  | 4.0   |            |
|     | Value:12                             | NNYY  | 6.0   |            |
|     | Value:13                             | YNYY  | 4.0   |            |
|     | Value:14                             | NYYY  | 7.0   |            |
|     | Value:15                             | YYYY  | 8.0   |            |
| 02. | Forms Analysis                       |       |       | 40         |
| 01. |                                      |       |       | 50         |
| A.  | Is the Forms Analysis function currently being performed? | | 0.0 | |
| B.  | The end user primarily performs this function. | | 1.0 | |
| C.  | A part time internal Forms Analyst primarily performs this function. | | 2.0 | |
| D.  | A fully trained internal Forms Analyst performs this function. | | 4.0 | |
| E.  | Vendor provides analysis as part of service program. | | 6.0 | |
| F.  | A dedicated vendor Forms Analyst performs this function. | | 8.0 | |
| 02. |                                      |       |       | 50         |
| A.  | Is the forms consolidation function currently being performed? | | 0.0 | |
| B.  | Is it being performed by each end user | | 2.0 | |
| C.  | Each department performs this function separately. | | 3.0 | |
| D.  | An internal Forms Analyst performs this function. | | 7.0 | |
| E.  | A vendor Forms Analyst performs this function. | | 8.0 | |
| F.  | Purchasing performs this function.   |       | 4.0   |            |
| G.  | Forms Control performs this function. | | 5.0 | |
| 03. | Business Systems Analysis            |       |       | 25         |
| 0.1 | Business systems analysis the study of all system components and department flow. | | | 100 |
| A.  | Is this process currently being performed? | | 0.0 | |
| B.  | Informally by the end user           |       | 4.0   |            |
| C.  | Internally by a full time dedicated resource | | 6.0 | |
| D.  | By a dedicated vendor Business Systems Analyst with tools and models. | | 8.0 | |
| 04. | Manuf. Capabilities and Standard Specifications | | | 25 |
| 01. | Which best describes the level of awareness and utilization of industry standards? | | | 35 |

-continued

| | | VALUE | WEIGHT (%) |
|---|---|---|---|
| | A. General understanding of industry standards | 4.0 | 5 |
| | B. Thorough understanding and use of industry standards | 6.0 | |
| | C. Industry standards review is a part of the order entry process | 8.0 | |
| | D. Not aware of industry standards | 0.1 | |
| | 02. Which of the following best indicates the level of awareness of industry capabilities? | | 10 |
| | A. General knowledge of industry capabilities and expertise | 2.5 | |
| | B. Knowledge of industry capabilities and participate in focus groups | 6.0 | 15 |
| | C. Not aware of industry capabilities | 8.0 | |
| 3. | PROCUREMENT | | |
| | 01. Procurement Process | | 60 |
| | 01. Which best describes the most commonly used forms procurement process at it exists today? | | 30 |
| | A. Bid only | 2.0 | |
| | B. Recurring purchasing with the same vendor for a portion of the forms volume | 3.0 | |
| | C. End user purchases independently | 4.0 | |
| | D. Contract purchasing | 5.0 | |
| | E. Buying groups/affiliations | 6.0 | |
| | F. One vendor | 8.0 | |
| | 02. Who is responsible for the Procurement function? | | 10 |
| | A. End user individually | | |
| | B. Each functional department | | |
| | C. Centralized purchasing department | | |
| | D. Vendor - forms purchasing is out-sourced | | |
| | Value:0  NNNN | 0.1 | |
| | Value:1  YNNN | 2.0 | |
| | Value:2  NYNN | 4.0 | |
| | Value:3  YYNN | 3.0 | |
| | Value:4  NNYN | 6.0 | |
| | Value:5  YNYN | 4.0 | |
| | Value:6  NYYN | 4.0 | |
| | Value:7  YYYN | 2.0 | |
| | Value:8  NNNY | 8.0 | |
| | Value:9  YNNY | 3.0 | |
| | Value:10 NYNY | 4.0 | |
| | Value:11 YYNY | 3.0 | |
| | Value:12 NNYY | 7.0 | |
| | Value:13 YNYY | 3.0 | |
| | Value:14 NYYY | 2.0 | |
| | Value:15 YYYY | 1.0 | |
| | 03. What is the number one criteria used when choosing a forms vendor? | | 20 |
| | A. Relationship | 6.0 | |
| | B. Service | 6.0 | |
| | C. Price | 2.0 | |
| | D. Quality | 4.0 | |
| | E. Value added products and services | 7.0 | |
| | F. Uses innovative technologies | 8.0 | |
| | G. Environmental standards | 7.5 | |
| | 04. How is vendor performance measured? | | 25 |
| | A. Program in place for vendor assessment | 4.0 | |
| | B. Vendor assessment based on exceptions (i.e. when problem occurs) | 5.0 | |
| | C. Measurement based on product quality, delivery, and other services | 8.0 | |
| | D. Vendor's performance is not measured | 0.1 | |
| | 05. Which method is most often used to place an order with a vendor? | | 5 |
| | A. Manual purchase orders | 2.0 | |
| | B. Standalone PC based purchasing system | 4.0 | |
| | C. Integrated purchasing system | 7.0 | |
| | D. EDI (Electronic Data Interchange) | 7.5 | |
| | E. On-line electronic segregation of requisitioned items by vendor | 8.0 | |
| | 06. Are there specific procedures in place for: | | 5 |
| | A. Reordering existing forms? | 2.0 | |
| | B. Pre-order clearance? | 2.0 | |
| | C. Justification for new forms creation? | 2.0 | |
| | D. High priority and security items? | 2.0 | |
| | 07. How are purchase orders usually tracked? | | 5 |
| | A. Manually tracked and reported | 2.0 | |
| | B. Standalone Purchasing System with reports to identify orders in process | 4.0 | |
| | C. Vendor supplied reports to track purchase orders | 5.0 | |
| | D. Integrated Purchasing System with reports | 7.0 | |
| | E. Customer P.O. system with interface to vendor's manufacturing system | 8.0 | |
| | F. P.O.s are not tracked | 0.1 | |
| | 02. Reorder Process | | 35 |
| | 01. Which of the following best describes the process to identify items in need of replenishment? | | 45 |
| | A. Item is reordered when stock is depleted | 2.0 | |
| | B. Periodic physical inventory | 4.0 | |
| | C. Analysis of computer reports | 6.0 | |
| | D. Use of exception reports | 8.0 | |
| | 02. | | 30 |
| | A. Are orders for similar products combined to gain economies of scale? | 0.0 | |
| | B. Combinations are manually combined. | 3.0 | |
| | C. Combinations are combined via automated computer reporting. | 6.0 | |
| | D. Combinations are identified via computer-generated low stock notices. | 8.0 | |
| | 03. What is the average duration of the reorder process: | | 10 |
| | A. 46 days or more | 2.0 | |
| | B. 20–45 days | 4.0 | |
| | C. 11–19 days | 6.0 | |
| | D. 10 days or less | 8.0 | |
| | 0.4 How are repeat orders approved? | | 15 |
| | A. By the user department | | |
| | B. By Forms Control | | |
| | C. By Purchasing | | |
| | D. Mandatory preorder clearance | | |
| | E. Master P.O. with numbered "authorized releases" | | |
| | Value:0  NNNNN | 0.1 | |
| | Value:1  YNNNN | 2.0 | |
| | Value:2  NYNNN | 4.0 | |
| | Value:3  YYNNN | 4.0 | |
| | Value:4  NNYNN | 6.0 | |
| | Value:5  YNYNN | 5.0 | |
| | Value:6  NYYNN | 4.0 | |
| | Value:7  YYYNN | 3.0 | |
| | Value:8  NNNYN | 7.0 | |
| | Value:9  YNNYN | 4.0 | |
| | Value:10 NYNYN | 5.0 | |
| | Value:11 YYNYN | 3.0 | |

|  | VALUE | WEIGHT (%) |
|---|---|---|
| Value:12   NNYYN | 6.0 | |
| Value:13   YNYYN | 3.0 | |
| Value:14   NYYYN | 3.0 | |
| Value:15   YYYYN | 2.0 | |
| Value:16   NNNNY | 8.0 | |
| Value:17   YNNNY | 6.0 | |
| Value:18   NYNNY | 6.0 | |
| Value:19   YYNNY | 3.0 | |
| Value:20   NNYNY | 7.0 | |
| Value:21   YNYNY | 3.0 | |
| Value:22   NYYNY | 3.0 | |
| Value:23   YYYNY | 2.0 | |
| Value:24   NNNYY | 7.0 | |
| Value:25   YNNYY | 3.0 | |
| Value:26   NYNYY | 3.0 | |
| Value:27   YYNYY | 2.0 | |
| Value:28   NNYYY | 3.0 | |
| Value:29   YNYYY | 2.0 | |
| Value:30   NYYYY | 3.0 | |
| Value:31   YYYYY | 1.0 | |
| 03. Environmental Policy | | 5 |
| 01. | | 50 |
| A. Is there currently a corporate or community environmental awareness program? | | |
| B. With a Coordinator position requiring knowledge of environmental laws? | | 25 |
| C. Measurement of progress and impact of environmental programs? | | |
| D. A corporate advertising program? | | 30 |
| Value:0    NNNN | 0.1 | |
| Value:1    YNNN | 2.0 | |
| Value:3    YYNN | 4.0 | |
| Value:5    YNYN | 4.0 | |
| Value:7    YYYN | 7.0 | |
| Value:9    YNNY | 4.0 | |
| Value:11   YYNY | 7.0 | |
| Value:13   YNYY | 5.0 | |
| Value:15   YYYY | 8.0 | |
| 02. | | 50 |
| A. Is there a forms purchasing policy in regard to recyclable products? | 0.0 | |
| B. Is it practiced by the Purchasing department only? | 0.5 | |
| C. Does it encompass the entire company? | 2.0 | |
| D. Are recycled product purchases based on price? | 1.0 | |
| E. Is it for specific product lines only? | 1.5 | |
| F. Does it include converting to recycled product in all product lines? | 3.0 | |
| 4. WAREHOUSING & DISTRIBUTION | | |
| 01. Warehouse Facility Characteristics | | 35 |
| 01. | | 5 |
| A. Is an outside warehouse being utilized for forms related storage? | 0.0 | |
| B. Are less than 20% of all forms being stored in this facility? | 4.0 | |
| C. Are 20-50% of all forms being stored in this facility? | 5.0 | |
| D. Are 51-80% of all forms being stored in this facility? | 6.0 | |
| E. Are 81-99% of all forms being stored in this facility? | 8.0 | |
| F. Are 100% of all forms being stored in this facility? | 6.0 | |
| 02. | | 5 |
| A. Does your company own or operate an internal forms storage facility? | | |
| B. Departmental supply room/closet | | |
| C. Central company storage location accessible by all departments | | |
| D. Multiple warehouses within close proximity to most end users | | |
| E. Nationwide/international warehousing capabilities | | |
| Value:0    NNNNN | 0.1 | |
| Value:1    YNNNN | 1.0 | |
| Value:3    YYNNN | 2.0 | |
| Value:5    YNYNN | 2.0 | |
| Value:7    YYYNN | 3.0 | |
| Value:9    YNNYN | 3.0 | |
| Value:11   YYNYN | 3.0 | |
| Value:13   YNYYN | 3.0 | |
| Value:15   YYYYN | 6.0 | |
| Value:17   YNNNY | 3.0 | |
| Value:19   YYNNY | 3.0 | |
| Value:21   YNYNY | 3.0 | |
| Value:23   YYYNY | 4.0 | |
| Value:25   YNNYY | 3.0 | |
| Value:27   YYNYY | 3.0 | |
| Value:29   YNYYY | 4.0 | |
| Value:31   YYYYY | 7.0 | |
| Value:33   YNNNN | 4.0 | |
| Value:35   YYNNN | 3.0 | |
| Value:37   YNYNN | 3.0 | |
| Value:39   YYYNN | 4.0 | |
| Value:41   YNNYN | 3.0 | |
| Value:43   YYNYN | 4.0 | |
| Value:45   YNYYN | 4.0 | |
| Value:47   YYYYN | 5.0 | |
| Value:49   YNNNY | 3.0 | |
| Value:51   YYNNY | 4.0 | |
| Value:53   YNYNY | 4.0 | |
| Value:55   YYYNY | 6.0 | |
| Value:57   YNNYY | 4.0 | |
| Value:59   YYNYY | 6.0 | |
| Value:61   YNYYY | 7.0 | |
| Value:63   YYYYY | 8.0 | |
| 03. | | 5 |
| A. Is a computer system used to manage inventory in this warehouse operation? | | |
| B. Does it generate receipts? | | |
| C. Does it generate pick tickets? | | |
| D. Does it generate bills of lading? | | |
| E. Does it calculate freight charges? | | |
| F. Does it prepare carton labels? | | |
| Value:0    NNNNNN | 0.1 | |
| Value:1    YNNNNN | 1.0 | |
| Value:3    YYNNNN | 2.0 | |
| Value:5    YNYNNN | 2.0 | |
| Value:7    YYYNNN | 3.0 | |
| Value:9    YNNYNN | 3.0 | |
| Value:11   YYNYNN | 3.0 | |
| Value:13   YNYYNN | 3.0 | |
| Value:15   YYYYNN | 6.0 | |
| Value:17   YNNNYN | 3.0 | |
| Value:19   YYNNYN | 3.0 | |
| Value:21   YNYNYN | 3.0 | |
| Value:23   YYYNYN | 4.0 | |
| Value:25   YNNYYN | 3.0 | |
| Value:27   YYNYYN | 3.0 | |
| Value:29   YNYYYN | 4.0 | |
| Value:31   YYYYYN | 7.0 | |
| Value:33   YNNNNY | 4.0 | |
| Value:35   YYNNNY | 3.0 | |
| Value:37   YNYNNY | 3.0 | |
| Value:39   YYYNNY | 4.0 | |
| Value:41   YNNYNY | 3.0 | |
| Value:43   YYNYNY | 4.0 | |
| Value:45   YNYYNY | 4.0 | |
| Value:47   YYYYNY | 5.0 | |
| Value:49   YNNNYY | 3.0 | |
| Value:51   YYNNYY | 4.0 | |

|  |  |  | VALUE | WEIGHT (%) |
|---|---|---|---|---|
|  | Value:53 | YNYNYY | 4.0 |  |
|  | Value:55 | YYYNYY | 6.0 |  |
|  | Value:57 | YNNYYY | 4.0 |  |
|  | Value:59 | YYNYYY | 6.0 |  |
|  | Value:61 | YNYYYY | 7.0 |  |
|  | Value:63 | YYYYYY | 8.0 |  |
| 04. |  |  |  | 15 |
| A. | Are there formal procedures regarding warehousing operations? |  |  |  |
| B. | Are these procedures published? |  |  |  |
| C. | Is there a formal operational training process including orientation for new employees? |  |  |  |
|  | Value:0 | NNN | 0.1 |  |
|  | Value:1 | YNN | 3.0 |  |
|  | Value:3 | YYN | 4.0 |  |
|  | Value:5 | YNY | 7.0 |  |
|  | Value:7 | YYY | 8.0 |  |
| 05. | Does this warehousing facility include any of the following? |  |  | 20 |
| A. | Vertical pallet racking |  | 1.0 |  |
| B. | Warehouse clearance height more than 14 feet high |  | 2.0 |  |
| C. | Motor driven vehicles for materials handling |  | 2.5 |  |
| D. | Wire guidance system/robotics/ high bay pick system |  | 2.5 |  |
| 06. | Which of the following are characteristics of this warehouse facility? |  |  | 20 |
| A. | There is a personnel screening process for entry into the warehouse facility. |  | 1.0 |  |
| B. | The warehouse facility is equipped with an alarm system. |  | 2.0 |  |
| C. | There are special provisions for high security items. |  | 1.0 |  |
| D. | The facility is equipped with a sprinkler system. |  | 1.0 |  |
| E. | Warehouse personnel are bonded. |  | 1.0 |  |
| F. | There are formal procedures for disaster recovery. |  | 2.0 |  |
| 07. | How are the majority of requisition shipping labels generated in this facility? |  |  | 5 |
| A. | Hand written |  | 2.0 |  |
| B. | Typed/Stenciled |  | 3.0 |  |
| C. | Preprinted by vendor |  | 5.0 |  |
| D. | Computer generated without bar codes |  | 6.0 |  |
| E. | Computer generated with bar codes |  | 8.0 |  |
| F. | Shipping labels are not generated |  | 0.1 |  |
| 08. | How are orders located in this warehouse? |  |  | 20 |
| A. | Each form is designated a single specific warehouse "bin" location. |  | 3.0 |  |
| B. | Each form is placed and pulled randomly with manually maintained records. |  | 6.0 |  |
| C. | Each form is placed and pulled randomly with computer-generated support. |  | 8.0 |  |
| 09. |  |  |  | 5 |
| A. | Are there quality standards, measurements, and objectives in place in this warehouse? |  | 0.0 |  |
| B. | Are errors manually logged and reviewed? |  | 2.0 |  |
| C. | Are computer records used to track and report? |  | 2.0 |  |
| D. | Are quality focus groups created to recommend preventative action? |  | 2.0 |  |

|  |  |  | VALUE | WEIGHT (%) |
|---|---|---|---|---|
| E. | Are there individual employee productivity standards? |  | 2.0 |  |
| 02. | Requisition Process |  |  | 35 |
| 01. | How are requisitions typically received in this warehouse? |  |  | 50 |
| A. | Mail, phone, fax on a random basis |  | 3.0 |  |
| B. | Mail, phone, fax on a scheduled basis |  | 6.0 |  |
| C. | Electronically using EDI |  | 8.0 |  |
| 02. | What is the average time to fill a requisition once it is received at this warehouse? |  |  | 50 |
| A. | More than 6 working days |  | 3.0 |  |
| B. | 3–5 working days |  | 5.0 |  |
| C. | Within 48 hours or less |  | 8.0 |  |
| 03. | Distribution Methods |  |  | 15 |
| 0.1 | Which of the following product distribution methods describe the current capabilities? |  |  | 40 |
| A. | Full carton |  |  |  |
| B. | Pick and Pack |  |  |  |
| C. | Manual mass distribution (mass mailings) |  |  |  |
| D. | Automated mass distribution |  |  |  |
| E. | Freight merging capabilities |  |  |  |
|  | Value:1 | YNNNN | 1.0 |  |
|  | Value:2 | NYNNN | 2.0 |  |
|  | Value:3 | YYNNN | 3.0 |  |
|  | Value:5 | YNYNN | 2.0 |  |
|  | Value:6 | NYYNN | 2.0 |  |
|  | Value:7 | YYYNN | 7.0 |  |
|  | Value:9 | YNNYN | 3.0 |  |
|  | Value:10 | NYNYN | 3.0 |  |
|  | Value:11 | YYNYN | 7.0 |  |
|  | Value:17 | YNNNY | 3.0 |  |
|  | Value:18 | NYNNY | 20 |  |
|  | Value:19 | YYNNY | 4.0 |  |
|  | Value:20 | NNYNY | 2.0 |  |
|  | Value:21 | YNYNY | 4.0 |  |
|  | Value:22 | NYYNY | 4.0 |  |
|  | Value:23 | YYYNY | 6.0 |  |
|  | Value:25 | YNNYY | 5.0 |  |
|  | Value:26 | NYNYY | 5.0 |  |
|  | Value:27 | YYNYY | 8.0 |  |
| 02. | How is the master bill of lading typically prepared? |  |  | 10 |
| A. | Manually |  | 3.0 |  |
| B. | Computer-generated |  | 8.0 |  |
| C. | Master bill of lading is not utilized |  | 0.1 |  |
| 03. |  |  |  | 30 |
| A. | Is a commercial carrier utilized for freight distribution from this location? |  | 0.0 |  |
| B. | Are freight charges based on a pre-negotiated contract? |  | 3.0 |  |
| C. | Are freight calculations automated? |  | 2.0 |  |
| D. | Are carriers automatically selected by a computer based on freight costs? |  | 3.0 |  |
| 04. |  |  |  | 20 |
| A. | Are there formal procedures for returning items to this warehouse? |  | 1.0 |  |
| B. | Is there a central contact for return authorization? |  | 1.0 |  |
| C. | Is a fixed dollar value set for determination of feasibility of product return? |  | 1.0 |  |
| D. | Do time limitations exist for return of product? |  | 1.0 |  |
| E. | Is returned product recorded back into inventory, with automatic credit? |  | 2.0 |  |
| F. | Is product reviewed with respect |  | 1.0 |  |

| | VALUE | WEIGHT (%) |
|---|---|---|
| to obsolescence or revision upon return? | | 5 |
| G. Is an 800 number or voice mail used to support end-user inquiries? | 1.0 | |
| 04. Inventory Turns | | 15 |
| 01. What is the average number of inventory turns of items per year? | | 100 |
| A. 1 | 1.0 | |
| B. 2 | 3.0 | |
| C. 3 | 6.0 | |
| D. 4 or more | 8.0 | |
| 5. INVENTORY MANAGEMENT SYSTEM | | 15 |
| 01. Characteristics | | 10 |
| 01. How is your forms inventory currently being managed? | | 35 |
| A. In an automated fashion. | | |
| B. On a standalone system. | | |
| C. On an integrated mainframe supported system. | | |
| D. On an internally developed system. | | |
| E. On a system that is on-line to the vendor's IMS (Inventory Management System). | | |
| Value:0    NNNNN | 0.1 | |
| Value:3    YYNNN | 3.5 | |
| Value:5    YNYNN | 7.0 | |
| Value:7    YYYNN | 4.0 | |
| Value:11   YYNYN | 4.0 | |
| Value:13   YNYYN | 6.5 | |
| Value:15   YYYYN | 3.0 | |
| Value:19   YYNNY | 6.5 | |
| Value:21   YNYNY | 9.0 | |
| Value:23   YYYNY | 4.0 | |
| Value:27   YYNYY | 6.0 | |
| Value:29   YNYYY | 8.0 | |
| Value:31   YYYYY | 4.5 | |
| 02. Who is primarily responsible for managing and maintaining forms inventory? | | 65 |
| A. End-Users | 2.0 | |
| B. Each Department | 3.0 | |
| C. Warehouse Personnel | 5.0 | |
| D. Purchasing Department | 6.0 | |
| E. Forms Control Personnel | 8.0 | |
| 02. Access | | 10 |
| 01. Who has access to the inventory management system? | | 60 |
| A. End users | | |
| B. Each department | | |
| C. Warehouse | | |
| D. Purchasing | | |
| E. Forms Control | | |
| Value:0    NNNNN | 0.1 | |
| Value:1    YNNNN | 3.0 | |
| Value:2    NYNNN | 4.0 | |
| Value:3    YYNNN | 4.0 | |
| Value:4    NNYNN | 6.0 | |
| Value:5    YNYNN | 6.0 | |
| Value:6    NYYNN | 5.0 | |
| Value:7    YYYNN | 5.0 | |
| Value:8    NNNYN | 3.0 | |
| Value:9    YNNYN | 3.0 | |
| Value:10   NYNYN | 4.0 | |
| Value:11   YYNYN | 5.0 | |
| Value:12   NNYYN | 5.0 | |
| Value:13   YNYYN | 7.0 | |
| Value:14   NYYYN | 5.0 | |
| Value:15   YYYYN | 4.0 | |
| Value:16   NNNNY | 3.0 | |
| Value:17   YNNNY | 4.0 | |
| Value:18   NYNNY | 4.0 | |
| Value:19   YYNNY | 5.0 | |
| Value:20   NNYNY | 8.0 | |
| Value:21   YNYNY | 7.5 | |

| | VALUE | WEIGHT (%) |
|---|---|---|
| Value:22   NYYNY | 6.0 | |
| Value:23   YYYNY | 4.0 | |
| Value:24   NNNYY | 6.0 | |
| Value:25   YNNYY | 4.0 | |
| Value:26   NYNYY | 5.0 | |
| Value:27   YYNYY | 4.0 | |
| Value:28   NNYYY | 7.0 | |
| Value:29   YNYYY | 4.0 | |
| Value:30   NYYYY | 5.0 | |
| Value:31   YYYYY | 3.0 | |
| 02. How do users typically access the inventory management system? | | 40 |
| A. No direct access, only reports are available | 1.5 | |
| B. Batched processing | 4.0 | |
| C. Interactive access using dial up, leased line or direct connect | 7.0 | |
| D. Access is not available to users | 0.1 | |
| 03. System Software Security | | 10 |
| 01. | | 100 |
| A. Are passwords used as a security feature within your inventory management system? | 0.0 | |
| B. Is there a standard entry password for all users? | 2.0 | |
| C. Are there standard entry passwords used by each department? | 4.0 | |
| D. Are there individually assigned passwords? | 5.0 | |
| E. Are individual passwords periodically reissued? | 8.0 | |
| 04. Features | | 30 |
| 01. Which of the following are features of the inventory management system? | | 100 |
| A. Basic editing - form number, quantity | 1.5 | |
| B. Minimum/maximum levels | 0.3 | |
| C. Rationing | 0.3 | |
| D. Back-ordering | 1.5 | |
| E. Control of critical numbered forms | 1.5 | |
| F. Automated carrier selection | 0.3 | |
| G. System supported physical inventory | 0.5 | |
| H. Usage history by item | 1.5 | |
| I. Reports | 0.6 | |
| 05. Customer Service | | 10 |
| 01. | | 100 |
| A. Are customer service personnel available to answer forms distribution inquiries? | | |
| B. Are these customer service positions full-time? | | |
| C. Are the proper tools and training available to these personnel? | | |
| 06. Reports | | 30 |
| 01. Which best describes the reporting capabilities associated with the inventory management system? | | 100 |
| A. Reports generated by spreadsheet/software package | 1.0 | |
| B. Standard reports - not modifiable | 2.0 | |
| C. Standard reports with select/ sort/print Ad Hoc reports | 4.0 | |
| D. Query (what if) using on-line access | 5.0 | |
| E. Reports, query, and economic order quantity calculation capabilities | 8.0 | |
| F. Reports are not available | 0.1 | |
| 6. ACCOUNTS PAYABLE | | |
| 01. Accounts Payable | | 55 |
| 01. How are invoices typically received? | | 50 |

|   |   | VALUE | WEIGHT (%) |
|---|---|---|---|
| A. | Paper invoice received for each individual purchase order | 2.0 | |
| B. | Paper based summary billing | 4.0 | |
| C. | Magnetic media exchange | 6.0 | |
| D. | EDI transmissions | 8.0 | |
| 02. | How are bills usually authorized for payment? | | 25 |
| A. | Individually by end users | 2.0 | |
| B. | Centrally by Accounts Payable | 4.0 | |
| C. | Centrally by Purchasing or Forms Control | 5.0 | |
| C. | Matched electronically with exception comparisons | 9.9 | |
| 03. | How do you usually remit payment? | | 25 |
| A. | Checks written manually | 2.0 | |
| B. | Checks printed through automated system | 4.0 | |
| C. | Credit cards | 5.0 | |
| D. | Electronic funds transfer | 8.0 | |
| 02. | Accounting | | 45 |
| 01. | Which best describes the current cost allocation process? | | 40 |
| A. | Manual cost allocation process by individual invoice (re-key entries) | 4.0 | |
| B. | Manual cost allocation by monthly summary (re-key entries) | 6.0 | |
| C. | Computer program allocations cost from vendor supplied magnetic media | 8.0 | |
| D. | Cost allocation does not occur | 1.0 | |
| 02. | | | 60 |
| A. | Is the Accounts Payable system automated? | 2.0 | |
| B. | Is it integrated with the Purchasing system? | 2.0 | |
| C. | Is it integrated with the warehousing operation system? | 2.0 | |
| D. | Is it integrated with the Inventory Management System? | 2.0 | |

The information gathering operation in the field computer 1 now having been described, scoring and processing will now be described with respect to FIGS. 6A–6AA and the screens of FIGS. 7A–7L.

Figure 6A:
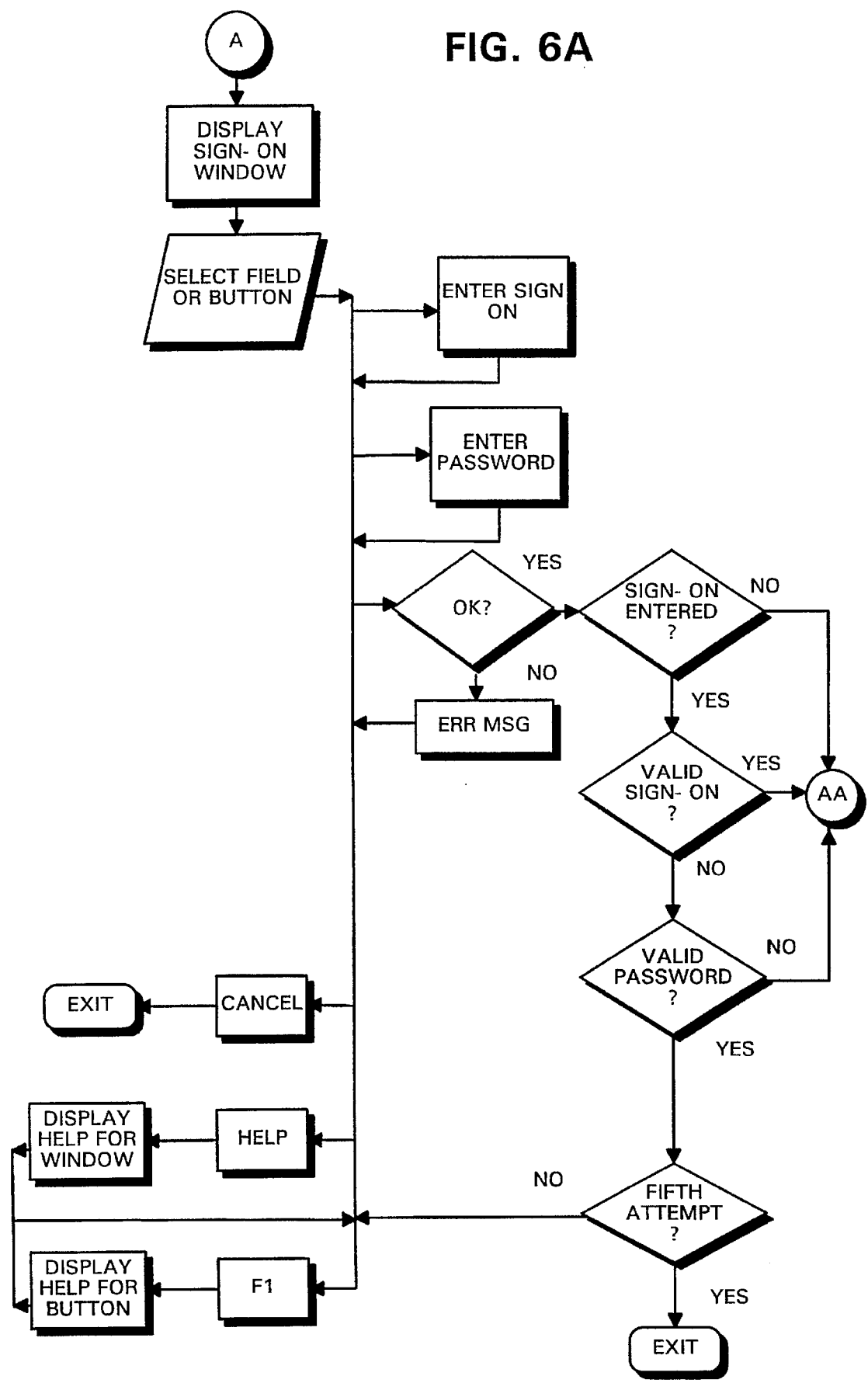
FIGS. 6A–6AA are high level flow sheets showing various exemplary routines and sub-routines for use with the home unit of the invention, for practicing home unit routines.
Figure 6A:
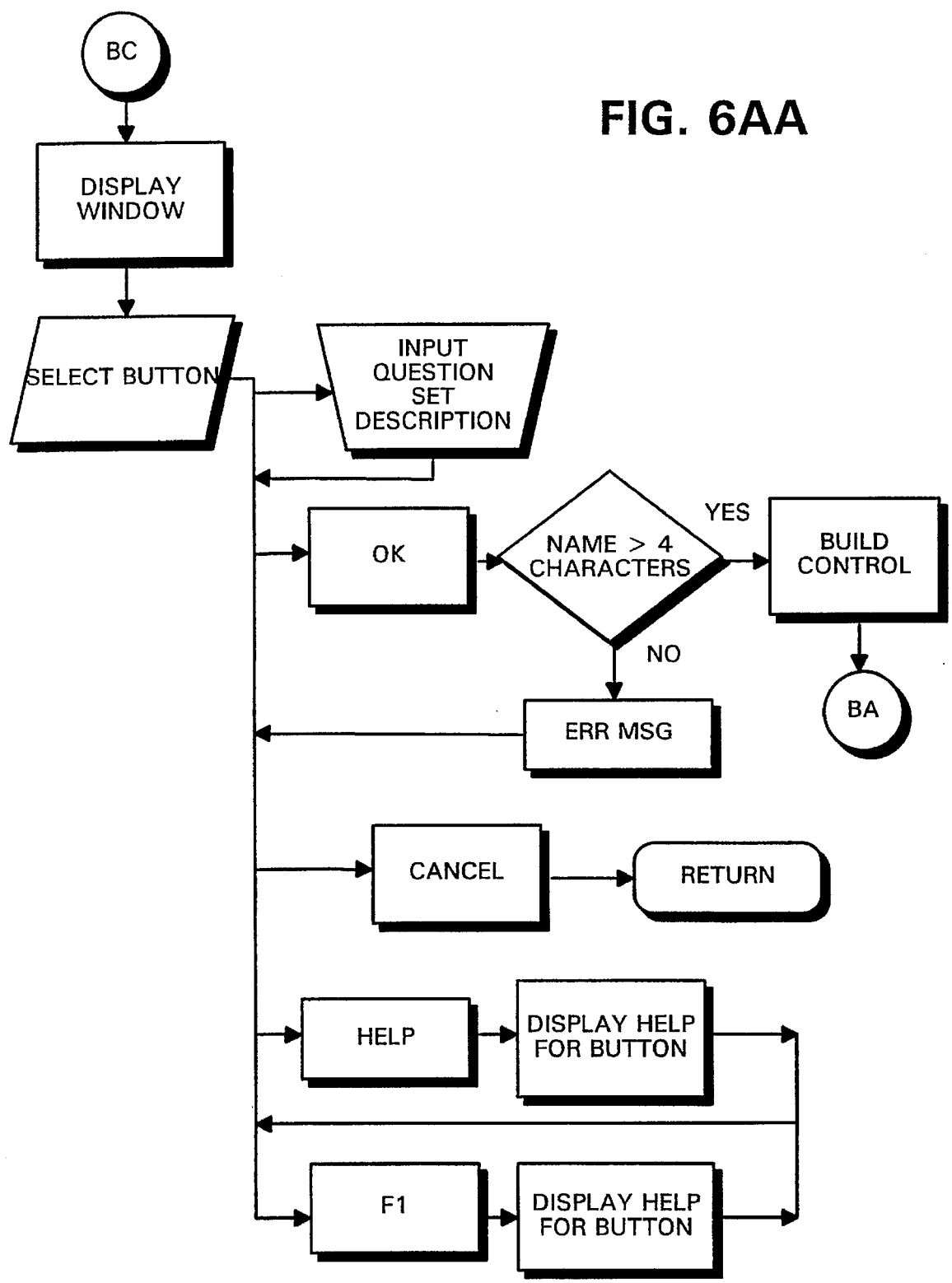
Figure 6B:
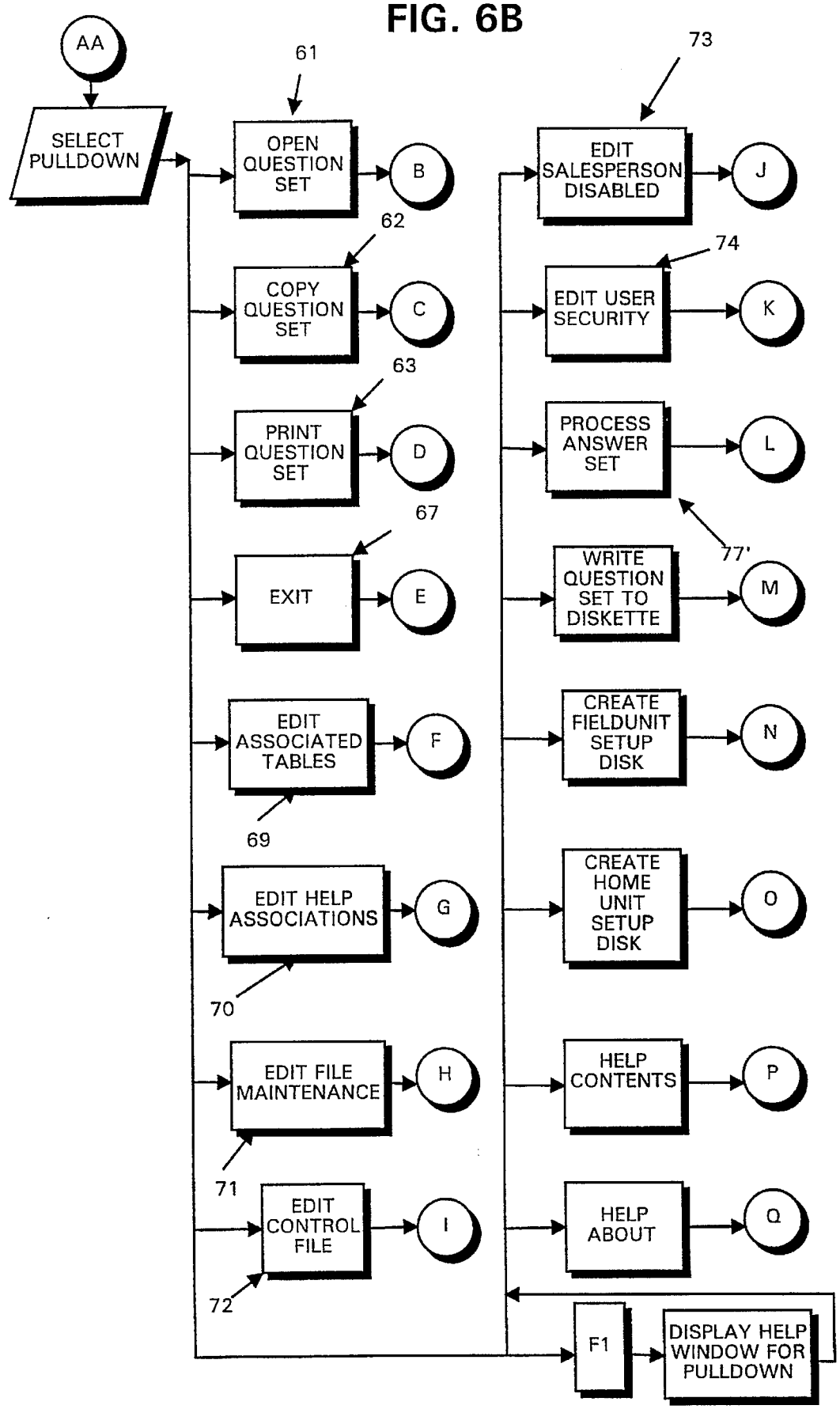

FIG. 6A schematically shows a sign on procedure for the "home" computer 3. FIG. 7A shows the first screen that appears on the computer 3 once the sign on procedure of FIG. 6A has been completed, having four basic groups "File", "Edit", "Process", and "Help". In FIG. 7A the "File" menu items are displayed, along with "Exit". The menu items 61–63 from FIG. 7A are seen in FIG. 6B. The detailed descriptions of the flow sheets as indicated by the letters with surrounding circles are shown in subsequent FIGURES. That is the detailed flow sheet associated with the first menu item "Open Question Set" is illustrated in FIG. 6C-1 and 6C-2, the detailed flow sheet associated with the second menu item 62 is shown in FIG. 6D, and the detailed flow sheet associated with the third menu item 63 is illustrated in FIG. 6E, while the "Exit" flow sheet is illustrated in FIG. 6F.

Figures 1, 6Y:
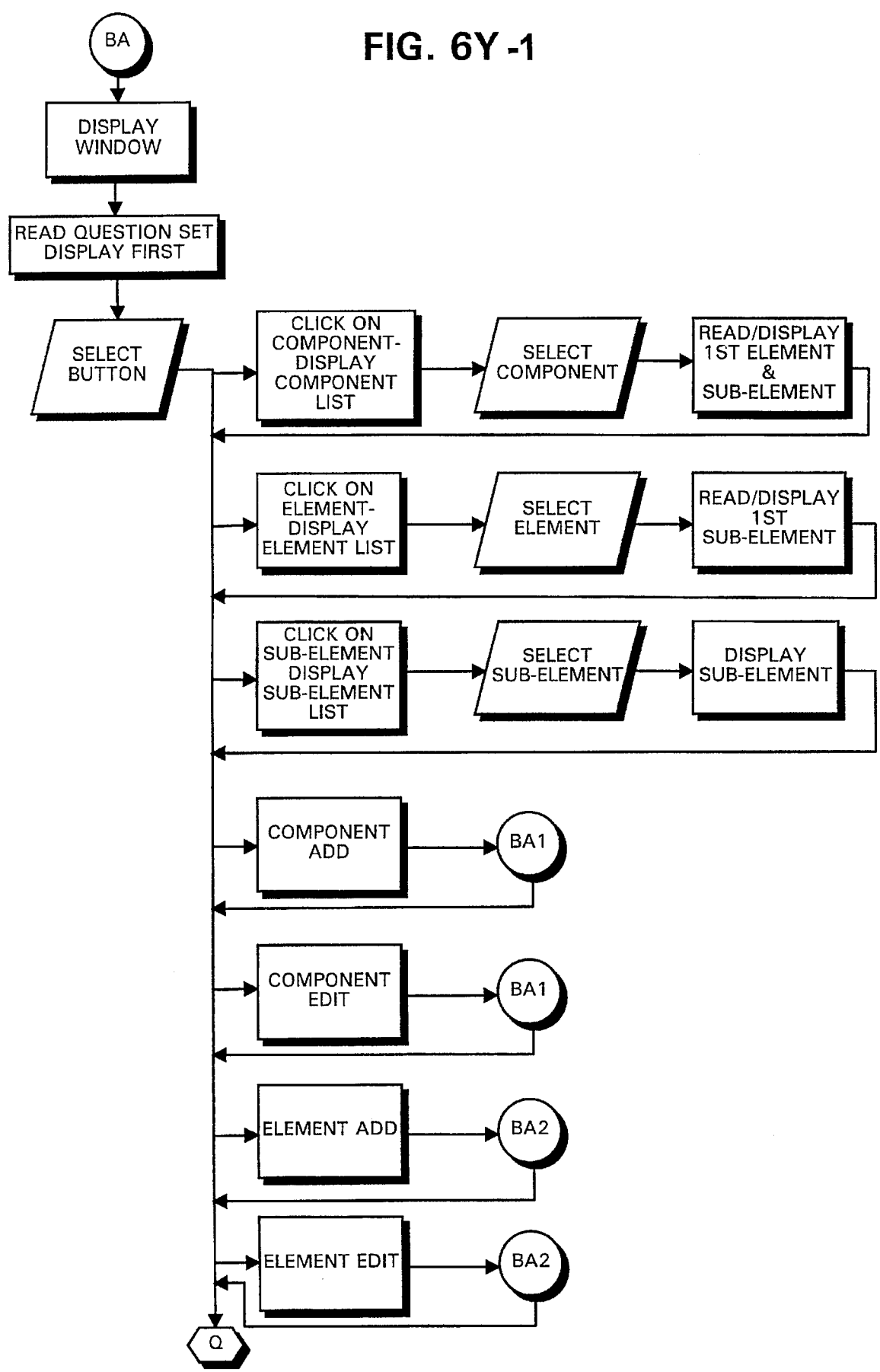
Figures 2, 6Y:
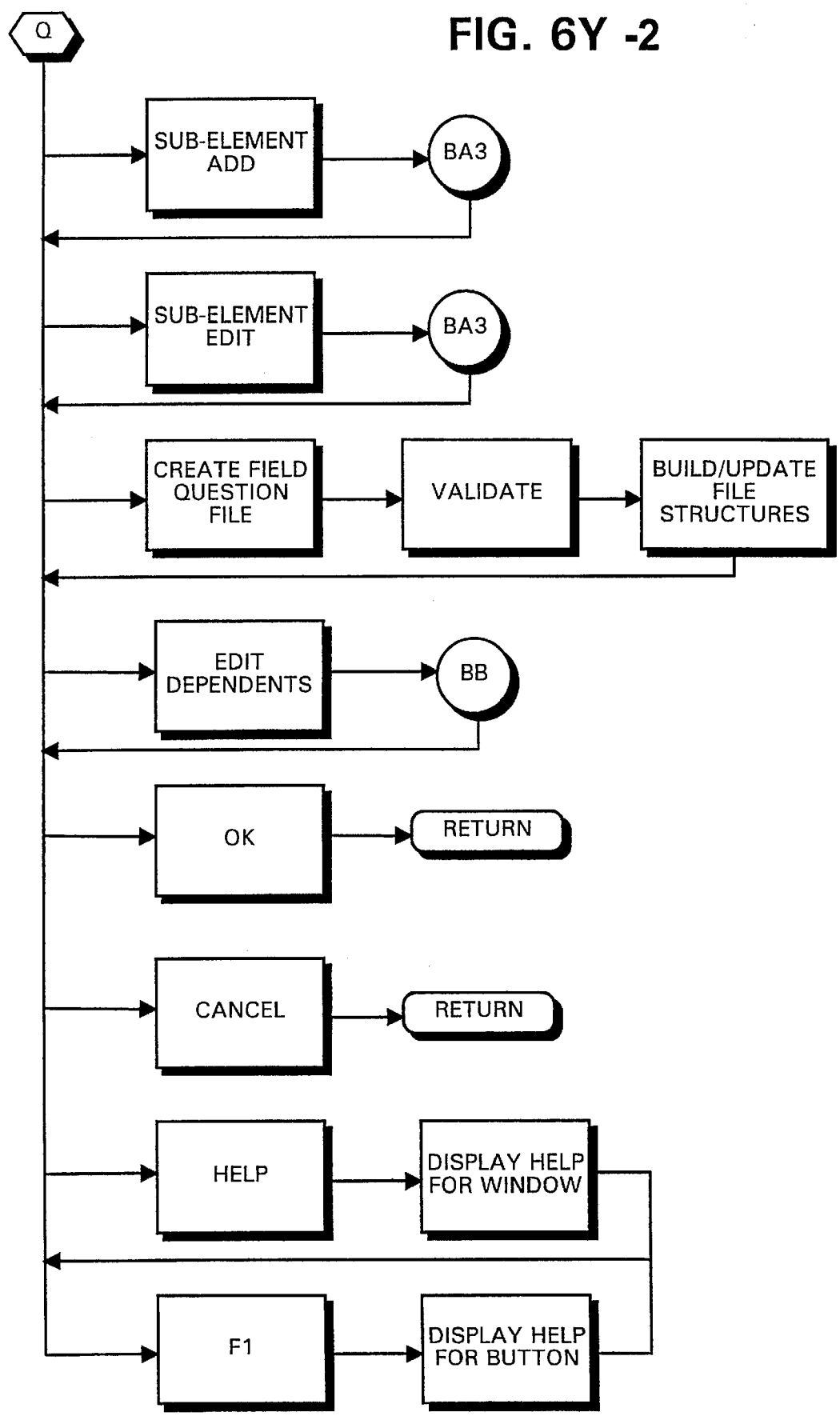
Figures 3, 6Y:
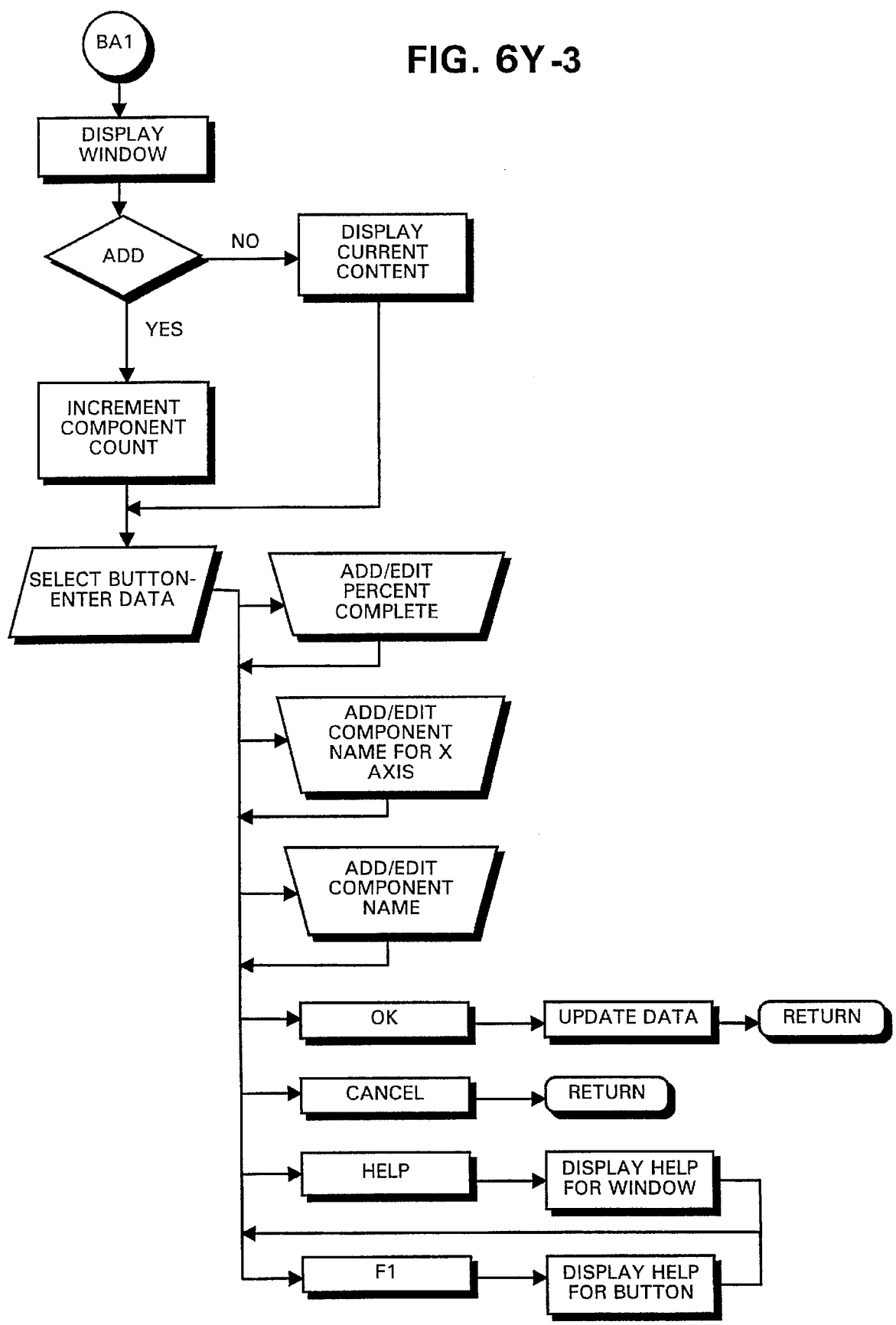
Figures 4, 6Y:
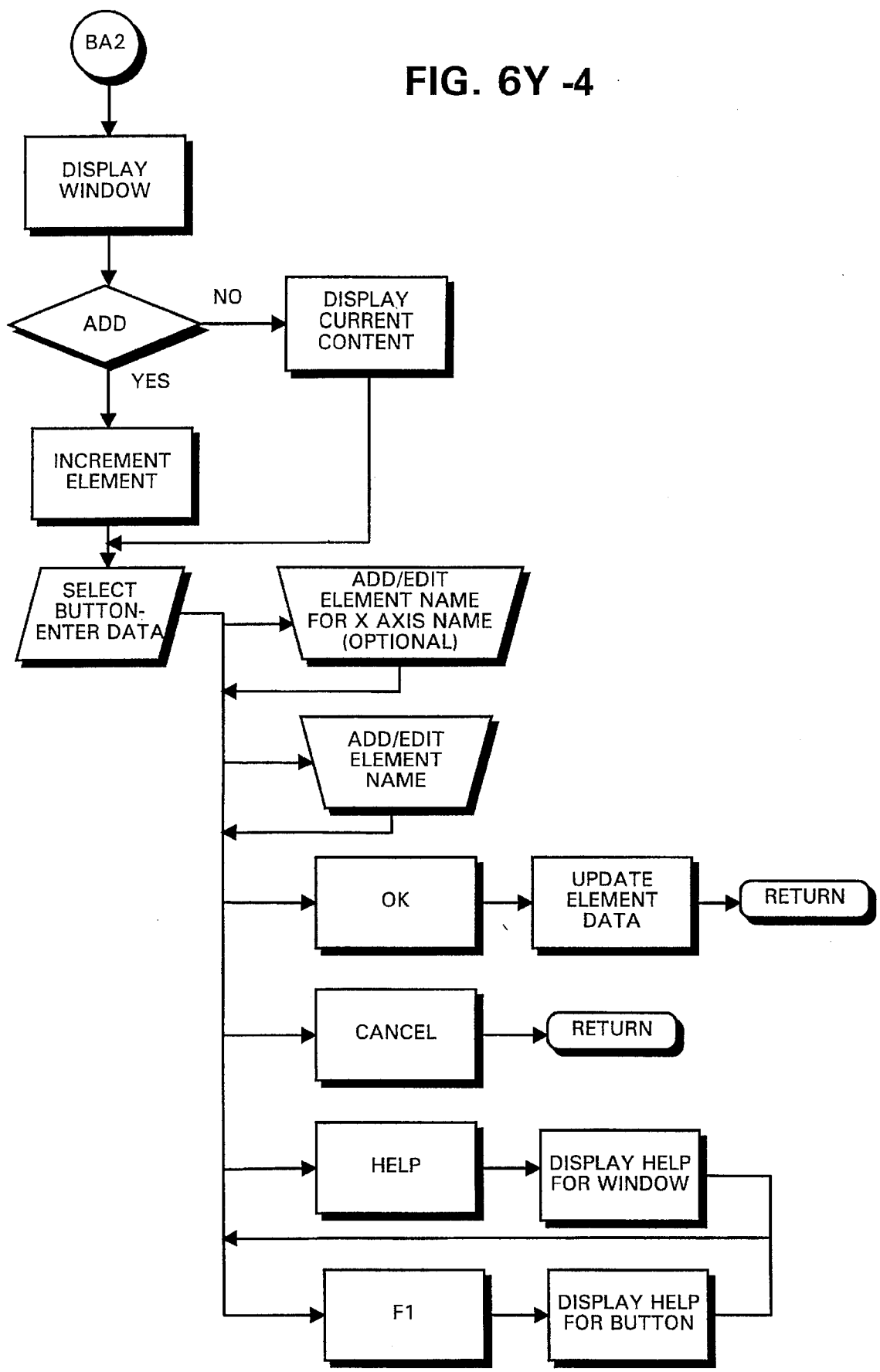
Figures 5, 6Y:
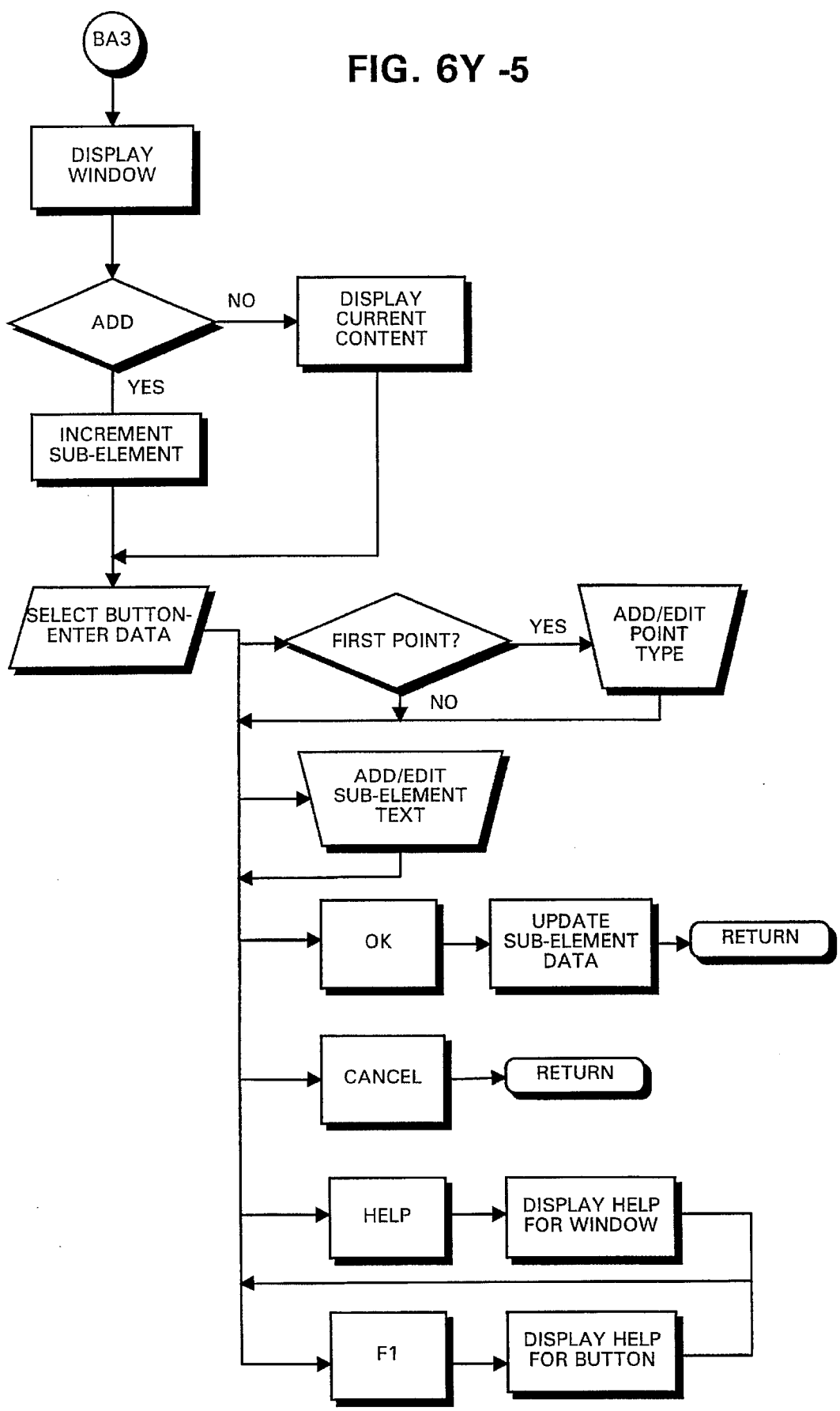
Figure 7A:
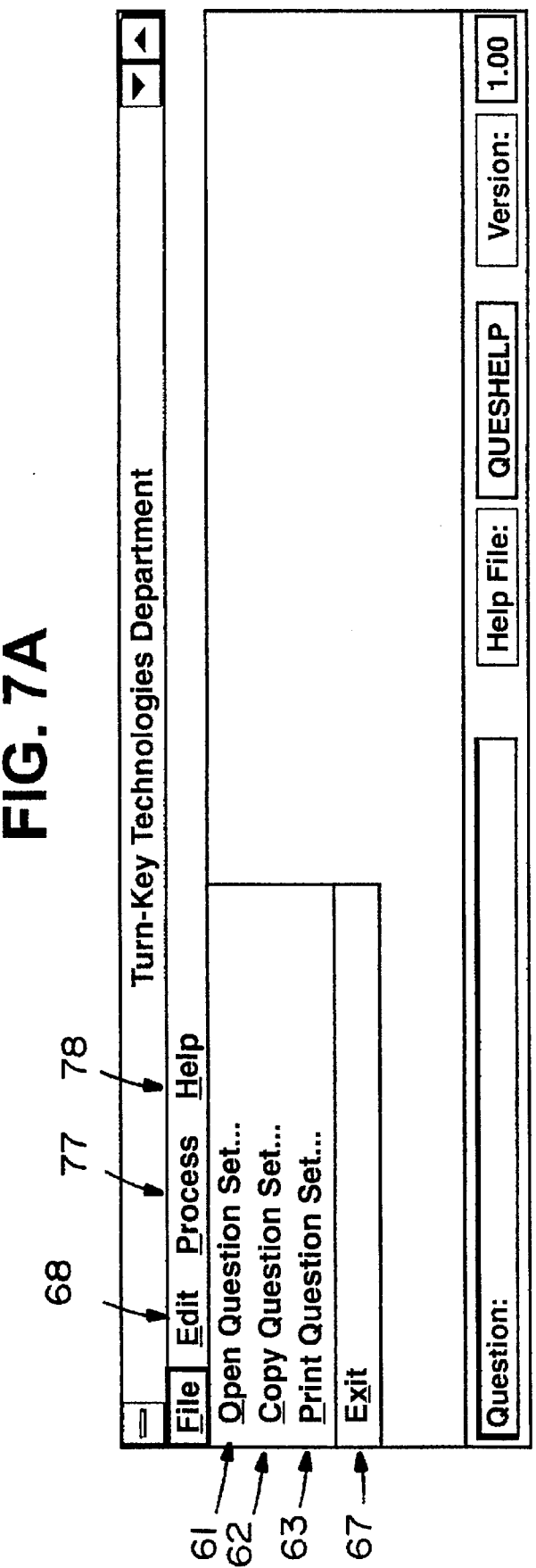
Figure 7B:
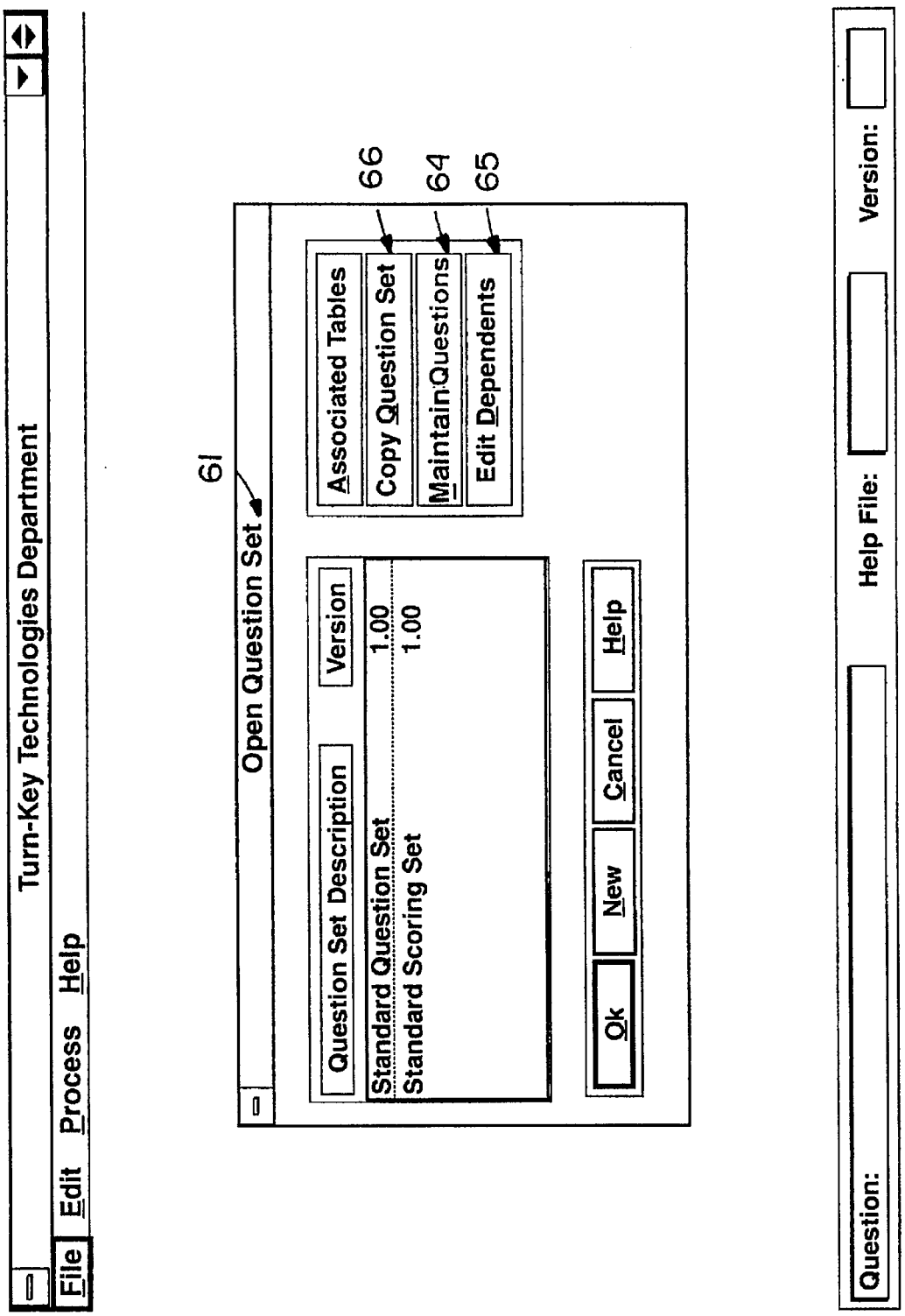

FIG. 7B is a schematic illustration of the screen 10 of the "home" computer 3 when menu item 61 is selected. FIG. 7C is a schematic of the screen when the "Maintain Questions" function 64 from the screen of FIG. 7B is selected. The question file is viewed, edited, or added to by scrolling through the four levels of questions within the question set, namely category, element, sub-element, and point. At each level one may add or edit entries. Typically there are up to 99 elements for each category, up to 99 sub-elements for each element, and up to ten points for each sub-element. The detailed flow sheet for element 64 "Maintain Questions" is shown in FIG. 6Y-1 through 6Y-5.

Figures 1, 6C:
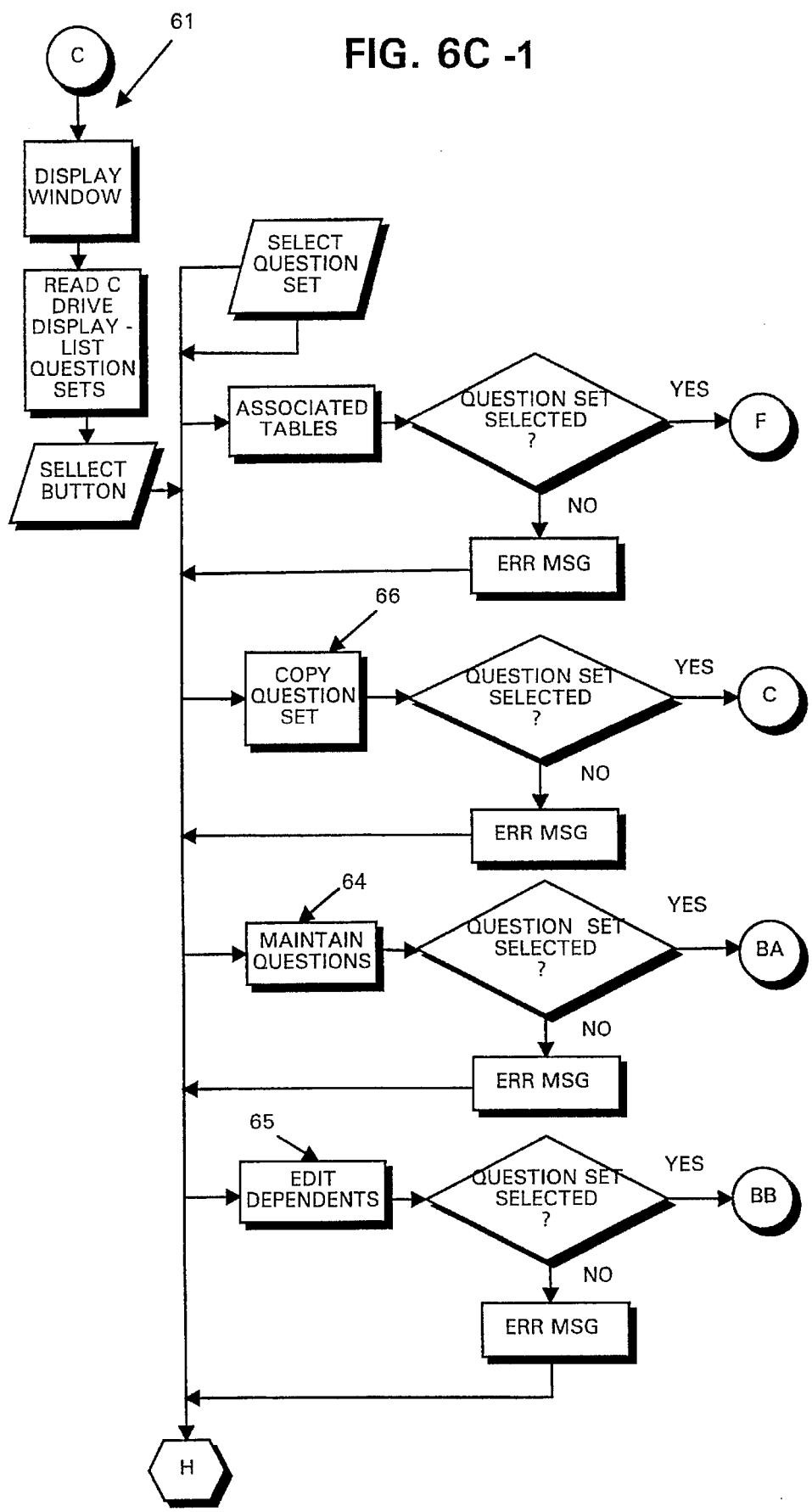
Figures 2, 6C:
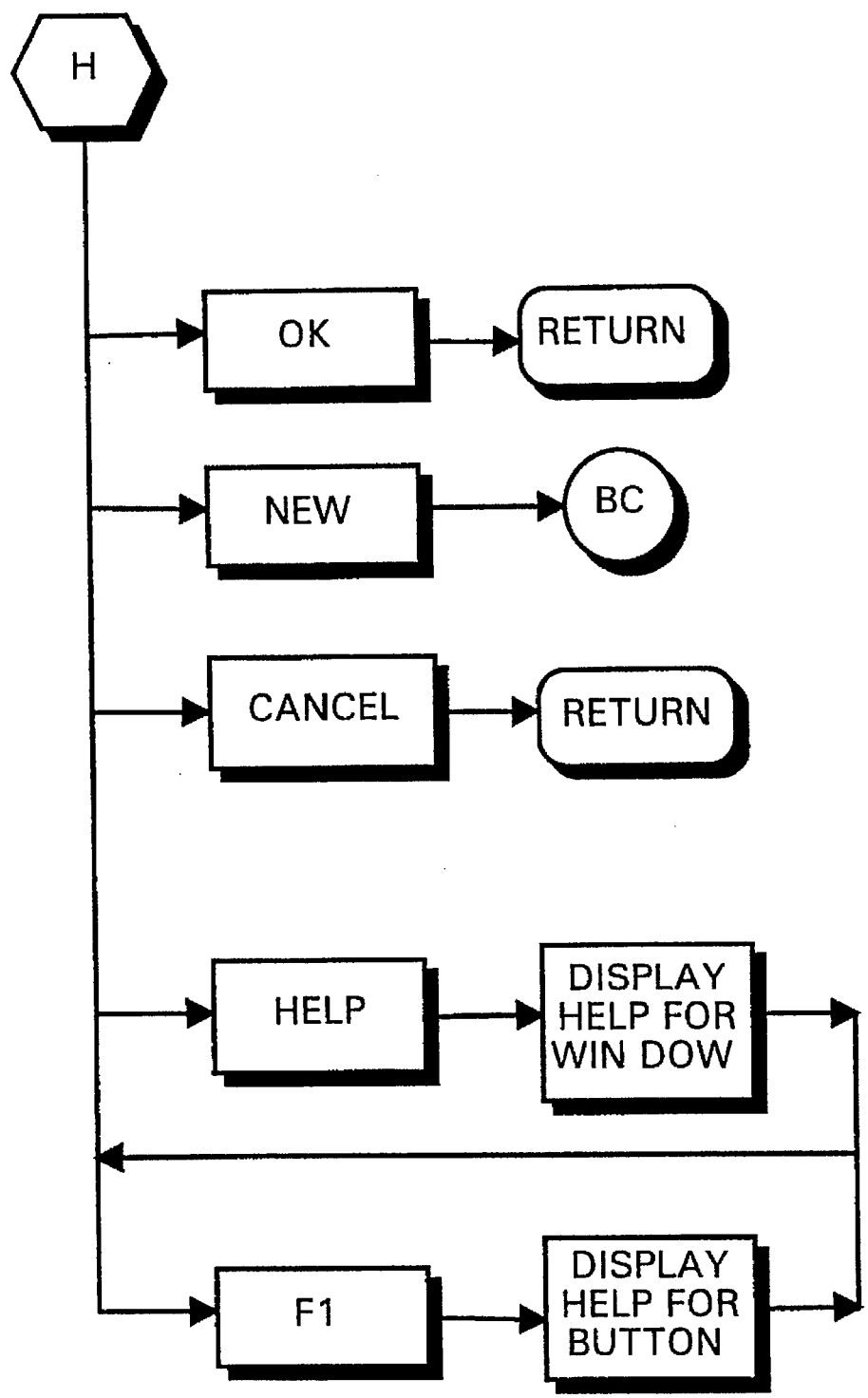
Figure 6D:
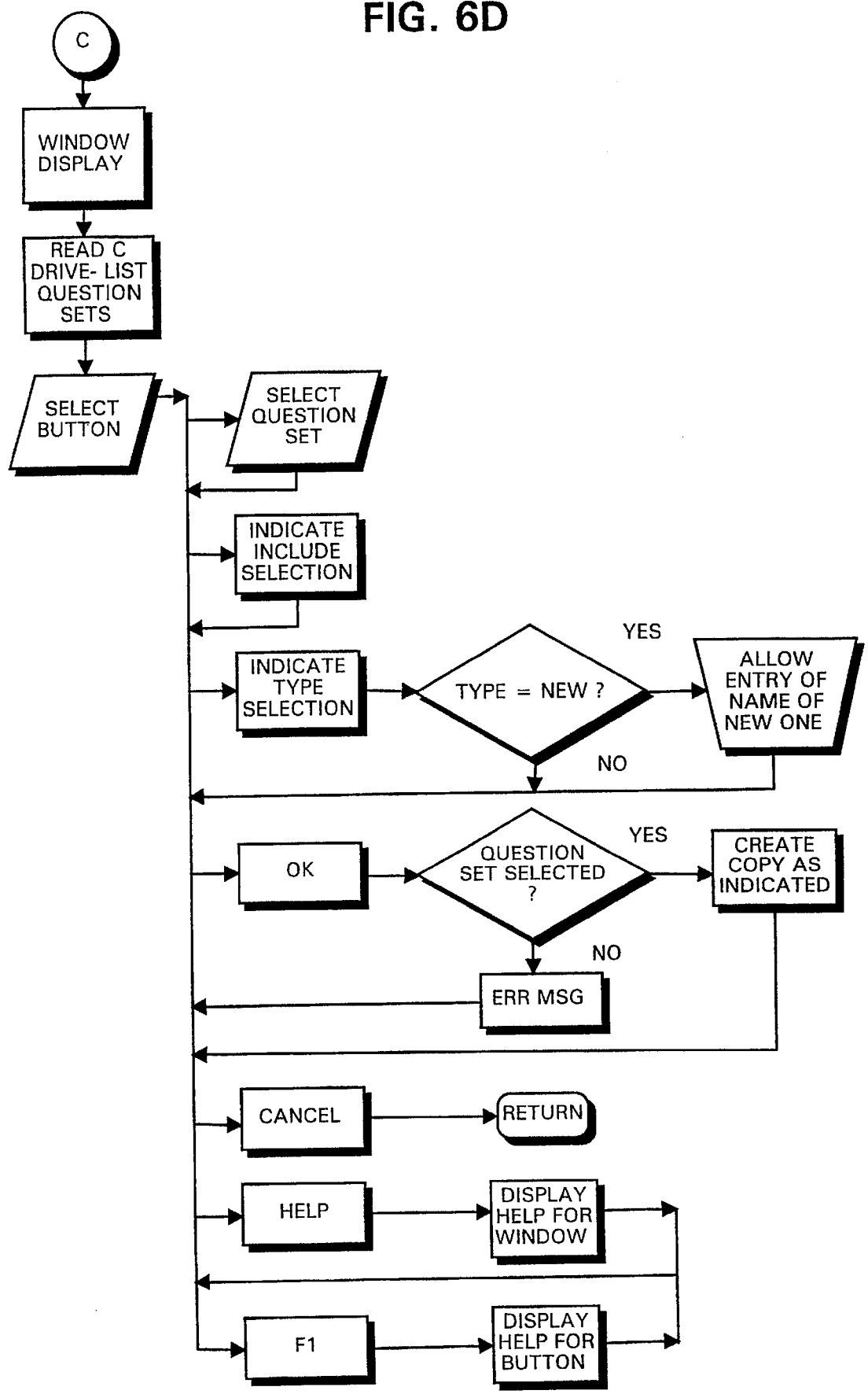
Figure 6E:
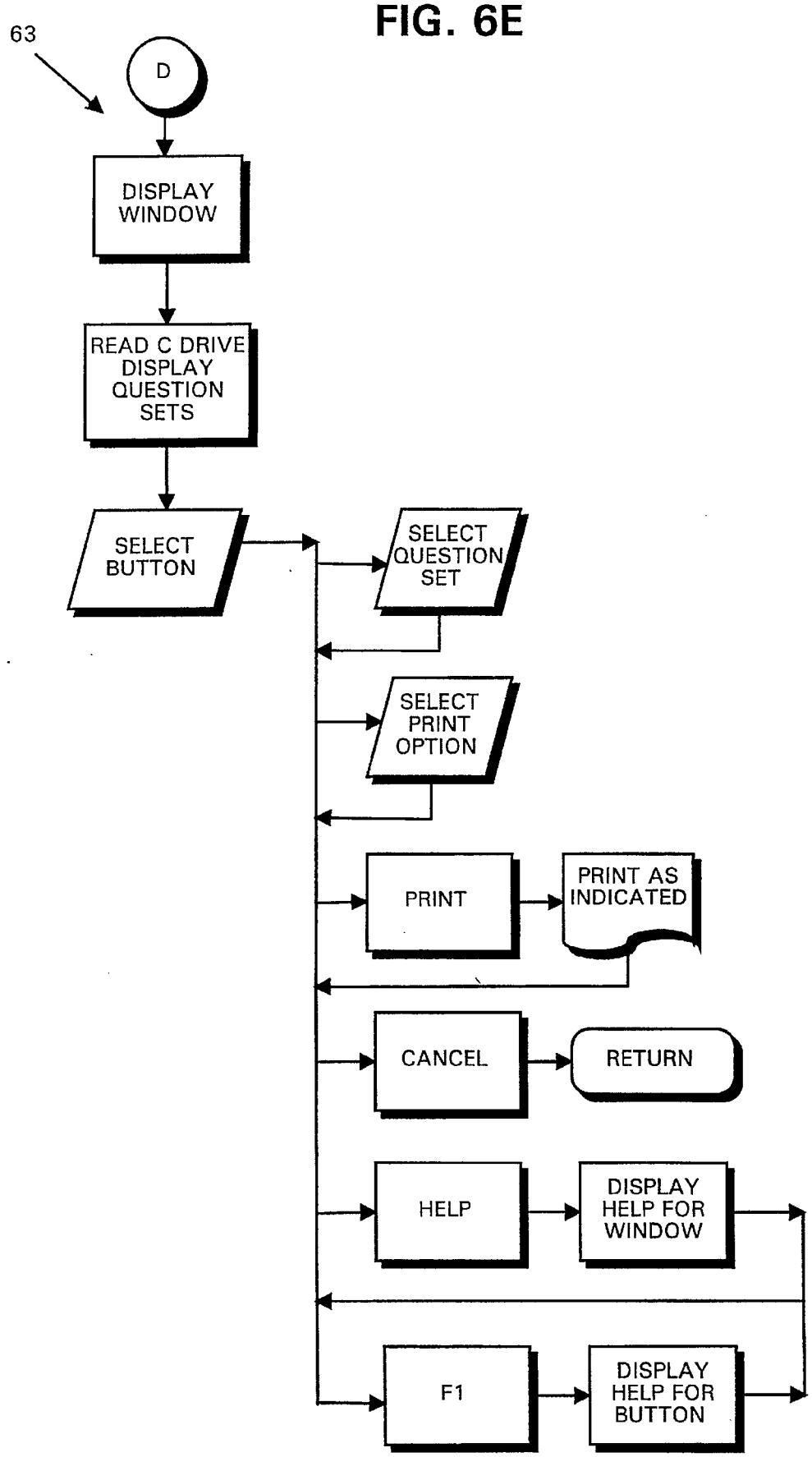
Figure 6F:
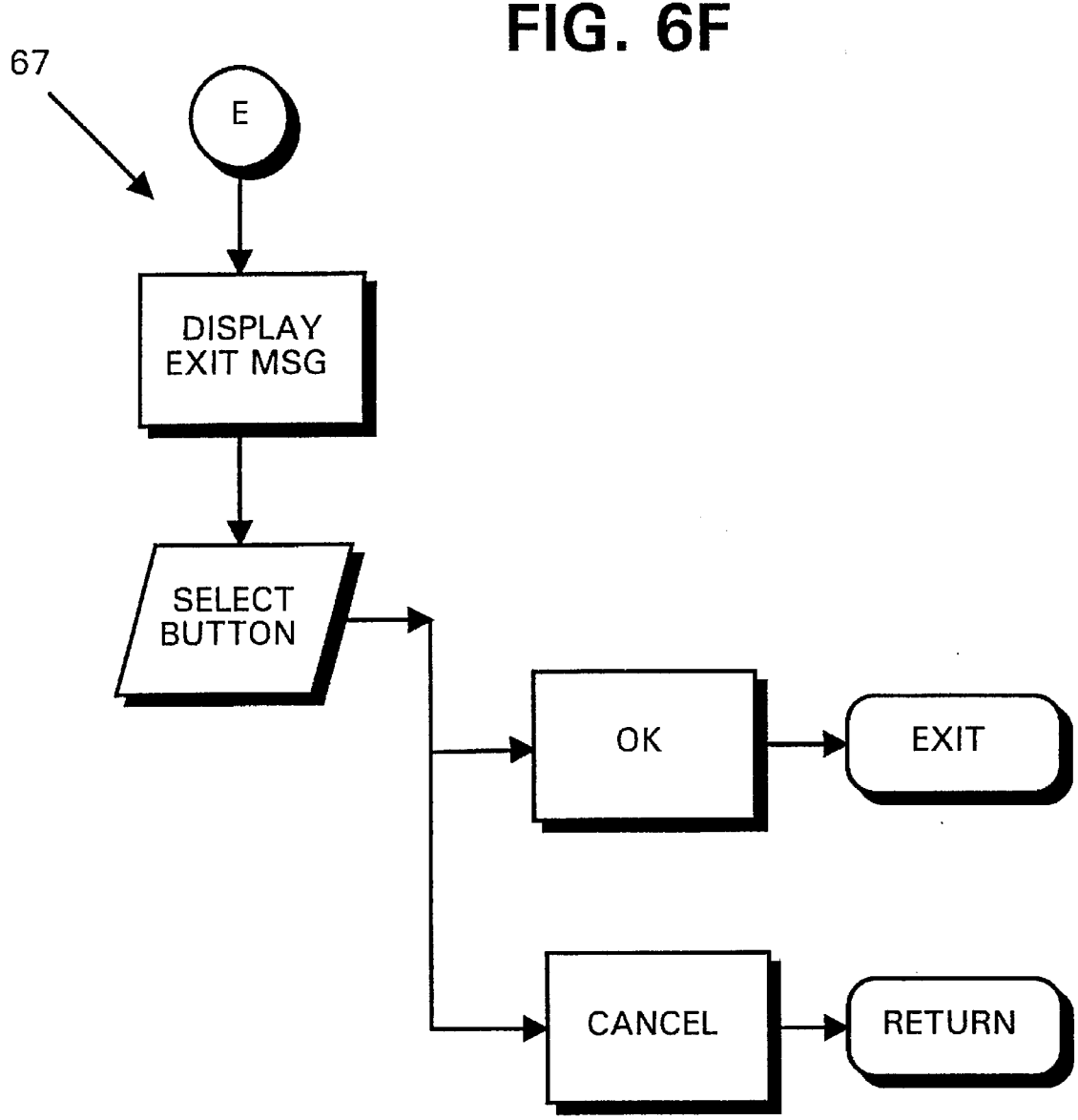
Figures 1, 6G:
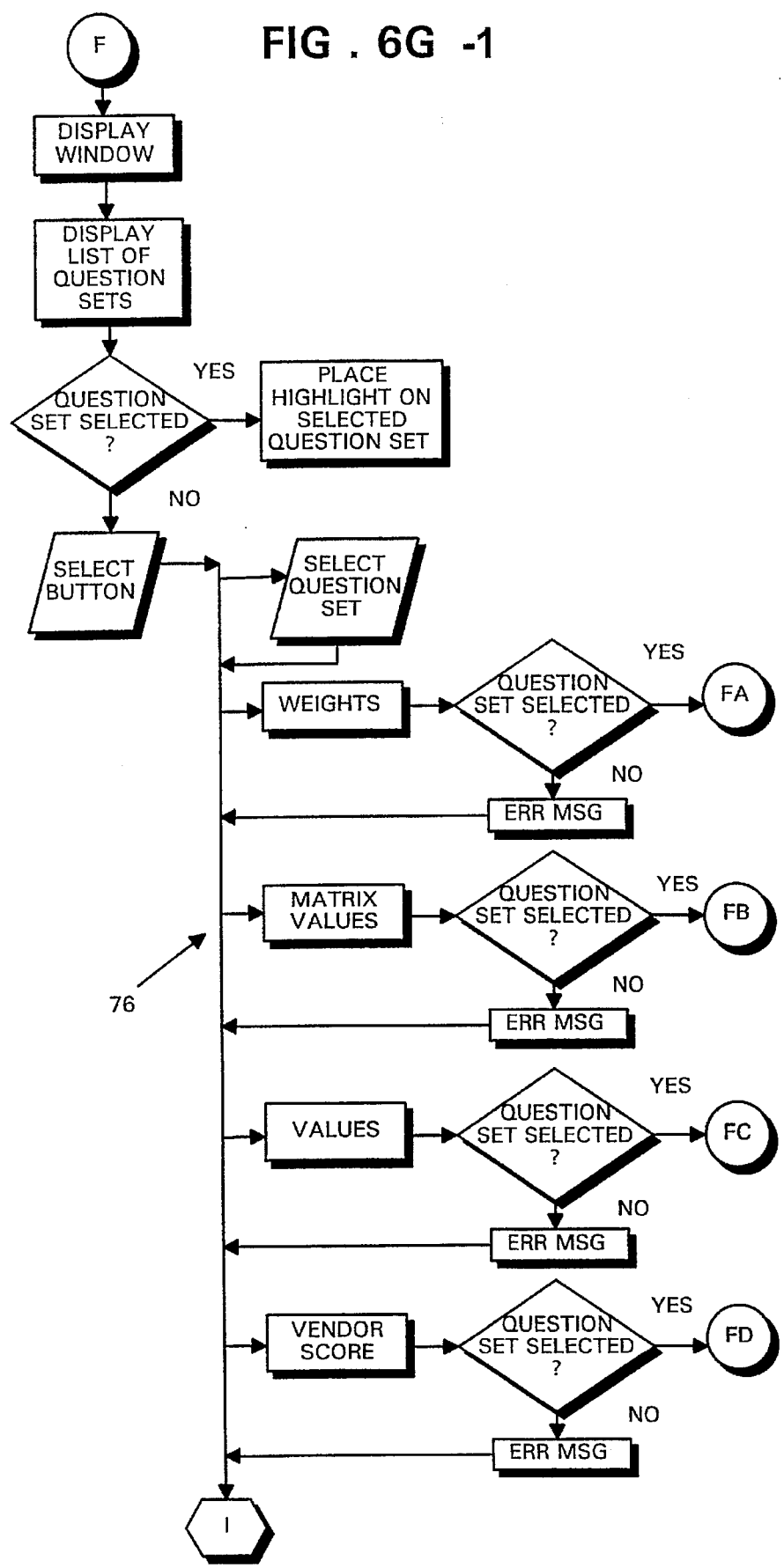
Figures 2, 6G:
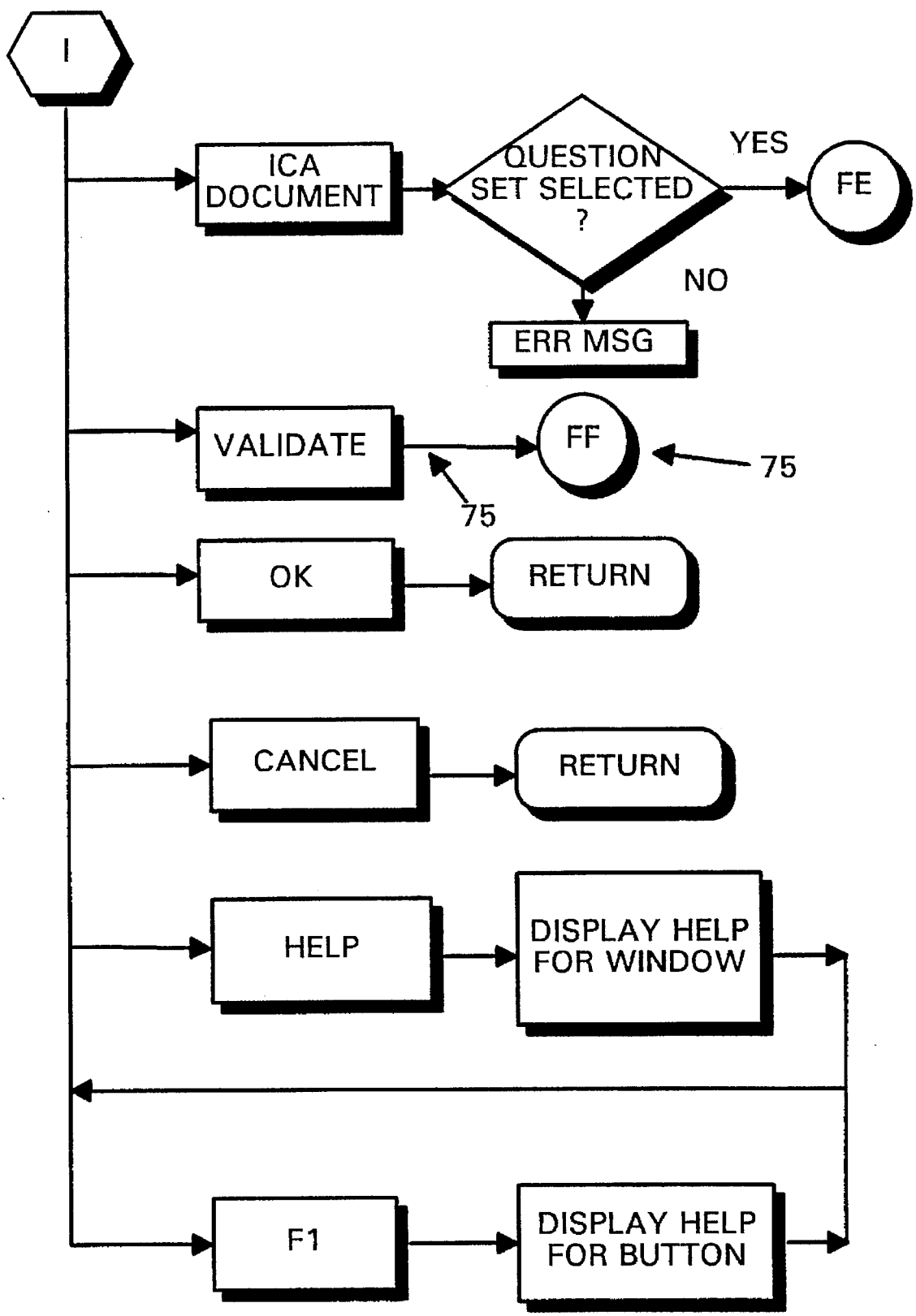
Figure 6H:
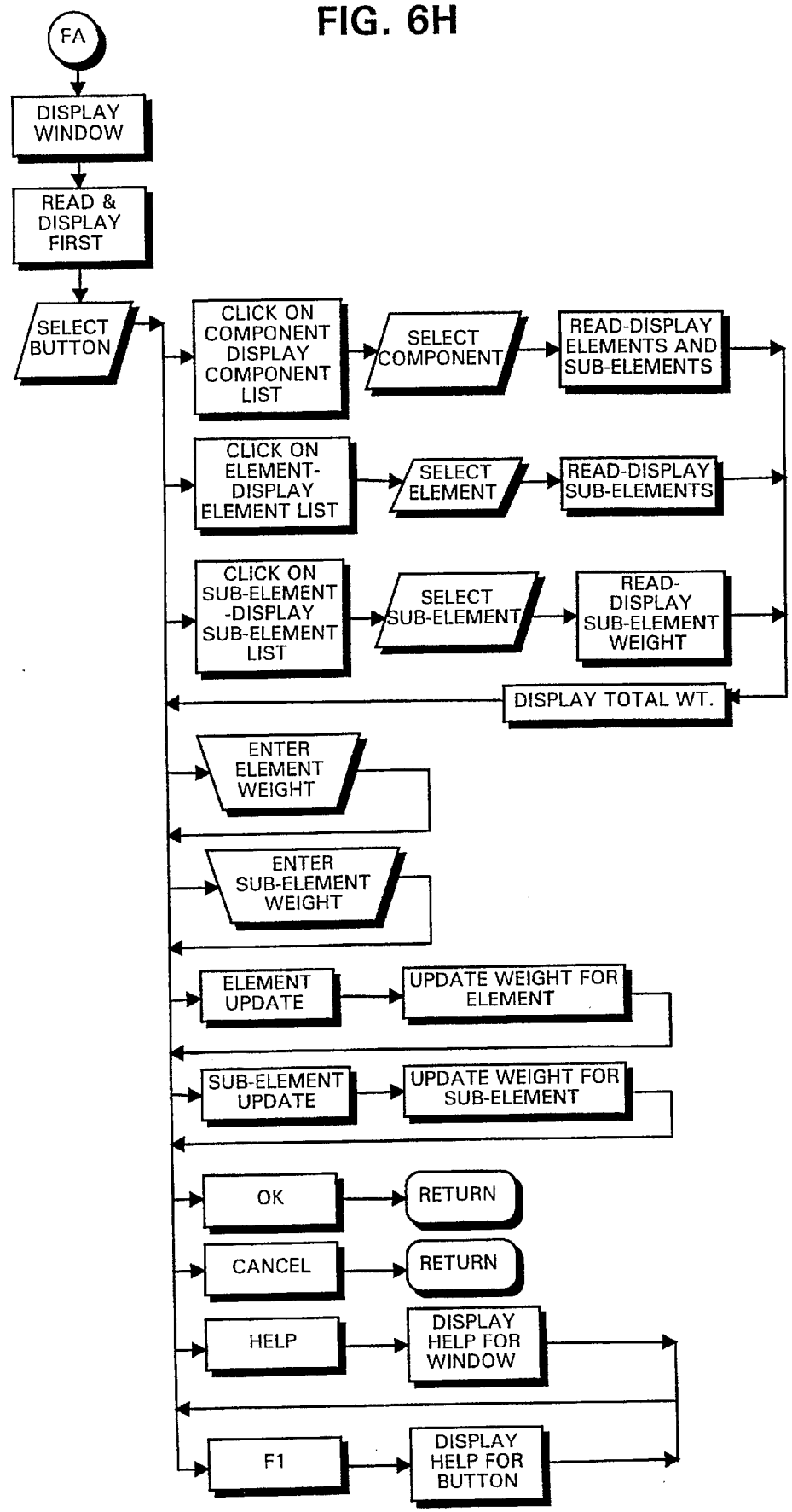
Figures 1, 61:
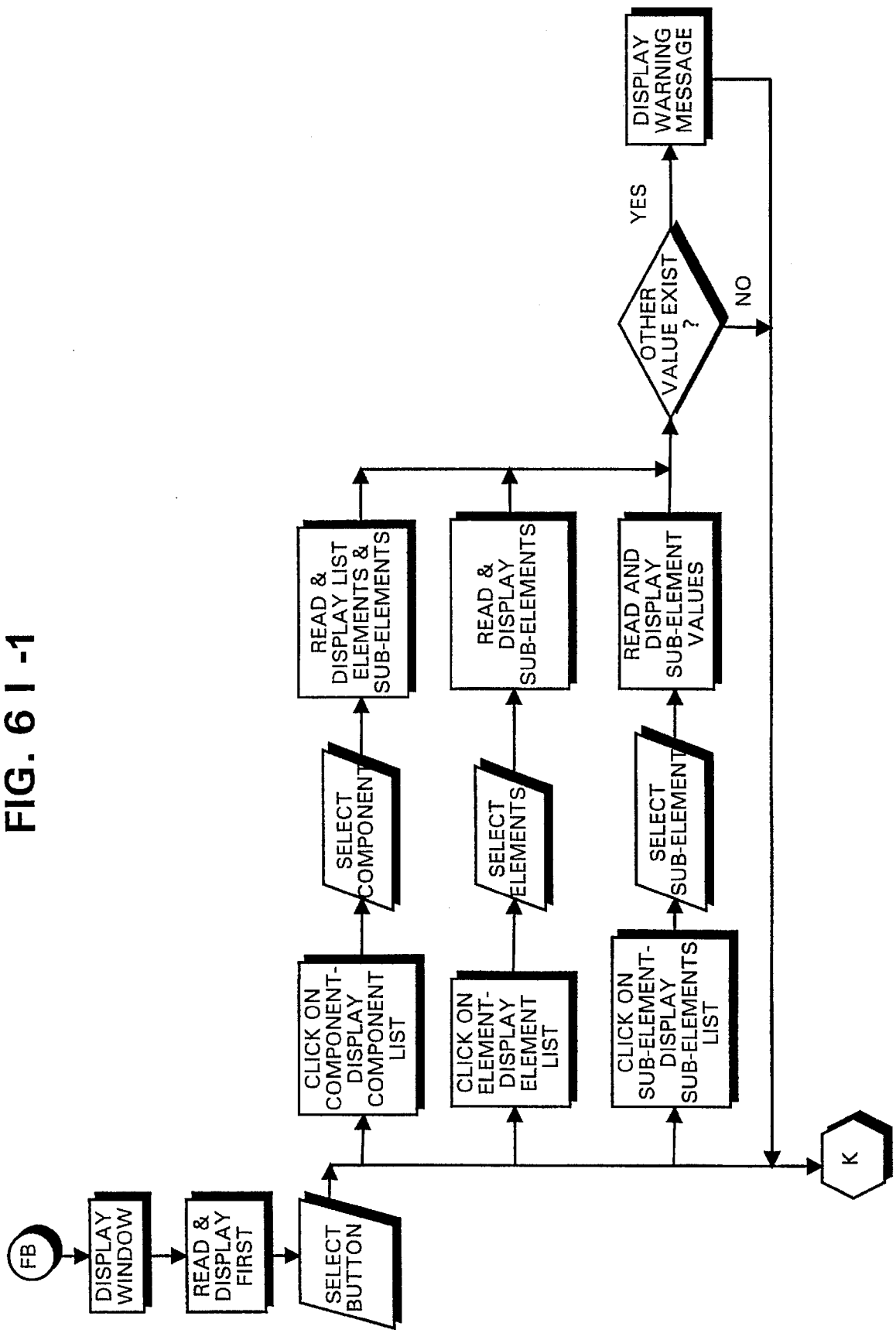
Figure 6:
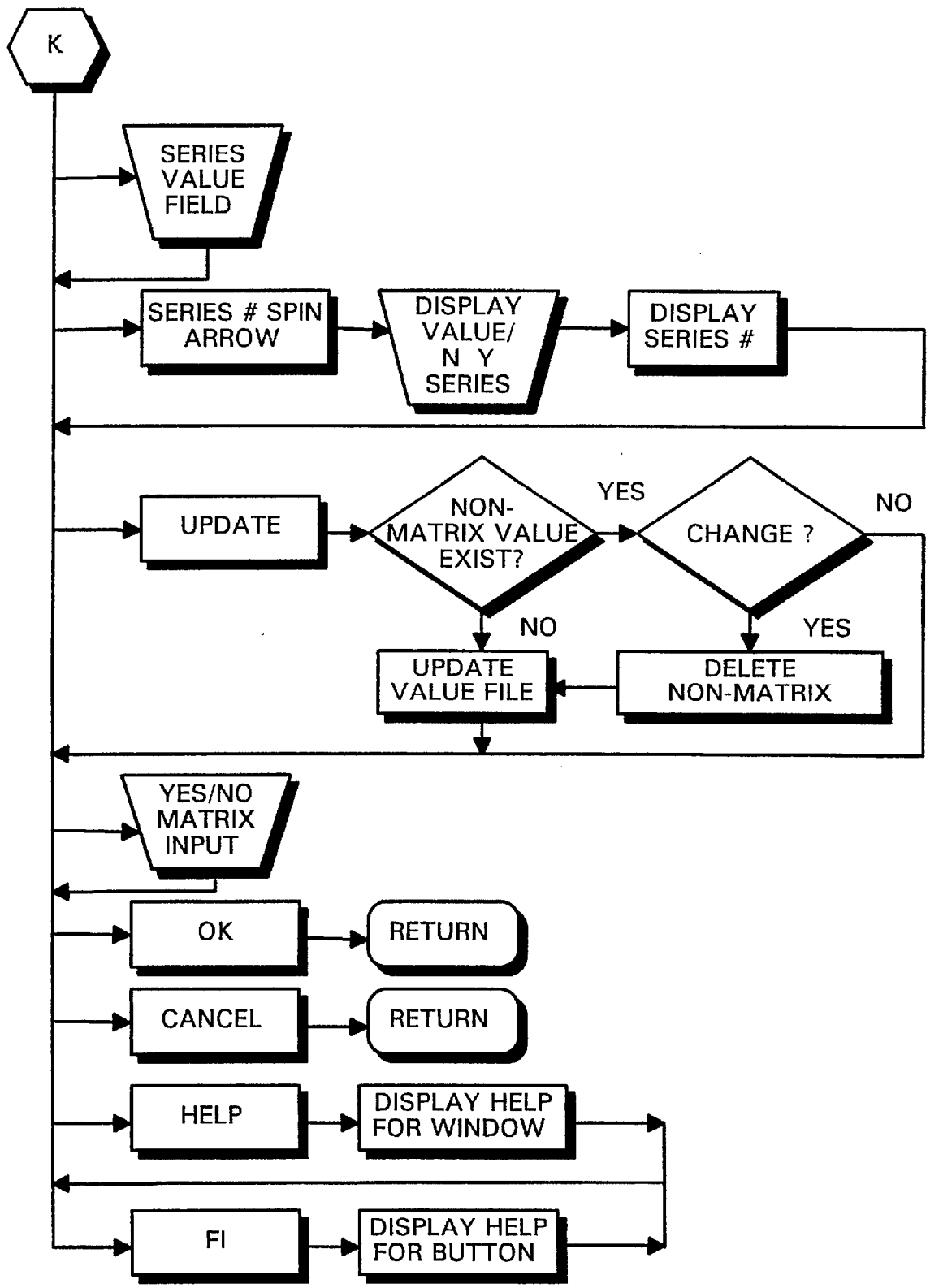
Figures 1, 6J:
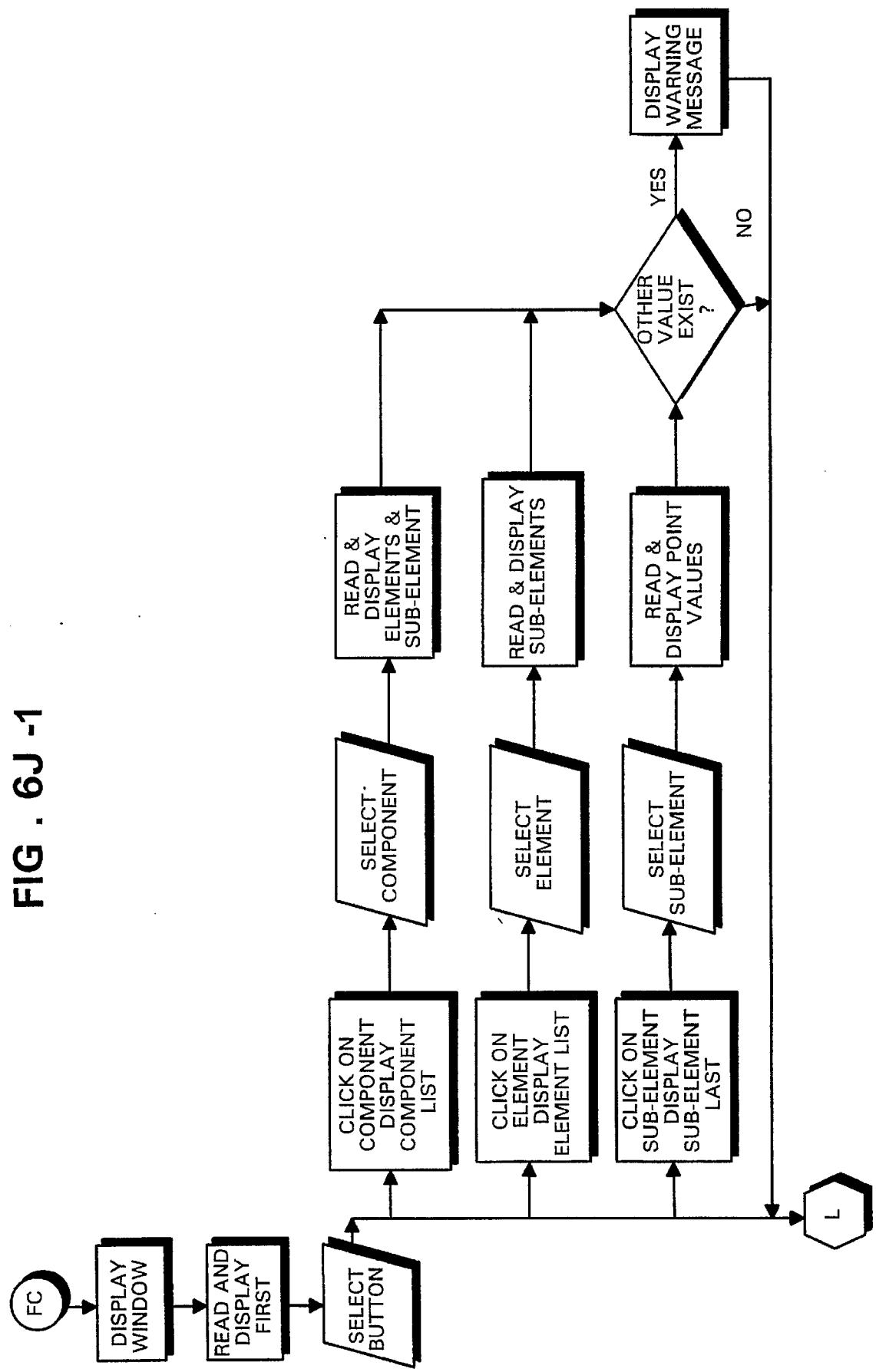
Figures 2, 6J:
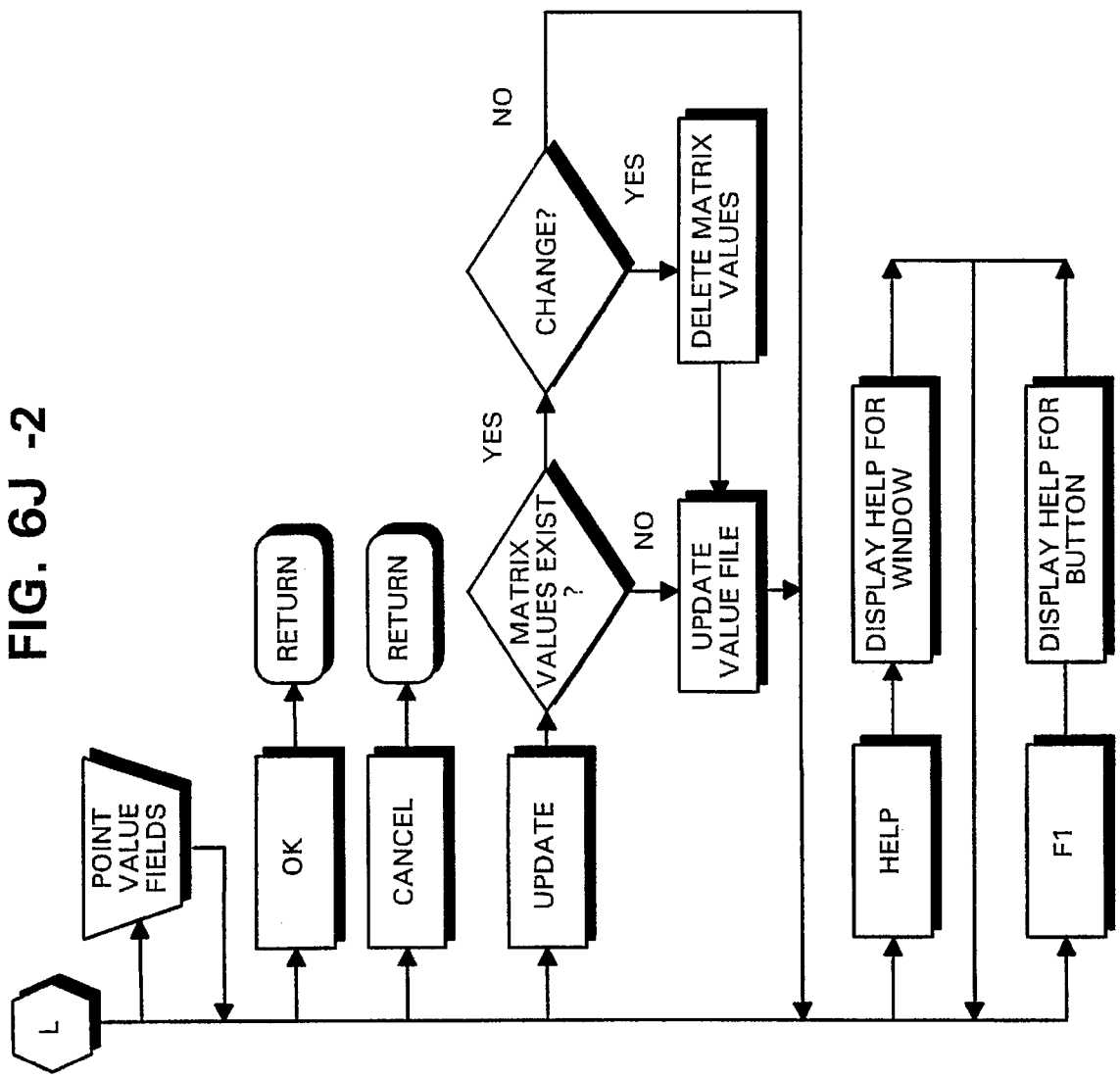
Figure 6K:
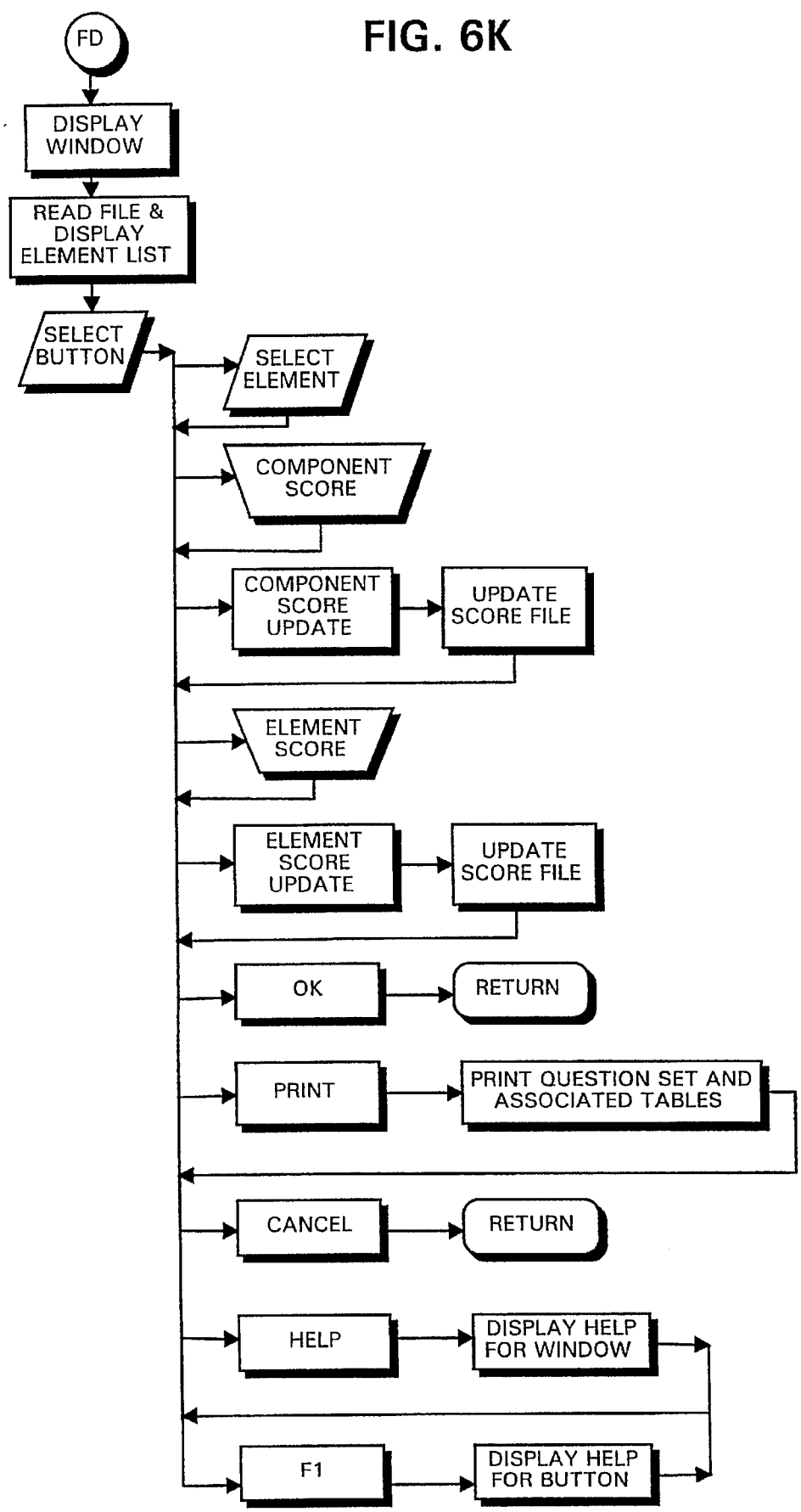
Figures 1, 6L:
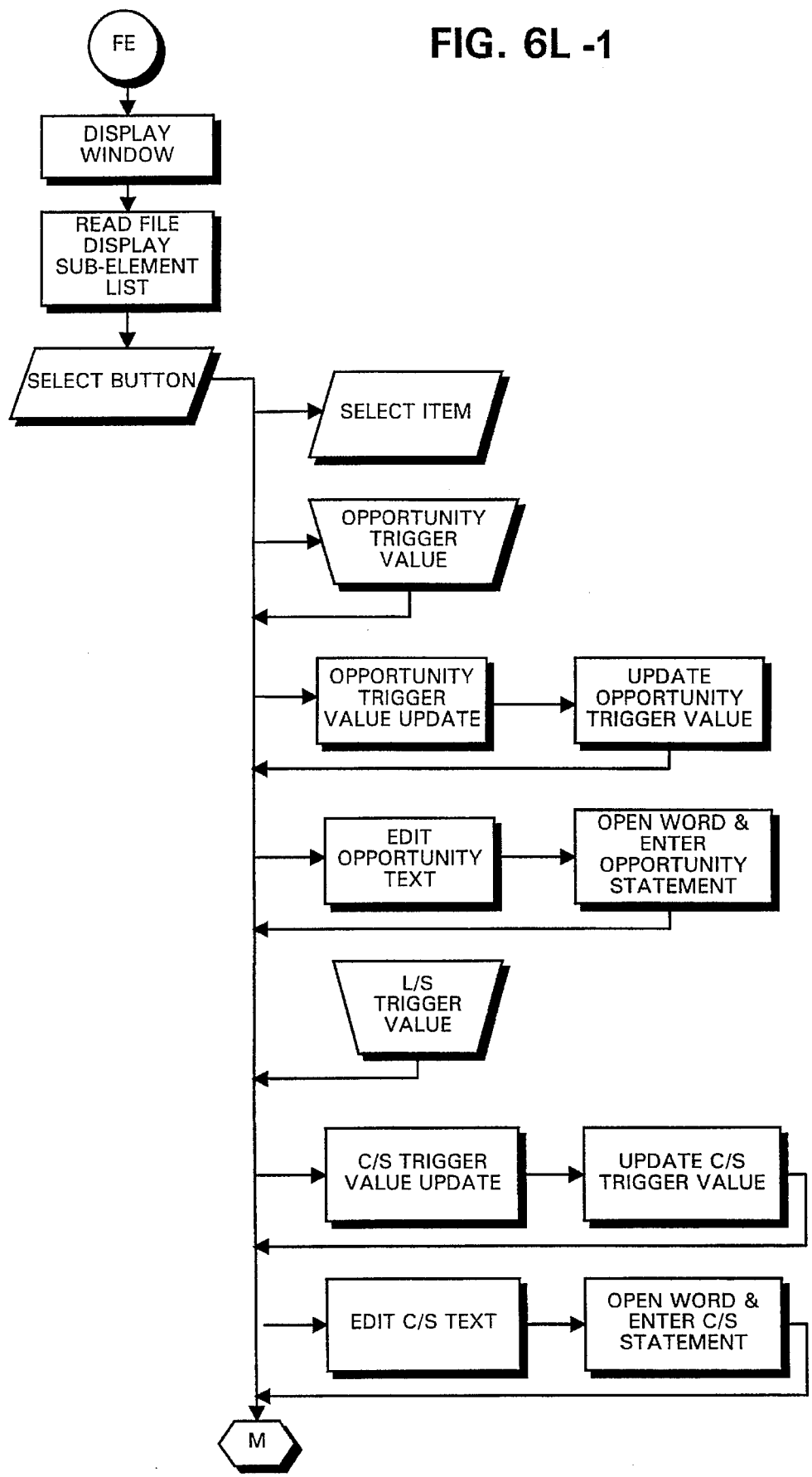
Figures 2, 6L:
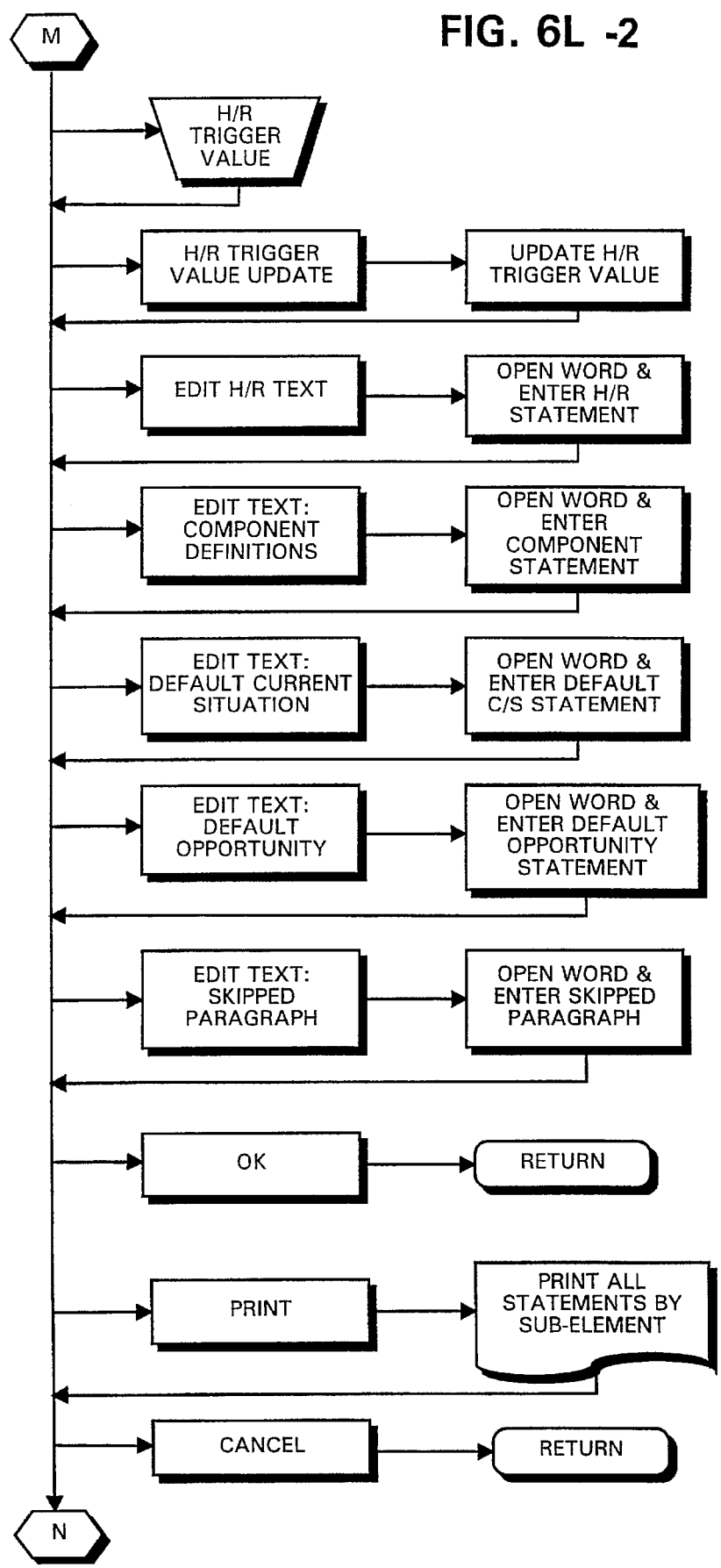
Figures 3, 6L:
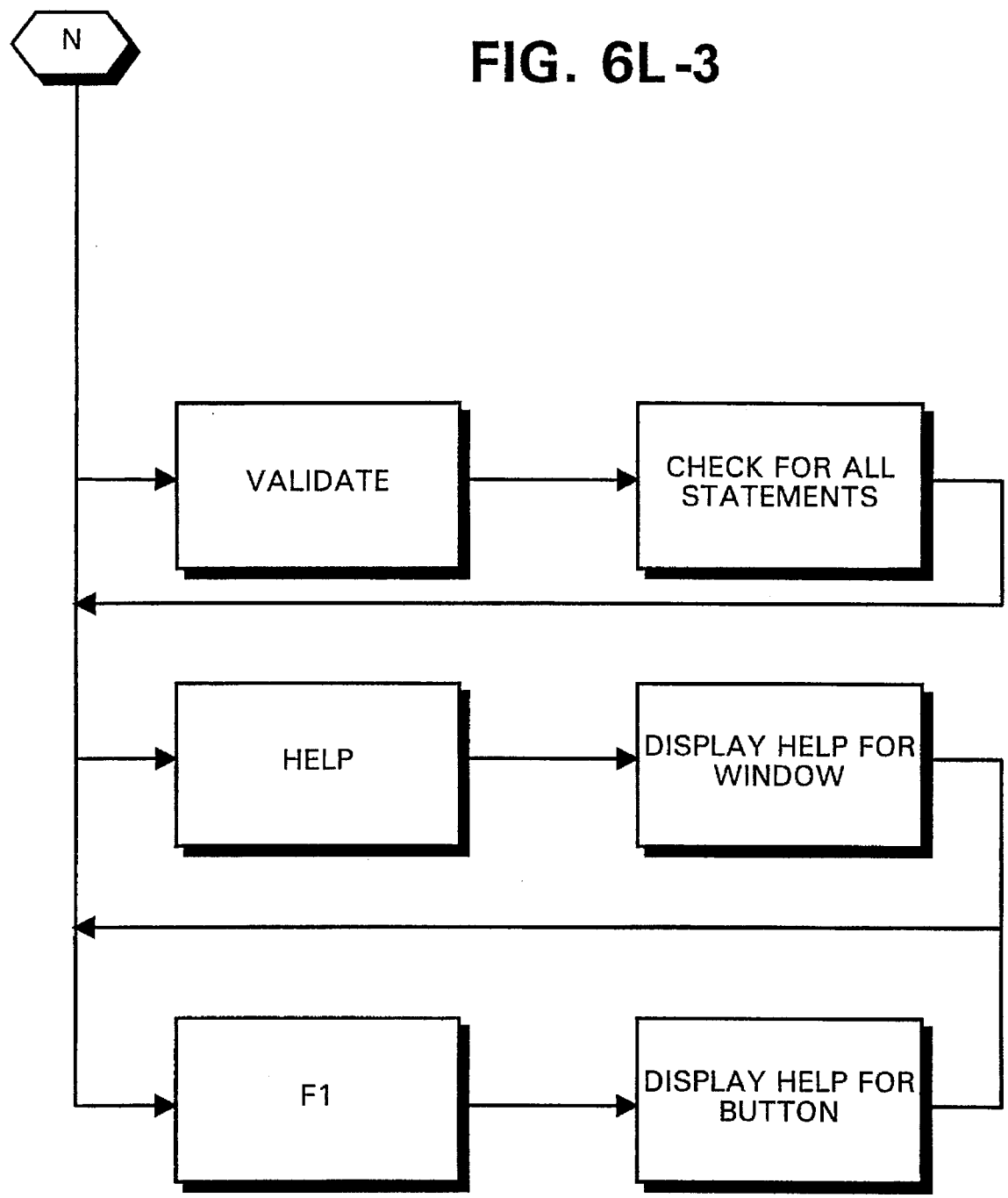
Figure 6M:
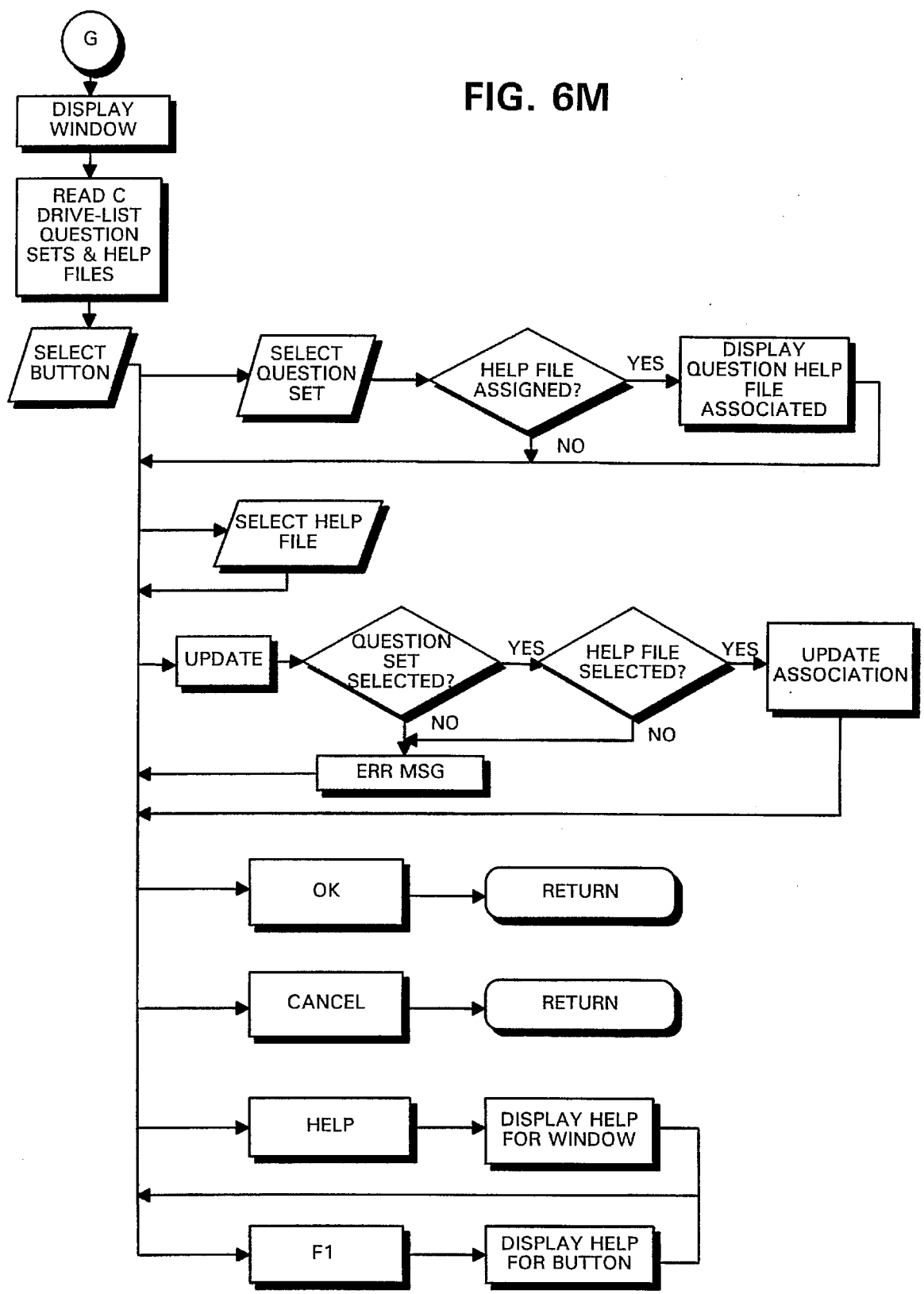
Figure 6N:
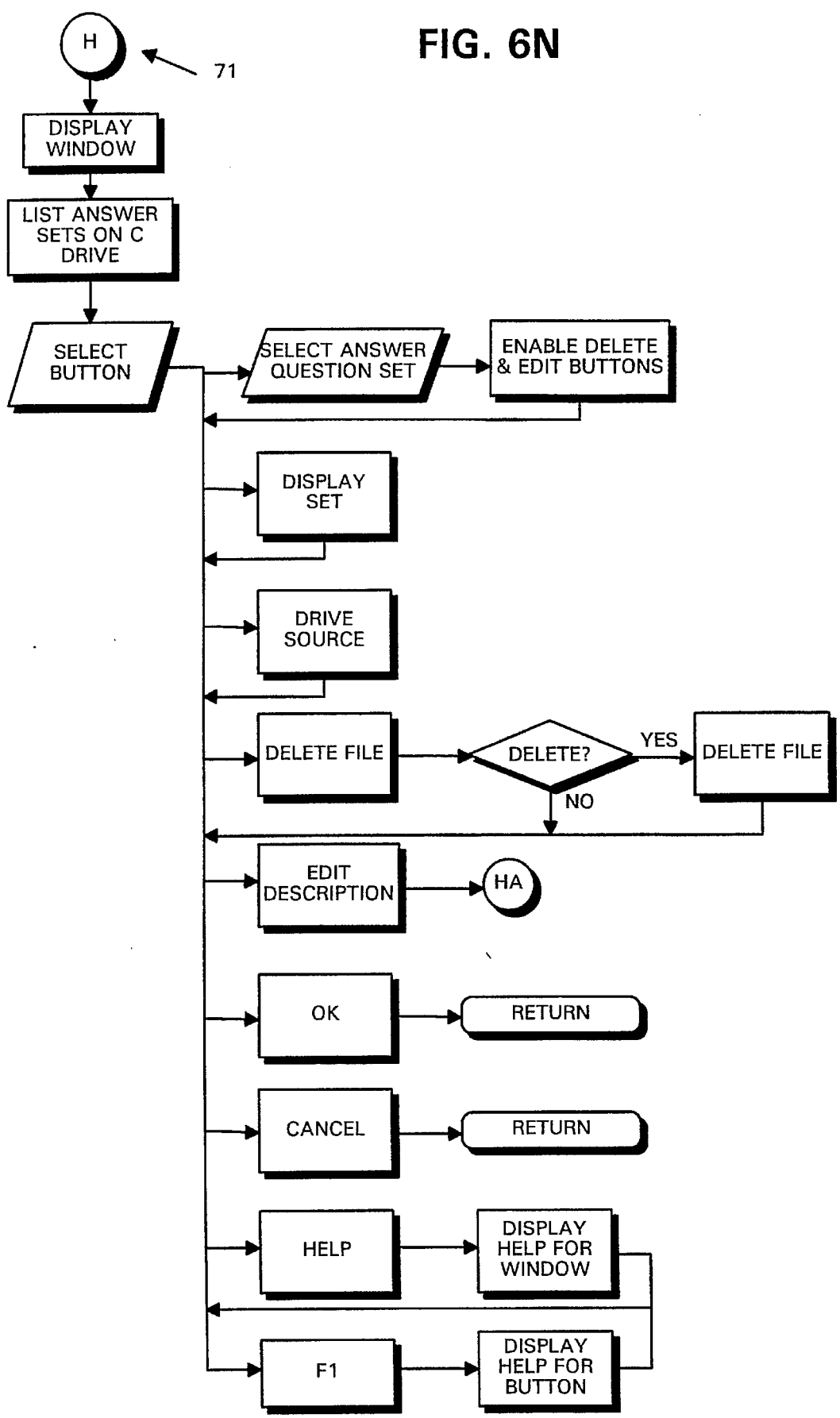
Figure 60:
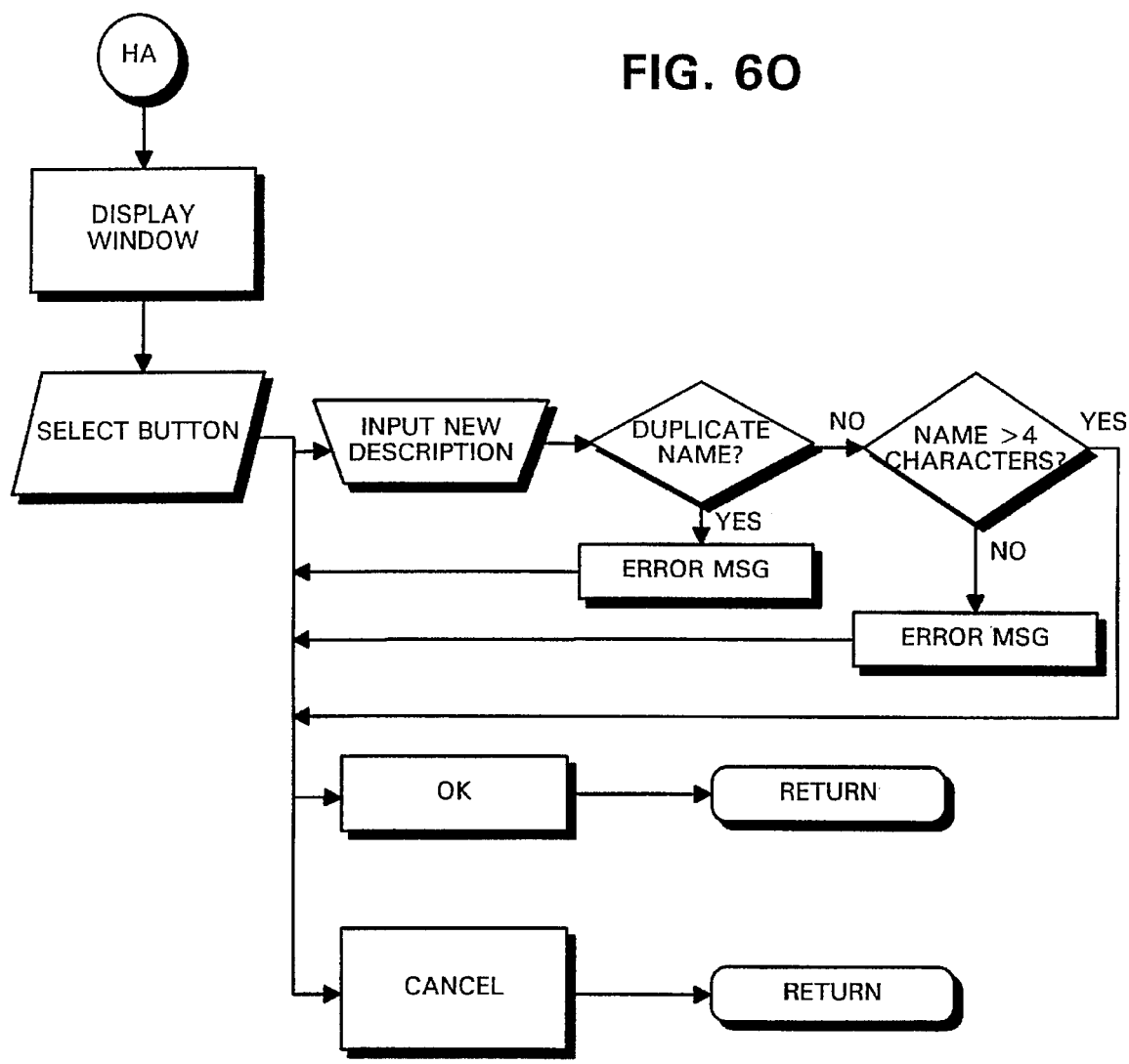
Figure 6P:
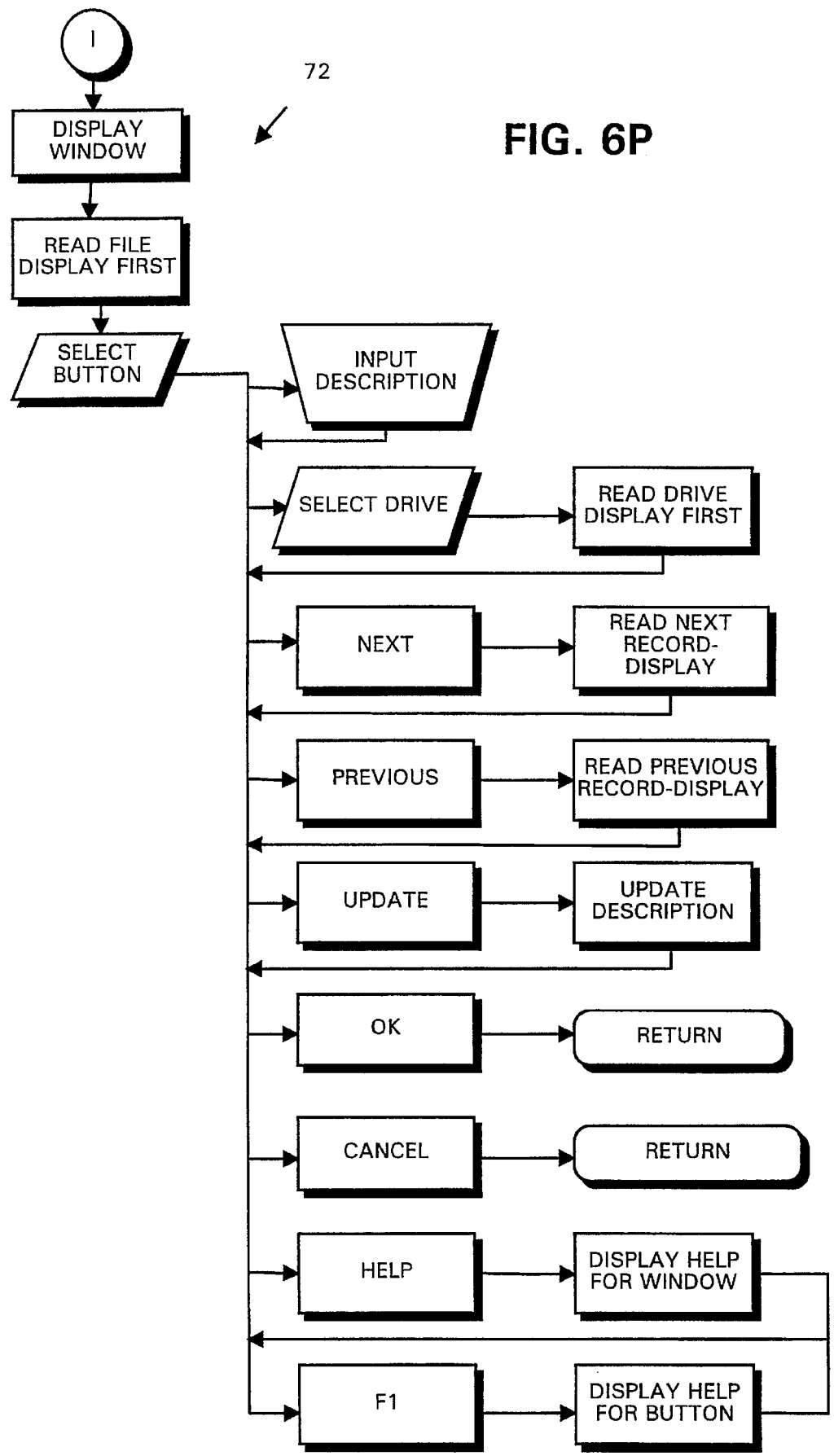
Figures 1, 6R:
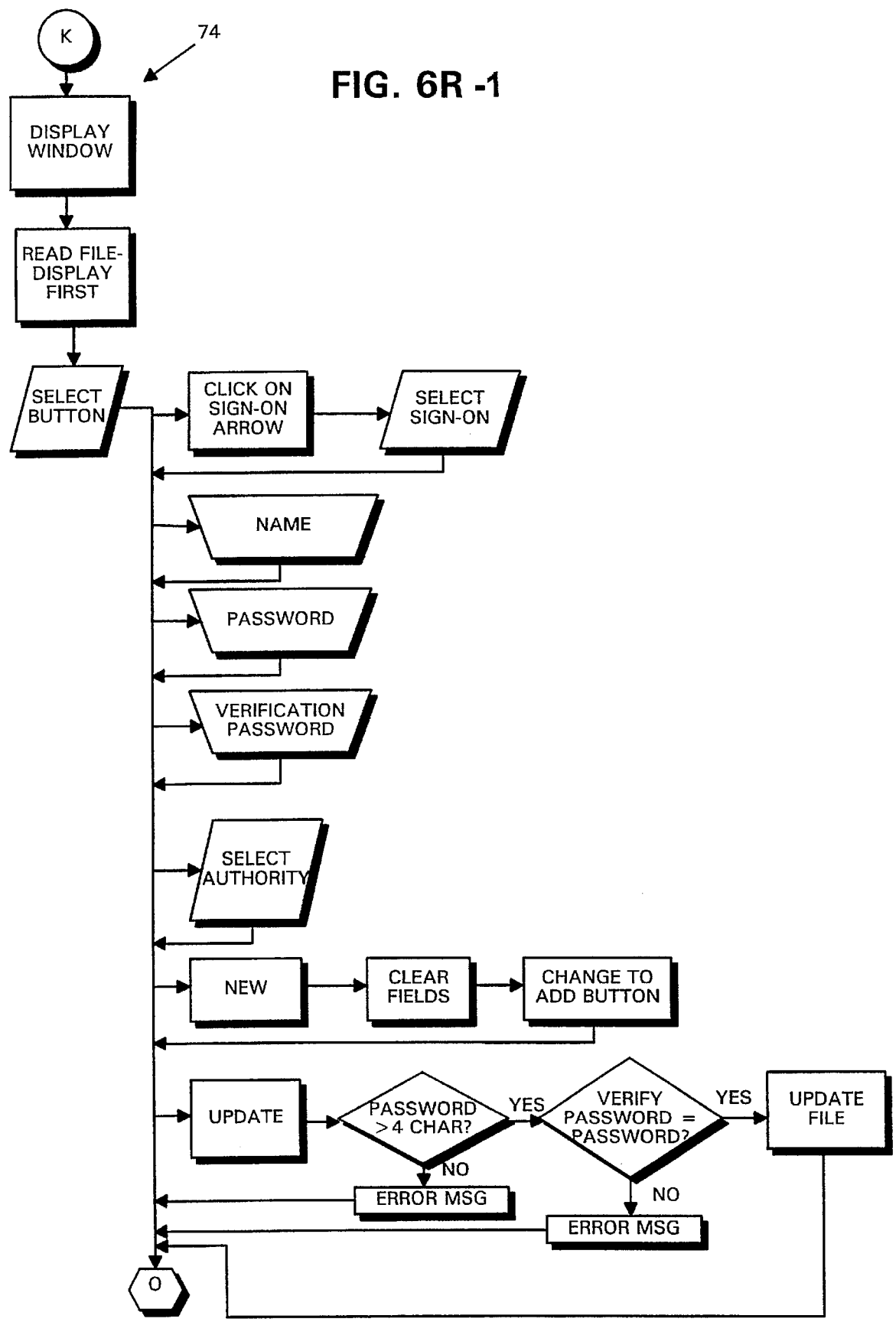
Figures 2, 6R:
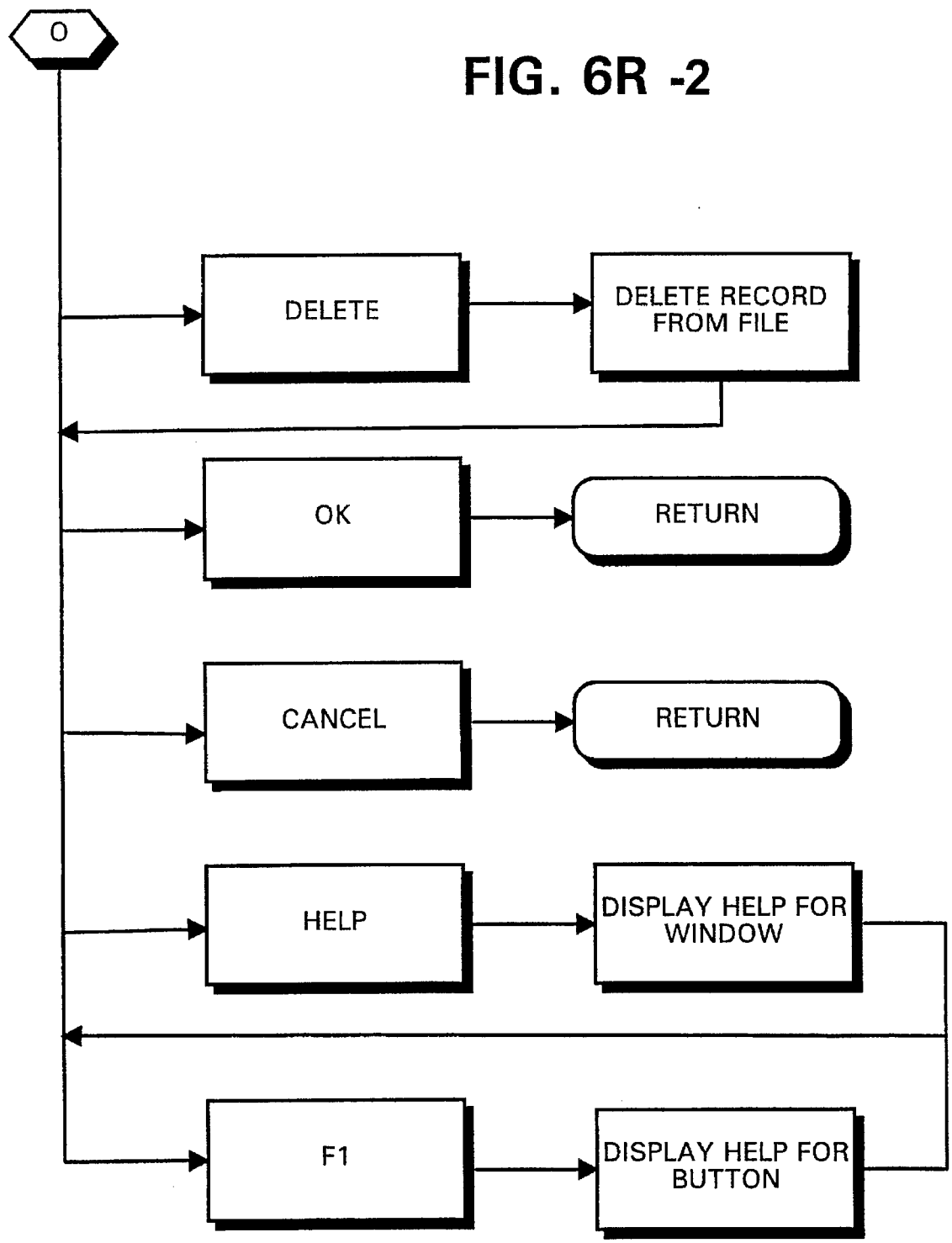
Figures 1, 6S:
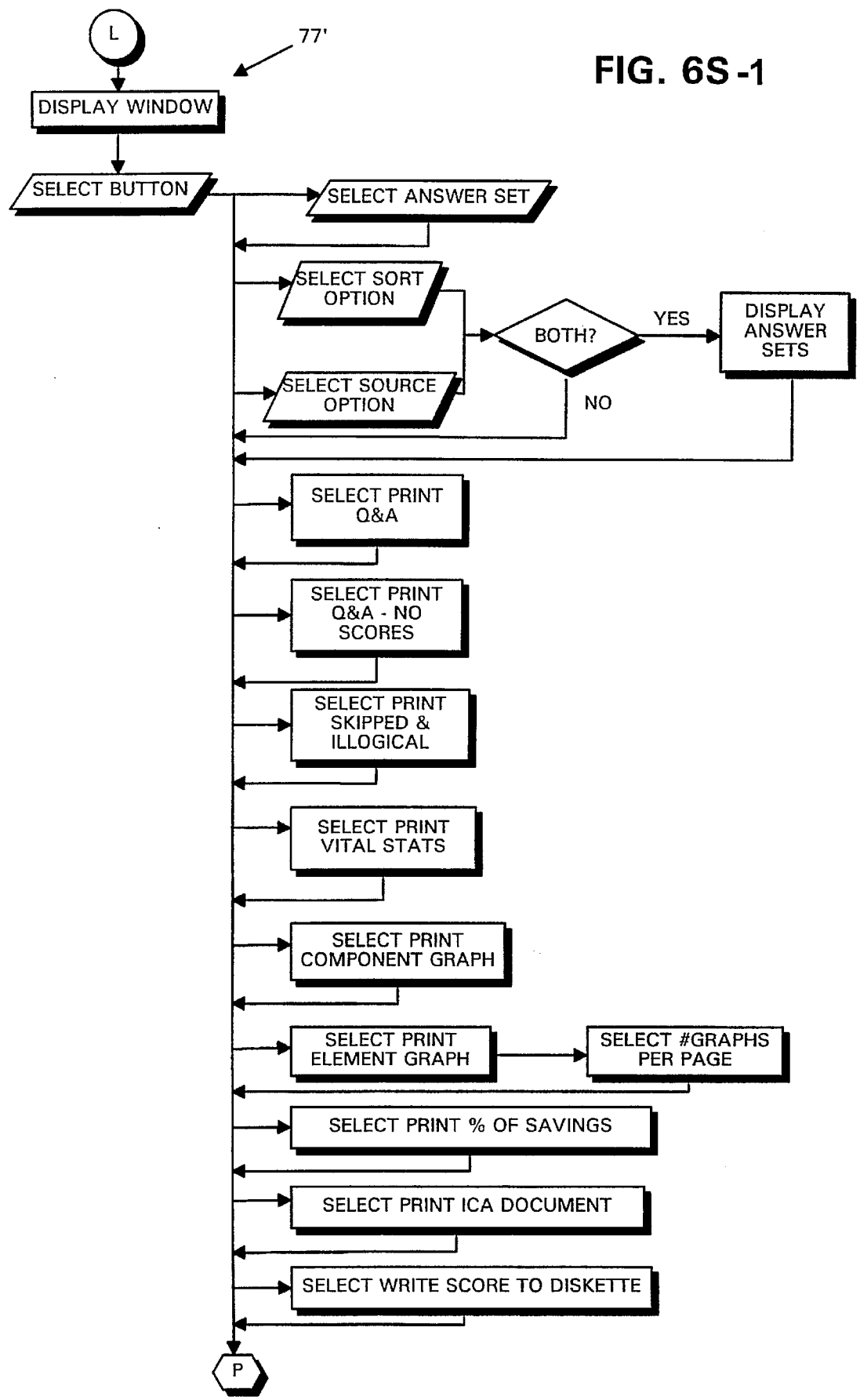
Figures 2, 6S:
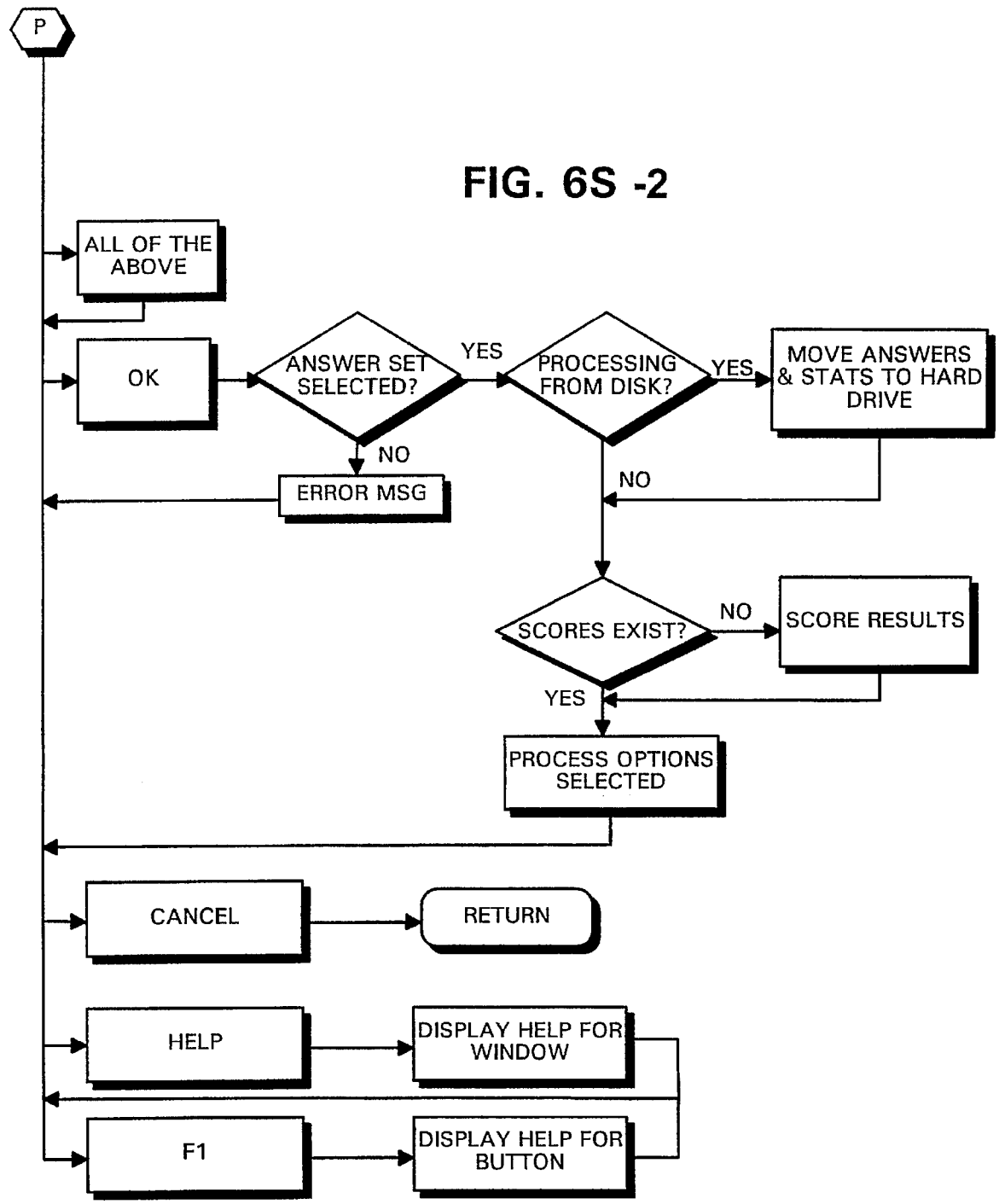
Figure 6T:
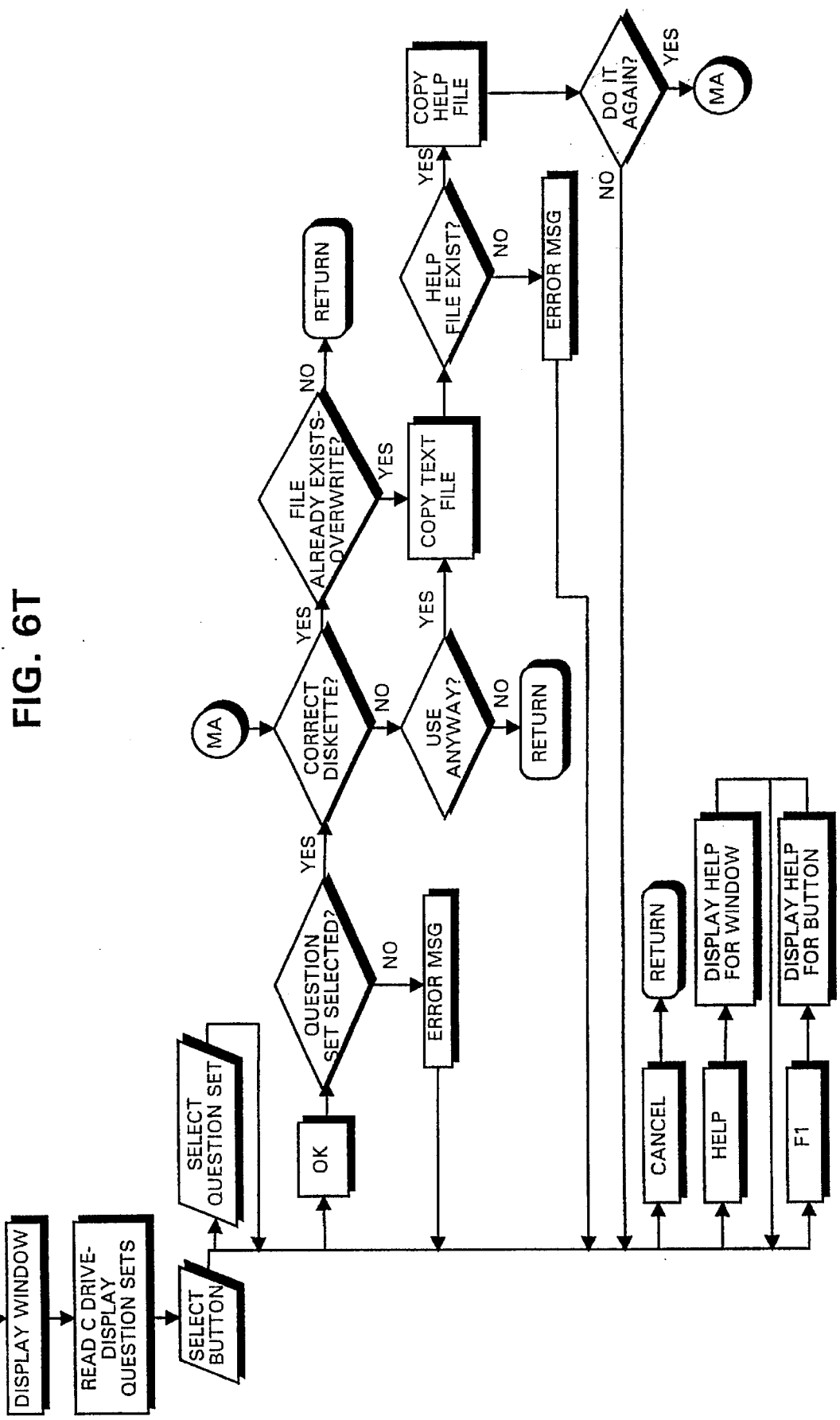
Figure 6U:
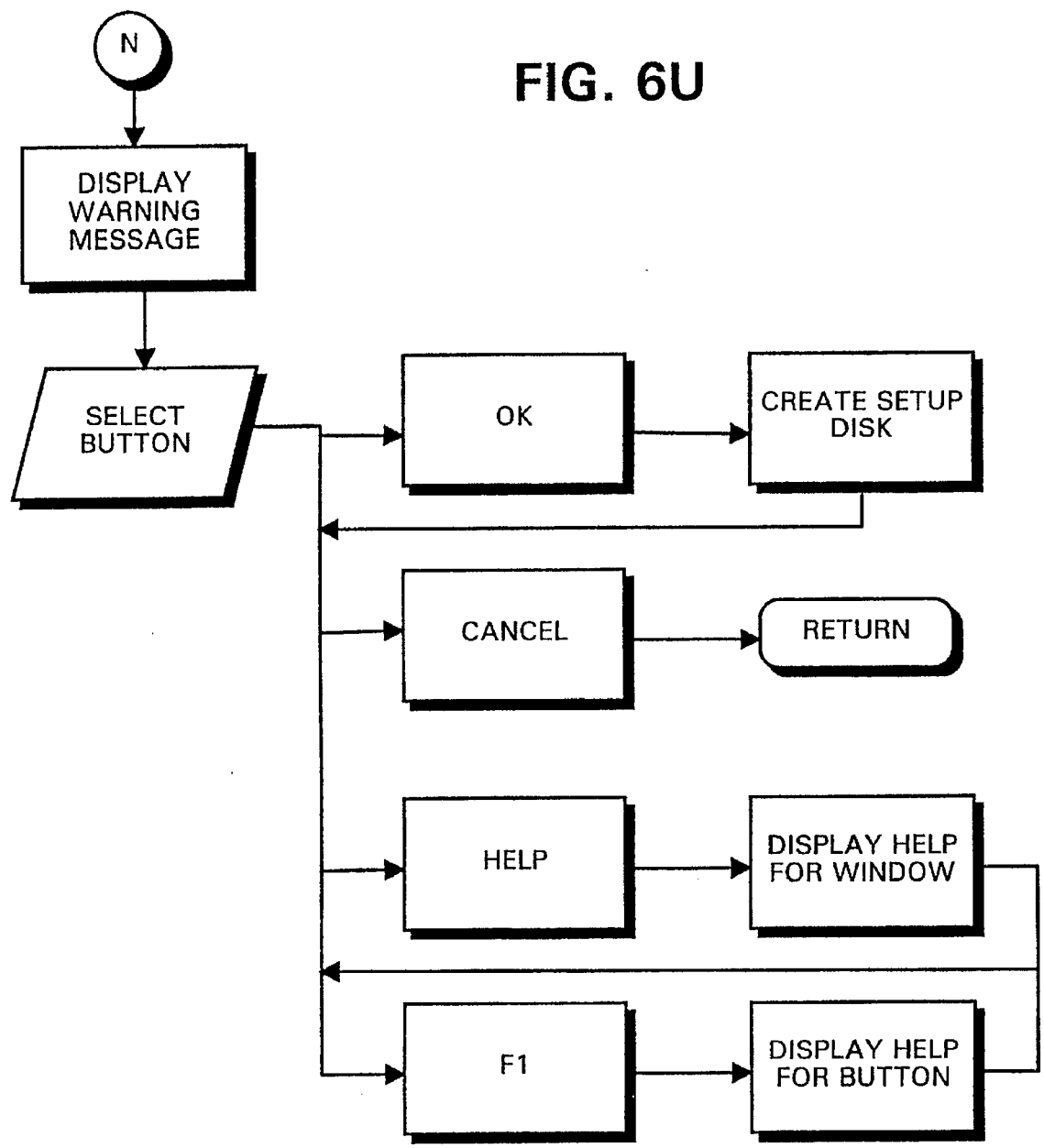
Figure 6V:
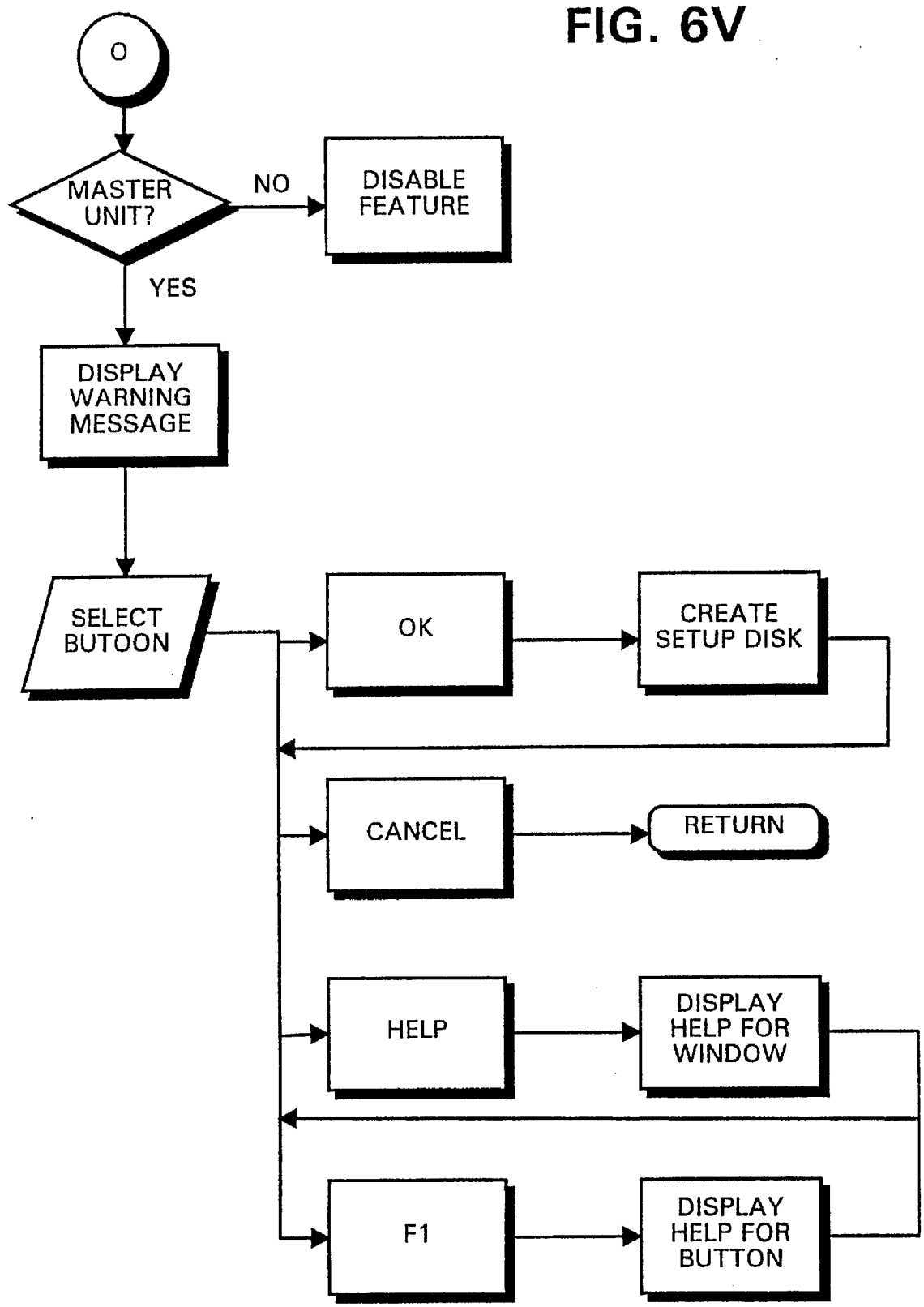
Figure 6W:
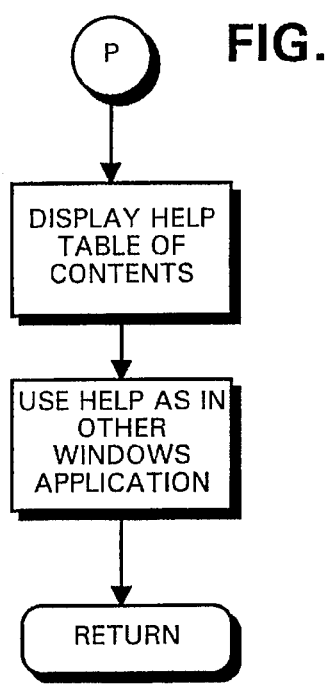
Figure 6X:
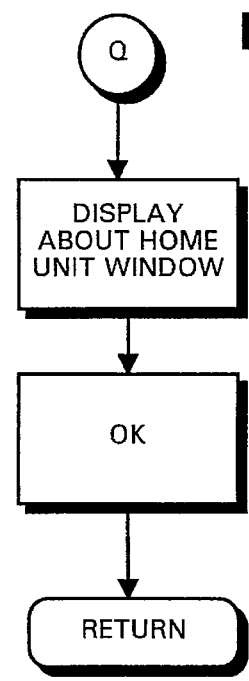
Figure 6Q:
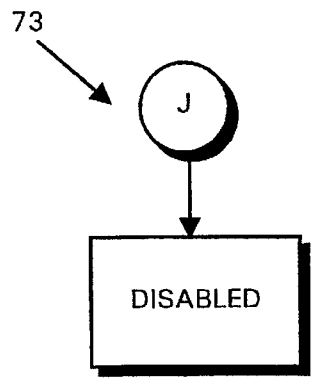
Figures 1, 6Z:
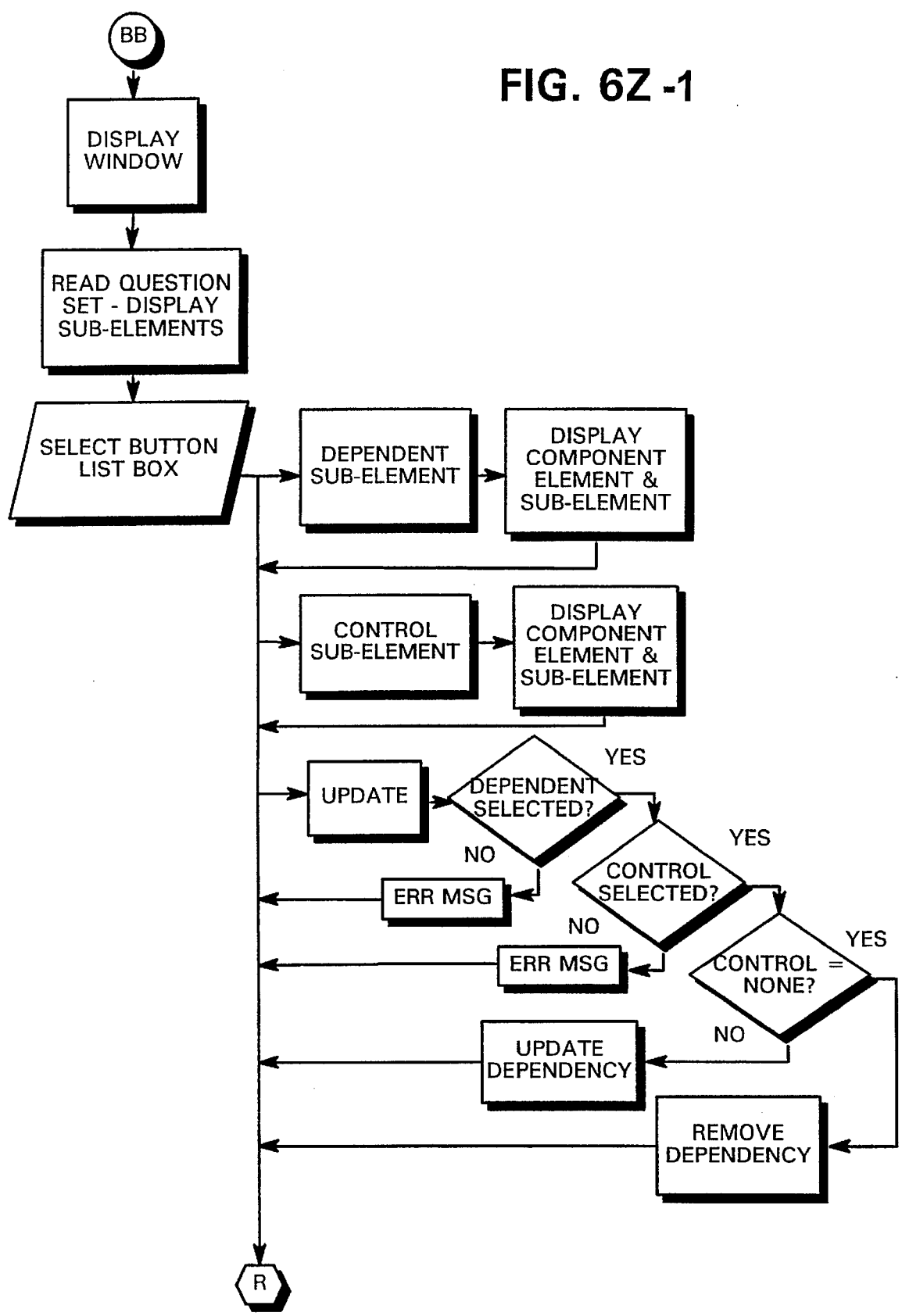
Figures 2, 6Z:
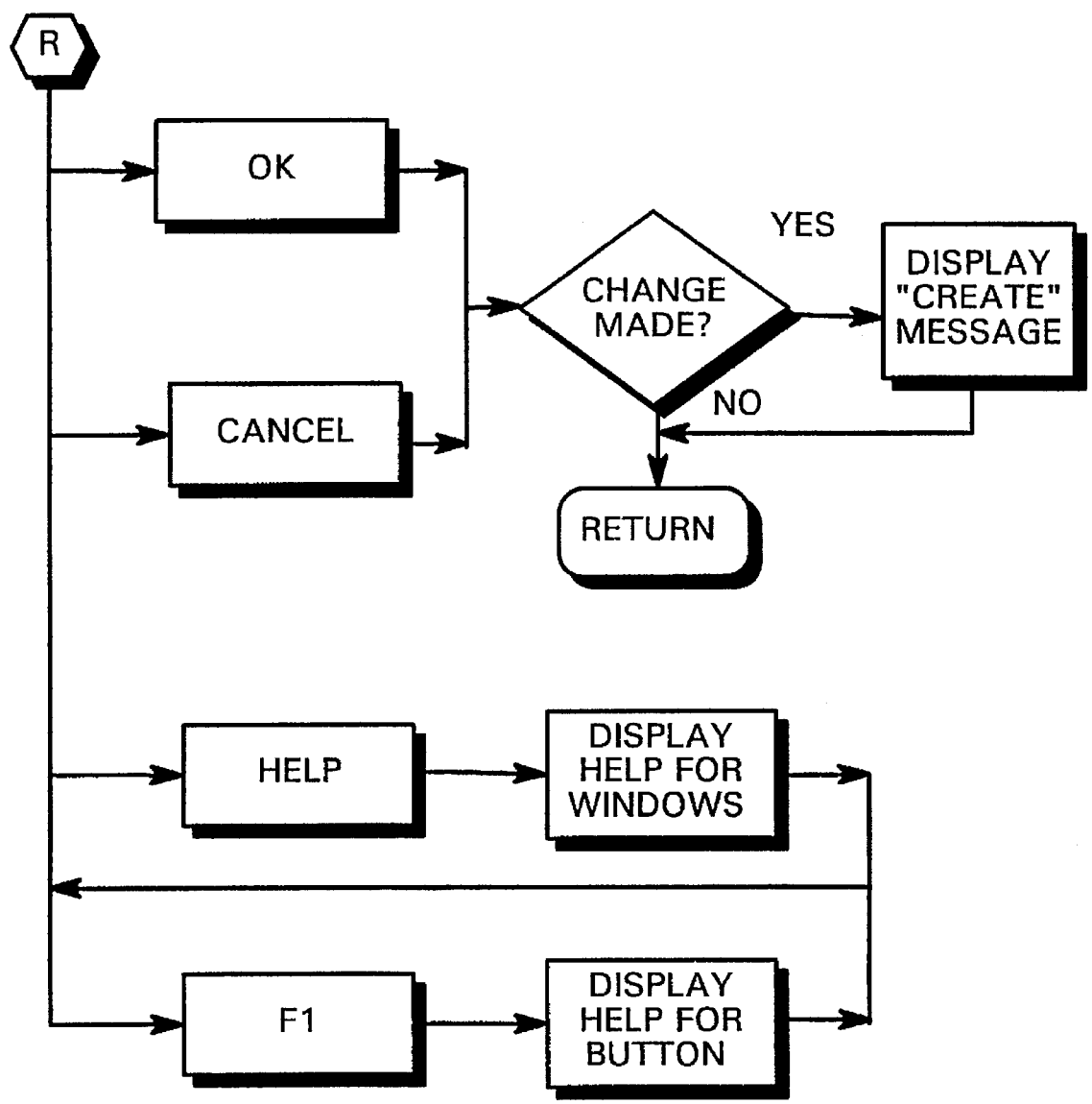

The "Edit Dependents" selection option 65 on the screen of FIG. 7B is shown schematically in FIG. 6C, and the flow sheet therefor is shown in detail in FIG. 6Z-1 and 6Z-2. An exemplary screen for the option 65 is shown in FIG. 7D.

Figure 7E:
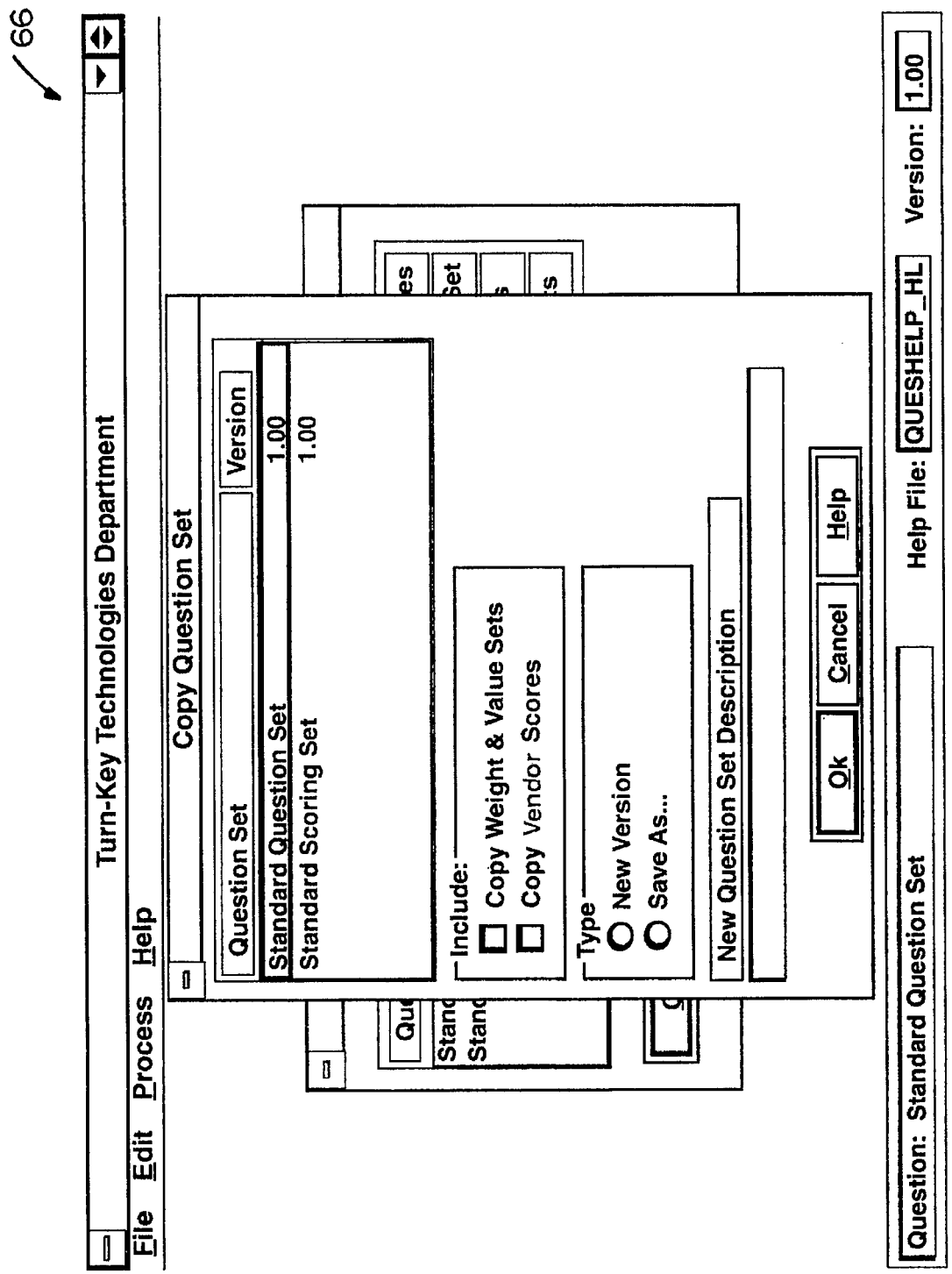
Figure 7F:
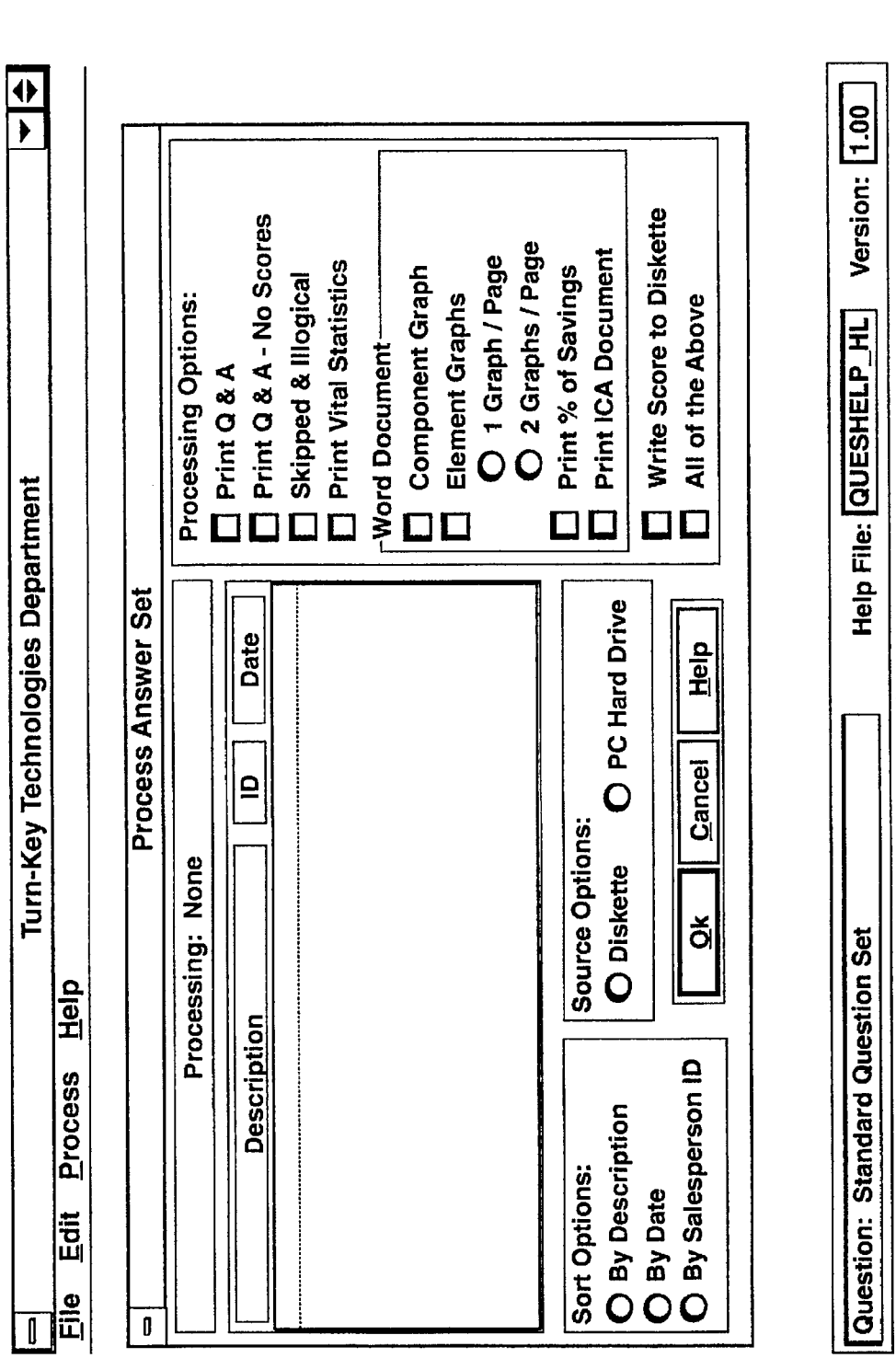

The selection option 66 in FIG. 7B is shown schematically in FIG. 6C and a flow sheet therefor is shown in detail in FIG. 6D. An exemplary screen that appears on the monitor 10 when the selection option 66 is selected as shown in FIG. 7E.

The detailed flow sheet for the "Print Question Set" selection element 63 of FIGS. 7A and 6B is shown in FIG. 6E. The exit flow sheet for the exit selection element 67 from FIGS. 7A and 6B is shown in FIG. 6F.

Figure 7H:
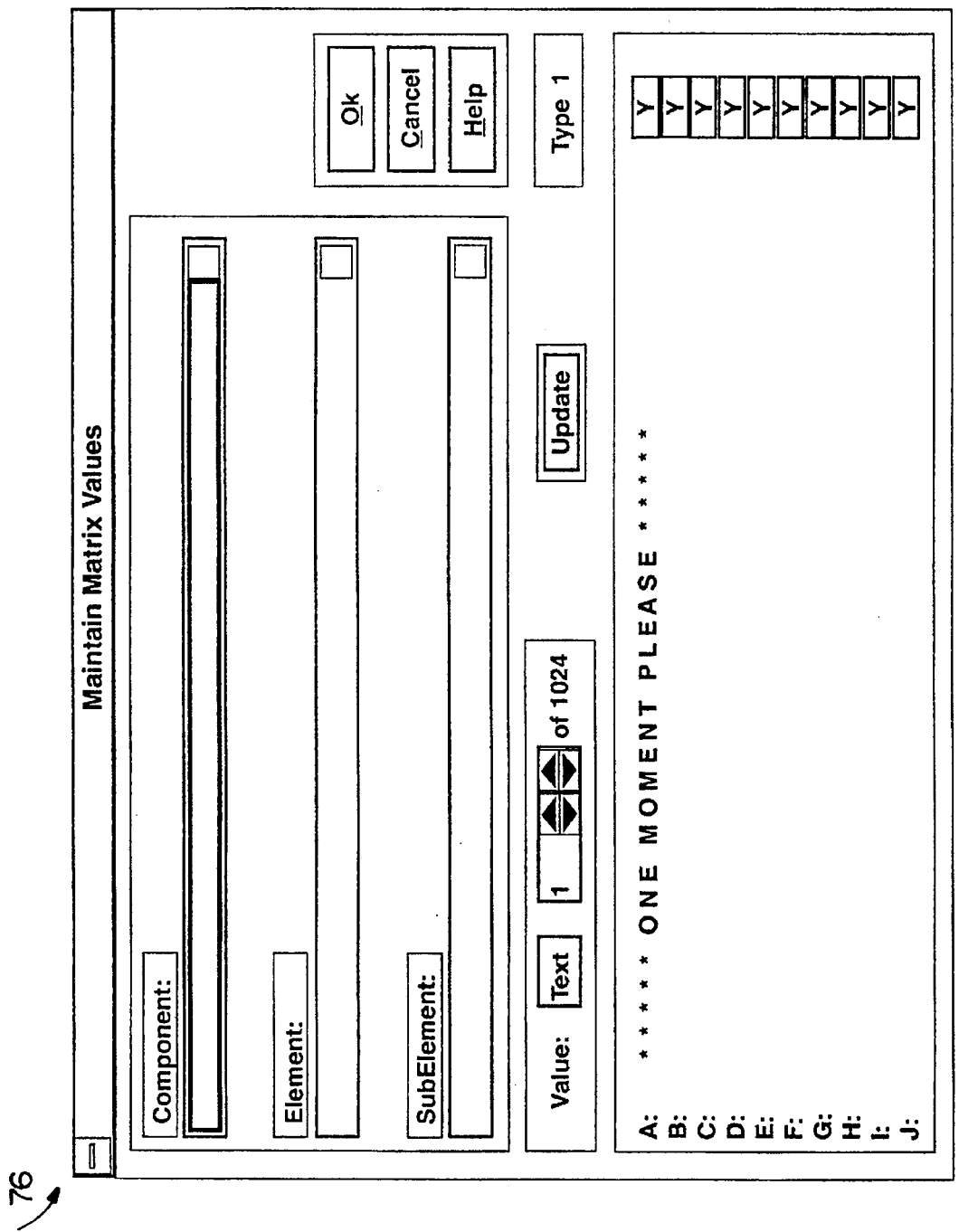
Figure 71:
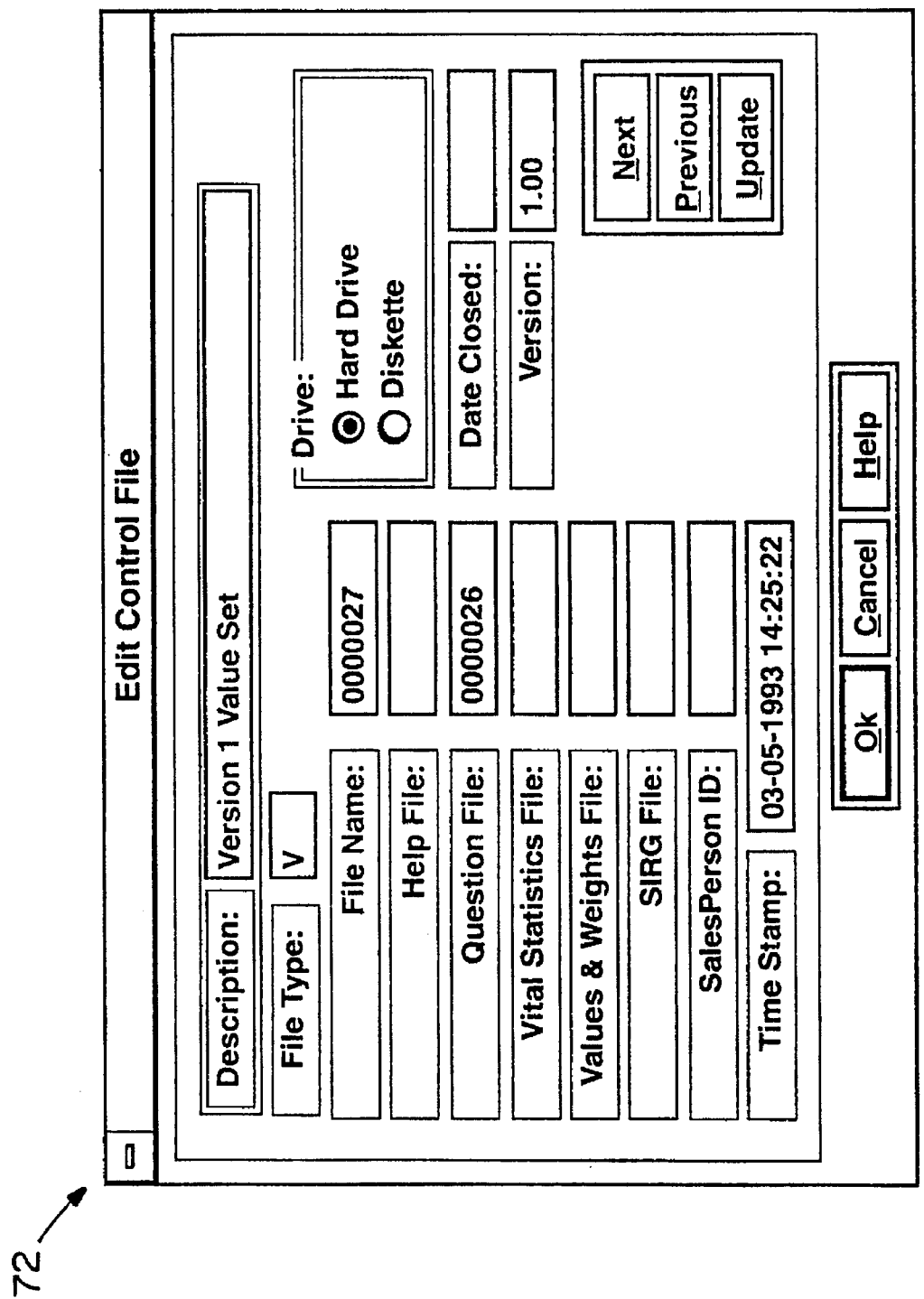

If the edit option 68 from FIG. 7A is selected, then the edit options 69 through 74 from FIG. 6B become available. The detailed flow sheet for option 69, "Edit Associated Tables", is shown in FIG. 6G-1 and 6G-2. Detailed flow sheets relating to individual components thereof are shown in FIGS. 6H-1 through 6L-3, and an exemplary screen corresponding to FIG. 6H is shown in FIG. 7G. An exemplary screen for the "Matrix Values" element 76 of FIG. 6G (the detailed flow sheet of which is shown in FIG. 6I) is illustrated in FIG. 7H.

The "Validate" element 75 from FIG. 6G is not shown by a detailed flow sheet, but rather a selection of the validate button will validate the components, elements, sub-elements, and points. The validate process verifies that the component and element weights sum to 100%, and that sub-elements of "Type" "2" or "4" have at least two points.

An exemplary routine to validate the value set for the standard question set is as follows:

Point Test

Checking for 0.0 Value Points 0.0 Value Point: 20201A
0.0 Value Point: 20202A
0.0 Value Point: 20301A
0.0 Value Point: 30202A
0.0 Value Point: 30302A
0.0 Value Point: 40101A
0.0 Value Point: 40109A
0.0 Value Point: 40303A
0.0 Value Point: 50301A

Checking Total Sub-Element Weights for Element

Element 101=100
Element 102=100
Element 103=100
Element 104=100
Element 105=100
Element 106=100
Element 201=100
Element 202=100
Element 203=100
Element 204=100
Element 301=100
Element 302=100
Element 303=100
Element 401=100
Element 402=100
Element 403=100

Element 404=100
Element 501=100
Element 502=100
Element 503=100
Element 504=100
Element 505=100
Element 506=100
Element 601=100
Element 602=100

Checking Total Element Weights for Component

Component 1=100
Component 2=100
Component 3=100
Component 4=100
Component 5=100
Component 6=100

Checking for Weights for Sub-Elements

Passed Weight Test. No Sub-Elements without Weights.

Checking for Weights for Elements.

Passed Weight Test. No Elements without Weights.

Checking Question Set for Correct Number of Points

Passed Test. No Sub-Elements without enough Points.

The routine to validate bullet points for the ICA document for the home unit 3 may be as follows:

START PROCESSING

Opportunity bullet 10202 not found
Current Situation bullet 10202 not found
High Rating bullet 10202 not found
High Rating bullet 10502 not found
Opportunity bullet 20101 not found
Current Situation bullet 20201 not found
High Rating bullet 20101 not found
Opportunity bullet 30101 not found
Current Situation bullet 30101 not found
Nigh Rating bullet 30101 not found
Skilled component bullet not found
Component definition 1 bullet not found
Default Current Situation for Component 1 bullet not found
Default Opportunity for Component 1 bullet not found
Component definition 2 bullet not found
Default Current Situation for Component 2 bullet not found
Default Opportunity for Component 2 bullet not found
Component definition 3 bullet not found
Default Current Situation for Component 3 bullet not found
Default Opportunity for component 3 bullet not found
Component definition 4 bullet not found
Default Current Situation for Component 4 bullet not found
Default Opportunity for Component 4 bullet not found
Component definition 5 bullet not found
Default Current Situation for Component 5 bullet not found
Default Opportunity for Component 5 bullet not found
Component definition 6 bullet not found
Default Current Situation for Component y bullet not found
Default Opportunity for Component 6 bullet not found

PROCESSING COMPLETE

Returning to FIG. 6B, the "Edit Help Associations" selection option 70 is shown by the detailed flow sheet of FIG. 6M. The "Edit File Maintenance" selection option 71 is shown by the detailed flow sheet of FIG. 6N, and FIG. 6O.

A screen for the edit control file selection option 72 is shown in FIG. 7I, and the detailed flow sheet therefor is shown in FIG. 6P. The "Edit Salesperson Disabled" selection option 73 is shown in FIG. 6Q, while the "Edit User Security" selection option 74 is shown by the detailed flow sheet of FIG. 6R-1 and 6R-2.

The "Process Answer Set" selection option 77 from FIG. 6B relates to the "Process" selection option 77' of the screen of FIG. 7A. The screen that comes up when the option 77' is selected is shown, as one possible example, in FIG. 7F. The "Process Answer Set" selection option 77 flow sheet is shown in FIG. 6S. When the selection option 77 is selected, the answer set will have been scored by the time this process takes place. The customer score for each sub-element is compared against the low value, high value, and high rating triggers for that sub-element. If the sub-element score is <or=to the low value trigger, the bullet point (WORD [software package] document) associated with that low value trigger is printed on the ICA document under the opportunities section. If the customer's sub-element score is >than the current situation value trigger, the bullet point (WORD document) associated with that high value trigger is printed on the ICA document under the current situation section. If the sub-element score is >than the high rating trigger, the bullet point (WORD document) associated with that high rating trigger is printed on the ICA document under the opportunity section.

| Customer Value | Opportunity/ Trigger Value | Current Situation Trigger Value | High Rating Trigger Value | Statement Printed |
| --- | --- | --- | --- | --- |
| 2.0 | 0.1 | 2 | 6 | Current Situation |
| 4.0 | 0.1 | 2 | 6 | Current Situation |
| 5.0 | 0.1 | 2 | 6 | Current Situation |
| 7.0 | 0.1 | 2 | 6 | Opportunity |
| 8.0 | 0.1 | 2 | 6 | Opportunity |
| 0.1 | 0.1 | 2 | 6 | Opportunity |

The component definition WORD document is unique for each component and printed on the ICA document for that component.

The skipped paragraph WORD document exists only once and is printed under the component definition if that component was skipped.

The default current situation WORD document is unique for each component and printed within the current situation portion of the ICA document if no scores are greater than the current situation trigger value.

The default opportunity WORD document is unique for each component and printed within the opportunities portion of the ICA document if no scores are less than or equal to the opportunity trigger value.

Page breaks, with cover page and introduction, are also preferably provided.

Other menu items that can be selected from the process selection option 77 of FIG. 7A are:

"Write Question Set to Diskette", shown in FIG. 6B and in detail in FIG. 6T. This menu option is utilized to copy a question set to a diskette for distribution to the field units. The user selects from a multi-select list box all of the question sets that will be put on the diskette. The system will copy the question set, help file and value set to diskette and make the appropriate entry into the CONTROL.DBF on the diskette.

"Create Field Unit Set Up Disk", shown in FIG. 6B and in detail in FIG. 6U. This procedure creates an MS-Windows® compatible set up diskette for distributing the program and associated help file to the field units. The set up diskette can be used only once.

"Create Home Unit Set Up Disk", shown in FIG. 6B and in detail in FIG. 6V. This procedure creates an MS-Windows® compatible set up diskette for distributing the program to other home units. However once a home unit is created from the set up diskettes, the new home unit cannot replicate itself.

When the "Help" option 78 from the screen of FIG. 7A is selected, two sub-options are available, the "Help Contents" sub-option seen in FIG. 6B and shown in detail in FIG. 6W, and the "Help About" sub-option shown in FIG. 6B and in detail in FIG. 6X.

Figure 8:
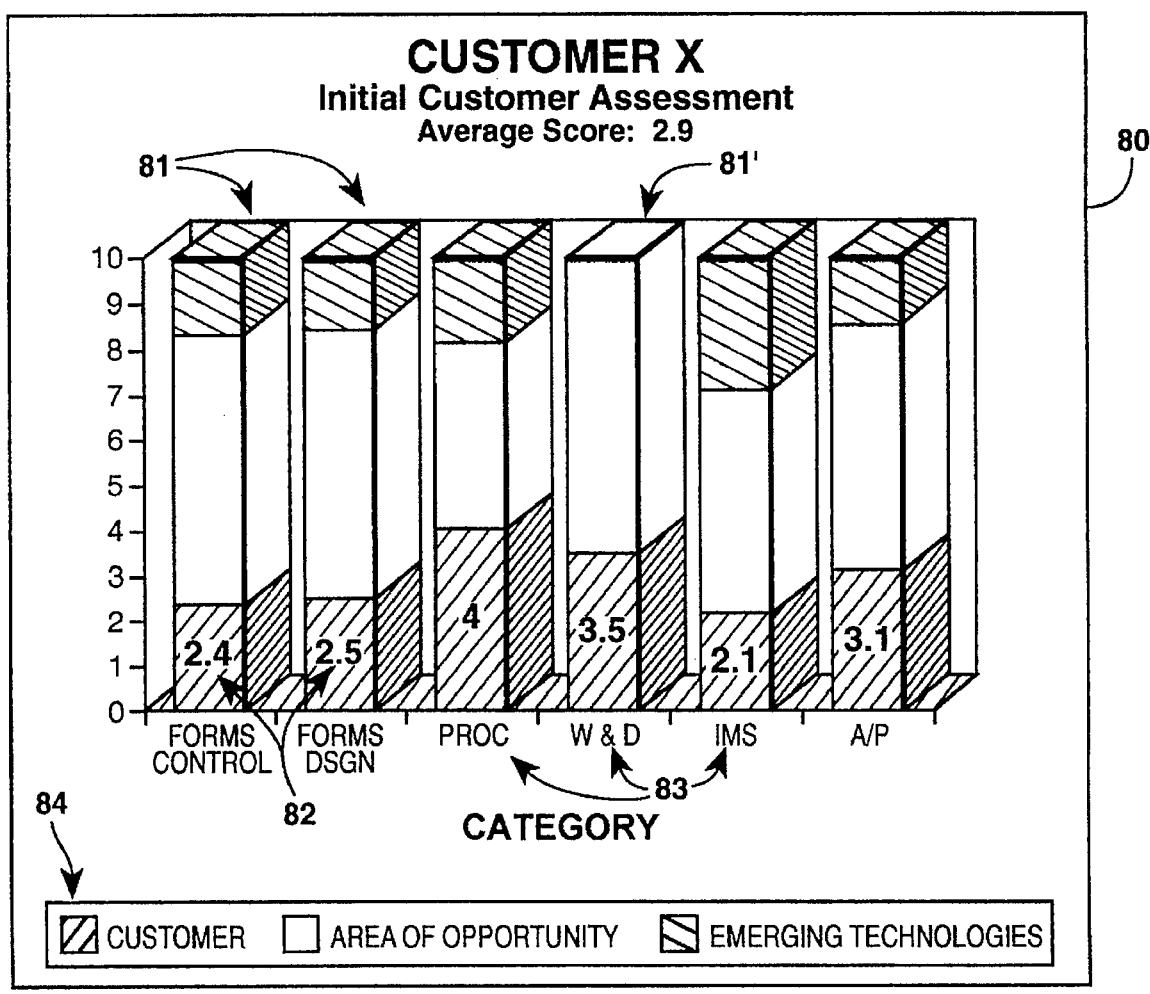
FIG. 8 is a schematic showing an exemplary graph of each of the categories, printed according to the present invention.
Figure 9:
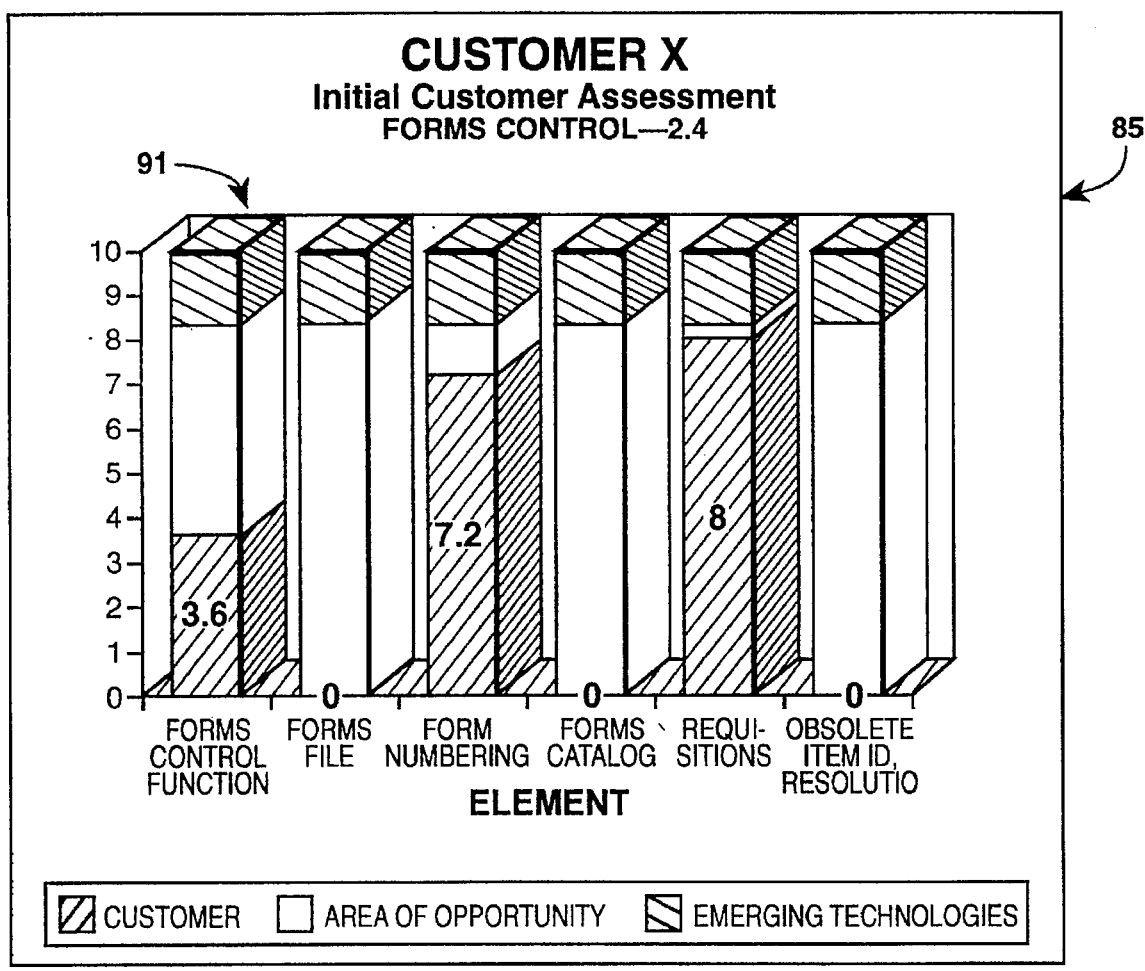
FIGS. 9 through 14 are graphs similar to those of FIG. 8 for each of the categories showing the breakdown of elements within the category.
Figure 10:
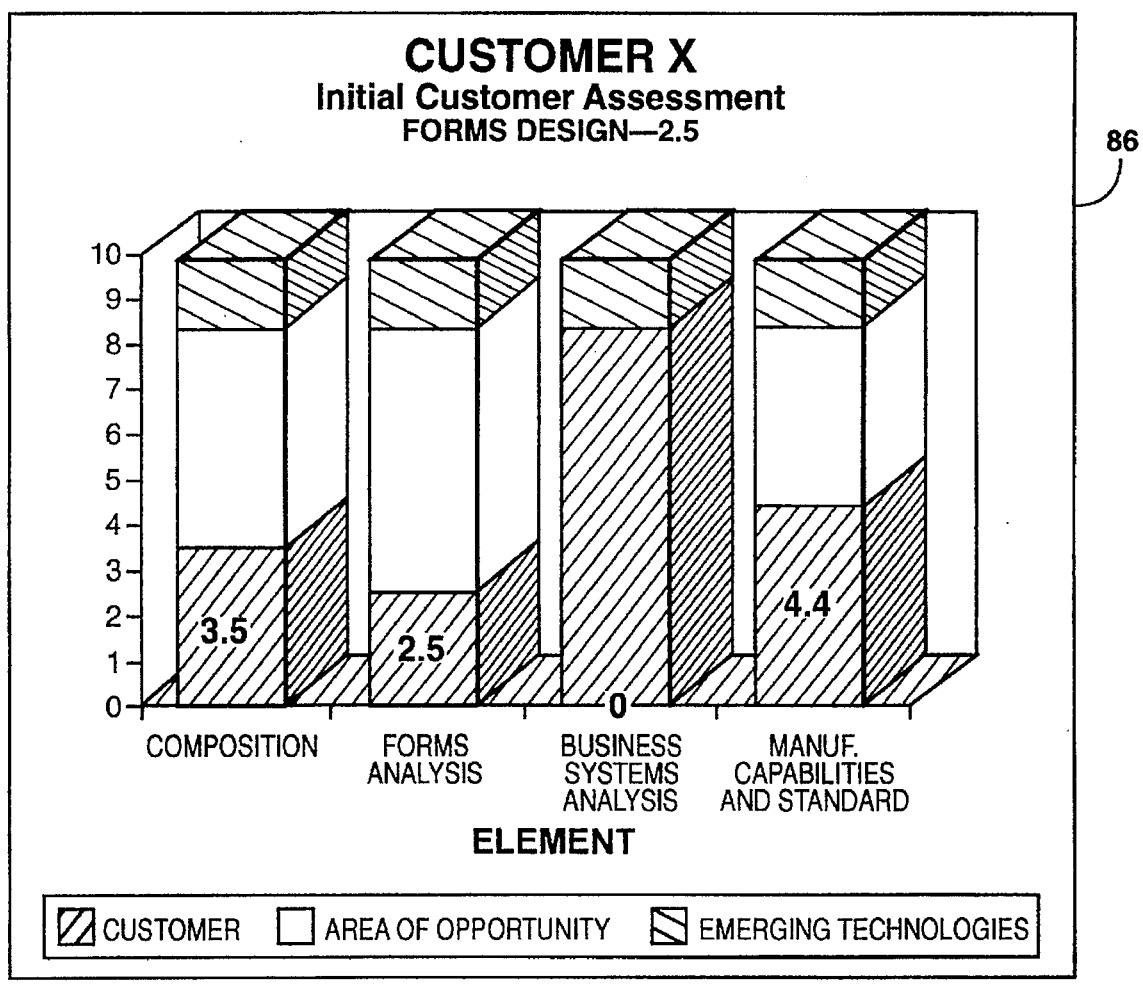
Figure 11:
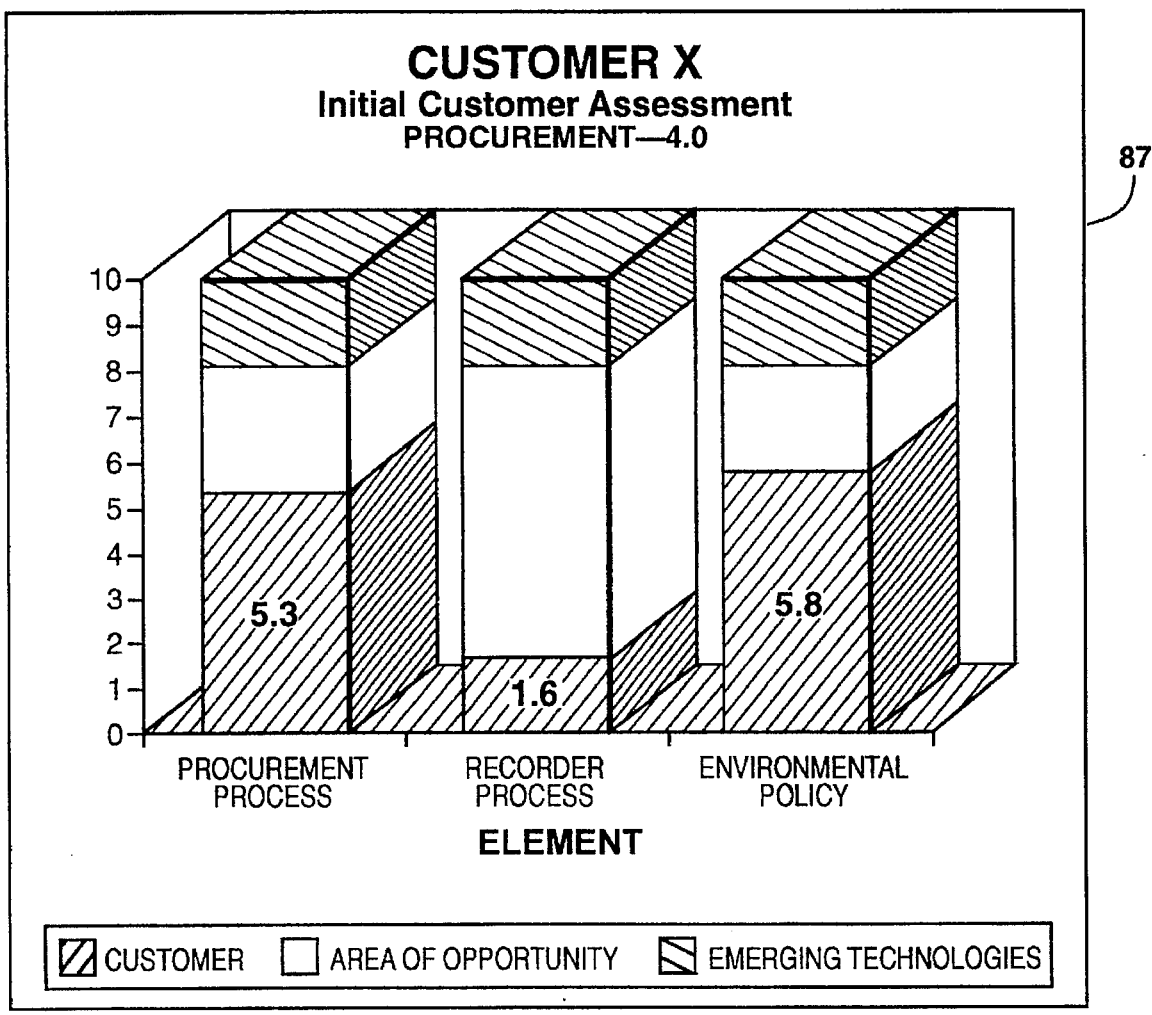
Figure 12:
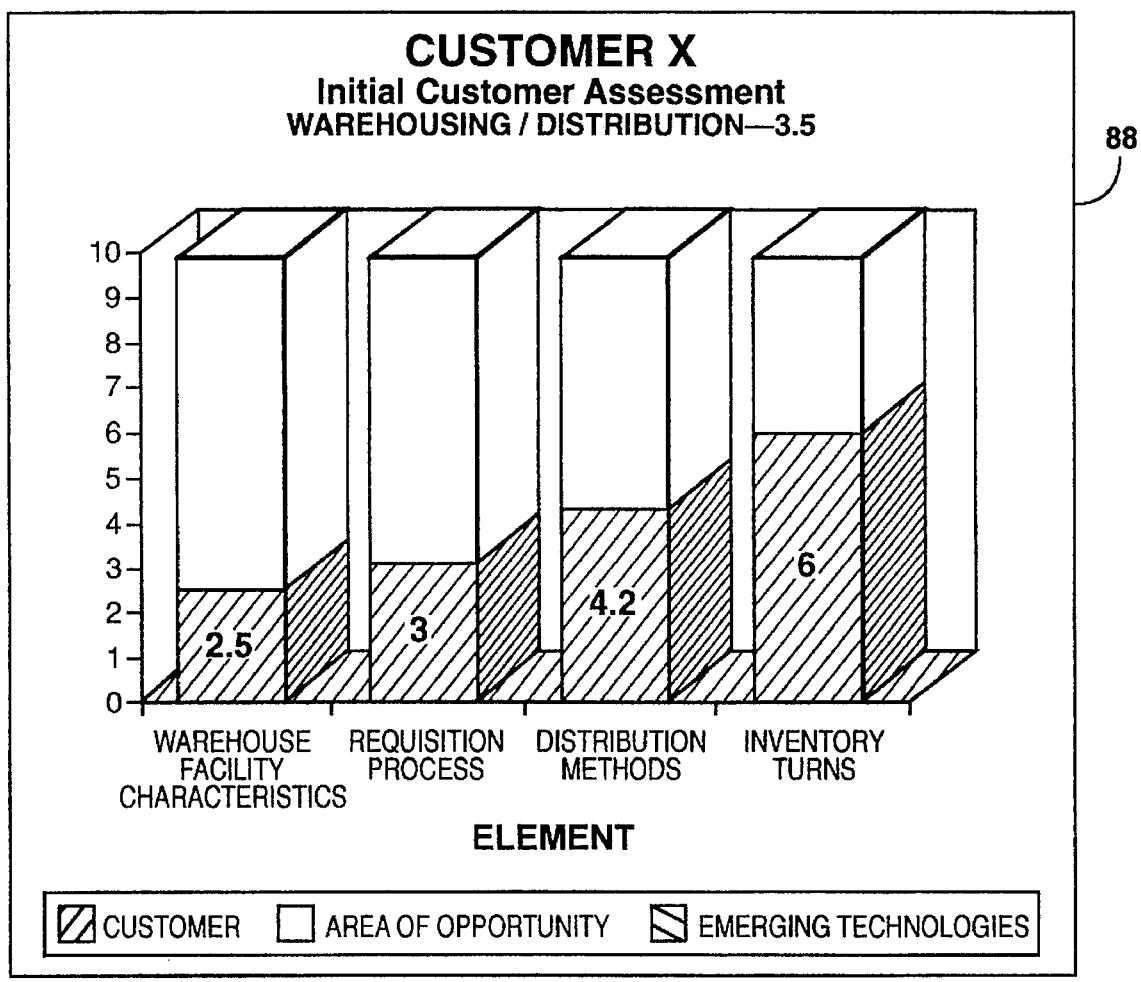
Figure 13:
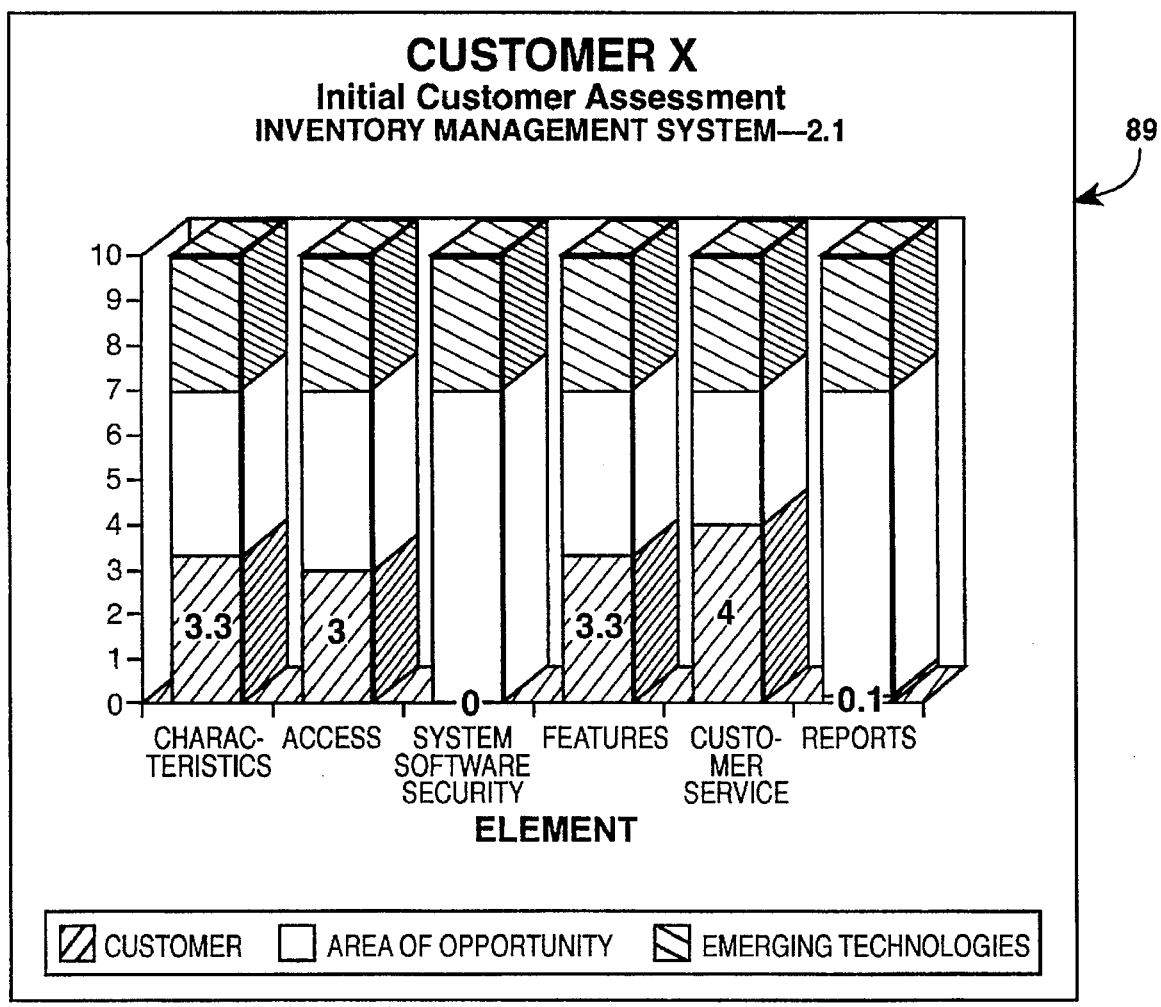
Figure 14:
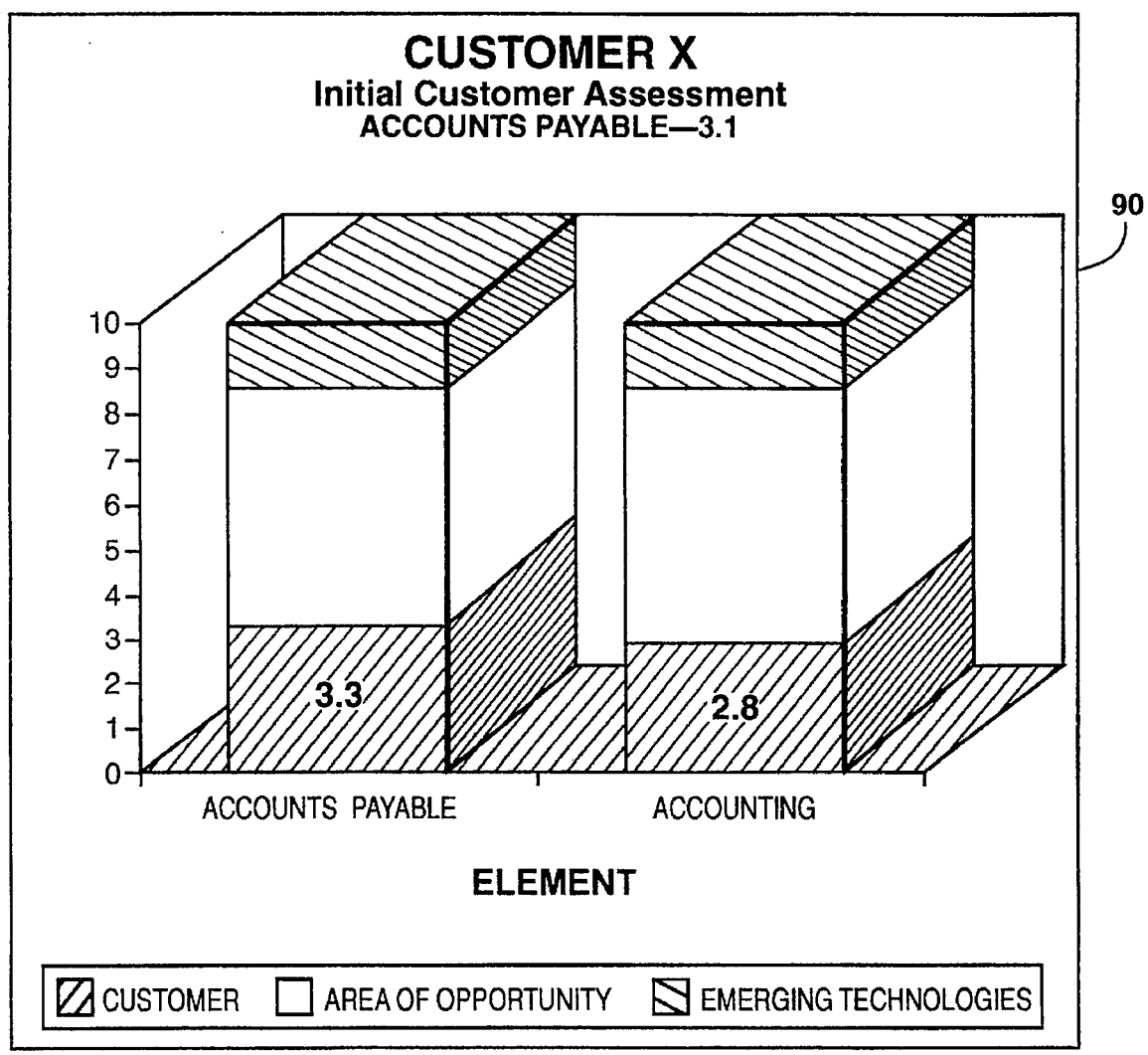

As indicated at 19 in FIG. 3, graphical data is printed out based upon the scoring and processing that is performed in the computer 3. In addition to the processing of the question responses, data is inputted into the computer 3 that relates to the user's (vendor's) capability of supplying goods and/or services to the potential customer related to the potential customer's predefined business techniques. Numerical weights and values are assigned thereto to provide a level of sophistication for each separate category compared to an optimum for the category, or merely using the vendor's capabilities as the top indicator of the category. An exemplary calculation from this analysis performed by the computer 3 is illustrated in FIG. 8 for the categories of boxes 46–51 of FIG. 4C. Note that for each of the categories in the printout, on a sheet of paper illustrated schematically by 80 in FIG. 8, except for the warehousing and distribution category, there is graphed not only the customer's score on the y-axis (out of ten), and the vendor's/user's capabilities above the customer's score, but also an area of "emerging technology". The "area of opportunity" is the difference between the top level of sophistication of the user/vendor (e.g. about 8.1 for the "forms control" portion of FIG. 8), minus the customer's score (2.4 for the forms control category in FIG. 8), and the area of emerging technology is the difference between the user's/vendor's score and optimum (10) (e.g. 10–8.1=1.9 for the "emerging technology").

While the graphs illustrated in FIG. 8 need not be utilized, they are particularly suitable for this purpose. Each of the graphs 81 is in the form of a rectangular parallelepiped having three dimensions, and preferably the customer score—as indicated at 82—is printed in a numerical value right on the rectangular parallelepiped graph. Also, the names of each of the categories are printed on the y-axis, as indicated generally by reference numeral 83, and a key is also printed below the categories, as indicated at 84. Numerical values could also be printed for the area of opportunity and emerging technology areas of each graph 81 if desired.

Note that for the warehousing and distribution category, indicated by graph 81' in FIG. 8, there is no area of emerging technology, in this case the vendor/user's "score" or capability being assumed or determined to be optimum, or concern for optimization in this area not being considered at all.

FIGS. 9 through 14 are graphical representations printed on sheets of paper 85 through 90 showing an exemplary breakdown of each of the elements within each of the categories illustrated in FIG. 8. In each case the name of the element is plotted along the x-axis, with the customer's score, area of opportunity, and (except for the warehousing/distribution element of FIG. 12) emerging technologies scores plotted along the y-axis. Also at the top of each graph, the category is printed as well as the average score for the category, as indicated, for example, at 91 in FIG. 9.

In addition to the graphical representations of FIGS. 8 through 14, as indicated schematically at 20 in FIG. 3, preferably additional information is printed out after the analysis of the answers to the questions from the customer, made by computer 3. For example tabular or plain narrative information may be printed out describing what is meant by the various graphical representations, providing more detailed information about each of the categories or elements, and estimating a percentage of savings that can be achieved if the customer implements the user's/vendor's program (purchasing goods and/or services). For example one manner that this can be presented on a separate sheet is as follows:

| Category | CUSTOMER X ESTIMATED PERCENTAGE SAVINGS BY CATEGORY 1 | |
|---|---|---|
| | Area of Opportunity | Estimated % Savings |
| FORMS CONTROL | 5.9 | 2.0% |
| FORMS DESIGN | 5.9 | 11.2% |
| PROCUREMENT | 4.1 | 2.0% |
| WAREHOUSE/ DISTRIBUTION | 6.5 | over 12.0% |
| INVENTORY MANAGEMENT SYSTEM | 4.9 | 1.0% |
| ACCOUNTS PAYABLE | 5.4 | 4.0% |

These percentages are estimates based on our initial assessment of your operation. In order to provide exact dollar savings, we will work closely with your organization to conduct a term analysis study and establish current baselines.

Even a more detailed narrative report can be presented to the potential customer than set forth above, the analysis set forth above merely being exemplary. For example the printed report could include a cover page, introduction, statements for each component, graphs, customer's current situation and areas of opportunity in a descriptive (narrative) format, etc.

In making the analysis that has been done above, "trigger" points can also be utilized where desired. A "trigger" value may be assigned to each question and presented by separate category. For example each sub-element can be assigned a maximum of three trigger points, current situation, opportunity trigger, and a "great job" trigger. A sub-element can be skipped and no trigger points assigned where desired. If a trigger point is assigned, a corresponding statement is defined in a "WORD for Windows"™ document associated with the computer 3, as described with respect to the "Process Answer Set" selection 77, 77', above. During processing the value assigned to the responses selected by the customer are compared to the trigger values, and the appropriate statements are located in the proper place on the document.

The comprehensive operational analysis and implementation modules as illustrated in FIG. 3 will include more detailed analyses of all aspects of the customer's operation, and will include ongoing measurement and support to ensure that the percentage savings estimated are achieved. These modules will also be practiced utilizing a computer and providing data for analysis and processing in the computer, however the details of these modules are not part of the present invention.

Under some circumstances, the implementation module may be significantly modified. If there is a collection of an adequate level of subscriber data after use of the system over a long period of time, statistical analyses can be prepared and under some conditions industry "average" from these statistical analyses can be used in place of a data collection step. General information based upon the statistical analysis of industry average data for any particular industry (for example for banking customers who use business forms, insurance company customers, large multi-location retail establishment customers, etc.) can be presented to interest potential customers even without the customer interview stage 16 illustrated in FIG. 3, although to have meaningful data and to ensure a proper evaluation of the job from the vendor/user's perspective, the customer interview stage 16 will still be necessary.

In determining the user's/vendor's capability of supplying goods and/or services (the "user's score") to the potential customer related to marketplace capabilities, an analysis will be made with respect to each of the elements and sub-elements as are provided in the questions that have been prepared. While there will be some subjectivity in this process, of course the user will know quite well its capabilities of supplying various goods or services to meet needs. The user's capabilities for all categories, elements, and/or sub-elements can, if desired, be considered optimum, especially if there are no known technologies on the horizon that would appear to significantly impact a particular area. Alternatively, it can be arbitrarily assumed that present techniques are only, for example, 80% effective, so that the user's score will be plotted as "8" on the bar graphs generated (as described with respect to FIGS. 8 through 14). Alternatively a detailed analysis of the known potential technologies in each area can be made and a highly different weight or value given for each category or element.

It is also noted that while specific categories are set forth above for the example of business forms and related services, as the marketplace changes the questions and the categories can also be changed to reflect the marketplace. Also at least a seventh, or additional, separate category can be built into the system (as indicated as 52 in FIG. 4C) that can reflect a vertical market or other designation, and a data base of responses can be retained for comparison of all potential customers as well as sub-sets of potential customers that have additional areas to address on the marketplace continuum. This also can be used to assess the user's ability to move a potential customer along the "marketplace continuum". It can provide a pro-active method of assessing the user's needs for building new products and supplying new services for application to the marketplace.

Various features of the invention, both in computers 1 and 3, can be facilitated by using off-the-shelf software. Commercially available software packages for various functions are: "Doc-to-Help" from WexTech Systems, New York, N.Y.; "Q & E Database" from Pioneer Software, Raleigh, N.C.; "Visual Basic" and "Access" from Microsoft Corp., Redmond, Wash.; and "dBase" from Borland, Scotts Valley, Calif. "Visual Basic", "dBase", and "Access" are file structure packages. "Q&E Database" is a package for providing connection to "dBase", and "Doc-To-Help" is an on-line "Help" function, with associated printed user manual.

While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent methods and devices.

What is claimed is:

1. A method of determining business opportunities for supplying goods and/or services to potential customers, comprising the steps of: (a) in a first computer having an input element and a storage device, inputting and storing in the storage device a series of questions relating to the level of sophistication of a potential customer's predefined business techniques in a plurality of different categories; (b) collecting responses to the series of questions from step (a) and inputting and storing in the storage device the responses into the first computer; (c) assigning and storing numerical weights and values to the question responses so as to indicate a level of sophistication for each possible response of each business technique for each separate category; (d) determining a user's score which reflects the user's capability of supplying goods and/or services to the potential customer related to the potential customer's predefined business techniques; (e) inputting and storing the data from steps (b), (c) and (d) into a second computer having an input element, a storage device and a processor; (f) using the processor of the second computer, taking into account the stored weights and values, to determine for each separate category a potential customer's score, the user's score, and an area of opportunity which is the difference between the potential customer's score and the user's score; and (g) using a computer controlled printer, printing out in graphical form on sheet material the determinations from of step (f).

2. A method as recited in claim 1 wherein step (f) is practiced by calculating, and is further practiced to also calculate an area of emerging technology, which is the difference between the user's score and a predetermined optimum score; and wherein step (g) is further practiced to also print out the area of emerging technology for each category.

3. A method as recited in claim 1 wherein the goods and/or services to be supplied are paper and electronic business forms and related services; and wherein steps (a)–(d) are practiced with at least three of forms design, forms control, forms procurement, forms warehousing and distribution, forms inventory management, and accounts payable, as separate categories.

4. A method as recited in claim 1 wherein steps (a) and (c) are practiced by: grouping each category of questions by elements, sub-elements and points, and wherein some of the questions are limited to one choice while others include "choose all that apply"; assigning values at the point level when a response is limited to one choice, and assigning values to combinations of points when a response is "choose all that apply"; and assigning weights at the sub-element and element levels.

5. A method as recited in claim 4 comprising the further step of assigning each element from one to three trigger points, including at least one of a current situation trigger, an opportunity trigger, and a great job trigger; and wherein step (f) is also practiced to compare the trigger value or values to the customer responses.

6. A method as recited in claim 3 wherein steps (a) and (c) are practiced by: grouping each category of questions by elements, sub-elements and points, and wherein some of the questions are limited to one choice while others include "choose all that apply"; assigning values at the point level when a response is limited to one choice, and assigning values to combinations of points when a response is "choose all that apply"; and assigning weights at the sub-element and element levels.

7. A method as recited in claim 6 wherein for the forms control category said step of assigning weights at the element level is practiced by assigning a weight of about 30–40% for a forms control function element, about 15–25% for a forms file element, about 5–15% for a forms numbering element, about 15–25% for a forms catalog element, about 1–10% for a requisitions element, and about 5–15% for an obsolete item identification, resolution, and prevention element.

8. A method as recited in claim 7 wherein for the forms control category said step of assigning weights at the sub-element level is practiced by: assigning for said forms control function sub-elements a weight of about 55–65% for a sub-element related to existing procedures for forms control activities, about 15–25% to a sub-element relating to assigned responsibilities for forms control functions, and about 15–25% for a sub-element related to a training program for forms control personnel; assigning for said forms file element about 5–15% for a sub-element relating to if forms file exists, about 25–35% for a sub-element relating to which of specific elements are included in the forms file, and about 55–65% for a sub-element relating to updating of the forms file; assigning for said forms numbering element about 55–65% for a sub-element relating to the existence of a forms numbering system, and about 35–45% for a sub-element relating to the responsibility for forms numbering; assigning for said forms catalog element about 5–15% for a sub-element relating to the existence of a forms catalog, about 25–35% for a sub-element relating to the characteristics of forms listed in the forms catalog, about 15–25% for a sub-element relating to how the forms catalog is distributed, and about 35–45% for a sub-element relating to how often the forms catalog is updated; assigning for said requisitions element about 40–60% for a sub-element relating to the number of line items per requisition, and about 40–60% for a sub-element relating to the maximum number of lines on the most commonly used requisition form or forms; and assigning for said obsolete item identification, resolution and prevention element a significant weight for a sub-element relating to tools for identifying and remedying obsolete forms.

9. A method as recited in claim 6 wherein for the forms design category said step of assigning weights at the element level is practiced by assigning a weight of about 5–15% for a forms composition element, about 35–45% for a forms analysis element, about 20–30% for a business systems analysis element, and about 20–30% of a manufacturing capabilities and standard specifications element.

10. A method as recited in claim 9 wherein for the forms design element said step of assigning weights at the sub-element level is practiced by: assigning for said composition element sub-elements a weight of about 5–20% for a sub-element relating to the existence of an in place forms composition program, about 25–35% for a sub-element relating to which entities are responsible for the approval of new forms and revisions, about 10–20% for a sub-element relating to how proofs are obtained, about 10–20% for a sub-element relating to awareness of graphic standards, and about 5–15% for a sub-element relating to awareness of postal or shipping regulations; assigning for said forms analysis element sub-elements a weight of about 40–60% for a sub-element relating to the existence of a present forms analysis function, and about 40–60% for a sub-element relating to how the forms analysis function is presently performed; assigning for said business systems analysis element a significant weight for a sub-element relating to if and how the business analysis system is presently being performed; and assigning for said manufacturing capabilities and standard specifications element about 25–45% for a sub-element relating to the present awareness and utilization of industry standards, and about 55–75% for a sub-element relating to the present awareness of industry capabilities.

11. A method as recited in claim 6 wherein for the procurement category said step of assigning weights at the element level is practiced by assigning a weight of about 50–70% for a procurement process element, about 30–40% for a reorder process element, and about 1–20% for an environmental policy element.

12. A method as recited in claim 6 wherein for the warehousing/distribution category said step of assigning weights at the element level is practiced by assigning a weight of about 30–40% for a warehouse facility characteristics element, about 30–40% for a requisition process element, about 10–20% for a distribution methods element, and about 10–20% for an inventory turns element.

13. A method as recited in claim 6 wherein for the inventory management system category said step of assigning weights at the element level is practiced by assigning a weight of about 5–15% for a characteristics element, about 5–15% for an access element, about 1–25% for a system software security element, about 20–40% for a features element, about 5–15% for a customer service element, and about 20–40% for a reports element.

14. A method as recited in claim 6 wherein for the accounts payable category said step of assigning weights at the element level is practiced by assigning a weight of about 45–65% for an accounts payable procedures element, and about 35–55% for an accounting procedures element.

15. A method as recited in claim 4 wherein step (f) is practiced by calculating sufficient information to print a three dimensional bar graph; and wherein step (g) is practiced by printing a three-dimensional bar graph having differently shaded or colored areas for a potential customer's score and the user's score for each category and for each element within a category, each bar extending in a y-axis between zero and a maximum value, each bar identified by human readable indicia along an x-axis, and a numerical value corresponding to the graphical representation provided within at least some of said differently shaded or colored areas for at least some of said bars.

16. A method as recited in claim 1 wherein step (a) is practiced using a lap top computer as the first computer, and wherein steps (a)–(f) are practiced using with the first and second computers software for providing screen representations, including a plurality of screen-displayed indicia, guiding inputting of data and selection of options.

17. A method as recited in claim 1 wherein step (g) is also practiced to print out analysis information in non-graphical human readable form along with the graphical material.

18. A method as recited in claim 1 comprising the further step (h) of using the printed determinations from step (g) to determine the business opportunity to supply goods and/or services to potential customers.

19. Apparatus for determining business opportunities for supplying goods and/or services to potential customers, comprising:

a portable first computer means including a keyboard and a disc drive for inputting a series of questions relating to the level of sophistication of a potential customer's predefined business techniques in a plurality of different categories, and for inputting responses to said questions;

a second computer means including a keyboard and disc drive for inputting in machine readable form data from said first computer means, including said responses to said questions, assigned numerical weights and values, and data regarding the user's capability of supplying goods and/or services to the potential customer related to the potential customer's predefined business techniques; and including means for calculating, taking into account said weights and values, for each separate category a potential customer's, score, the user's score, and an area of opportunity which is the difference between the potential customer's score and the user's score; and a computer controlled printer controlled by said second computer means for printing out in human readable form on sheet material the calculations performed by said second computer means.

20. A method of evaluating business opportunities for supplying goods and/or services to potential customers comprising the steps of:

(a) in a first computer having an input element and a storage device, inputting and storing in the storage device a series of questions relating to the level of sophistication of a potential customer's predefined business techniques in a plurality of different categories;

(b) collecting responses to the series of questions from step (a) and inputting and storing in the storage device the responses into the first computer;

(c) assigning weights and values to the question responses so as to indicate a level of sophistication for each possible response of each business technique for each separate category;

(d) inputting and storing the data from steps (b) and (c) into a second computer having an input element, a storage device and a processor;

(e) using the processor of the second computer to calculate, taking into account the weights and values for each separate category, a potential customer's score;

(f) using a computer controlled printer, printing out on sheet material the information from step (e) in human readable form; and (g) using the printed information from step (f), evaluating the potential customer's needs.

21. A method as recited in claim 20 wherein the goods and/or services to be supplied to potential customers are paper business forms and related services, and wherein steps (a) through (c) are practiced with at least four of forms design, forms control, forms procurement, forms warehousing and distribution, forms inventory management, and accounts payable, as separate categories.

22. A method as recited in claim 20 wherein steps (a) and (c) are practiced by: grouping each category of questions by elements, sub-elements and points, and wherein some of the questions are limited to one choice while others include "choose all that apply"; assigning values at the point level when a response is limited to one choice, and assigning values to combinations of points when a response is "choose all that apply"; and assigning weights at the sub-element and element levels.

* * * * *